(12) United States Patent
Carlson et al.

(10) Patent No.: US 10,710,633 B2
(45) Date of Patent: Jul. 14, 2020

(54) CONTROL OF COMPLEX PARKING MANEUVERS AND AUTONOMOUS FUEL REPLENISHMENT OF DRIVERLESS VEHICLES

(71) Applicant: NIO USA, INC., San Jose, CA (US)

(72) Inventors: Jamie P. Carlson, San Jose, CA (US); Yadunandana Yellambalase, Mountain View, CA (US); Sathya Narayanan Kasturi Rangan, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 224 days.

(21) Appl. No.: 15/650,761

(22) Filed: Jul. 14, 2017

(65) Prior Publication Data

US 2019/0016384 A1 Jan. 17, 2019

(51) Int. Cl.
*B62D 15/02* (2006.01)
*G05D 1/00* (2006.01)
(Continued)

(52) U.S. Cl.
CPC ......... *B62D 15/0285* (2013.01); *B60L 53/35* (2019.02); *B60W 30/00* (2013.01);
(Continued)

(58) Field of Classification Search
CPC ... B62D 15/0285; B60L 53/35; G05D 1/0088; G05D 2201/0213
See application file for complete search history.

(56) References Cited

U.S. PATENT DOCUMENTS 3,790,277 A 2/1974 Hogan
4,154,529 A 5/1979 Dyott
(Continued)

FOREIGN PATENT DOCUMENTS

CN 1417755 5/2003
CN 1847817 10/2006
(Continued)

OTHER PUBLICATIONS

Combining 3D Shape, Color, and Motion for Robust Anytime Tracking; Held, David, Levinson, Jesse, Thrun, Sebastian, Savarese, Silvio, Robotics: Science and Systems (RSS), Berkeley, California, USA (2014).

(Continued)

*Primary Examiner* — Alan D Hutchinson
(74) *Attorney, Agent, or Firm* — Sheridan Ross P.C.

(57) ABSTRACT

Various embodiments relate generally to autonomous vehicles and associated mechanical, electrical and electronic hardware, computing software, including autonomy applications, image processing applications, etc., computing systems, and wired and wireless network communications to facilitate autonomous control of vehicles, and, more specifically, to systems, devices, and methods configured to control driverless vehicles to facilitate complex parking maneuvers and autonomous fuel replenishment. In some examples, a method may include computing vehicular drive parameters, accessing map data to identify a boundary, detecting an autonomous vehicle, accessing executable instructions to facilitate vectoring of an autonomous vehicle, and applying vehicular drive parameters to propel the autonomous vehicle to a termination point.

20 Claims, 15 Drawing Sheets

(51) Int. Cl.
  *B60W 30/00* (2006.01)
  *G05D 1/02* (2020.01)
  *B60L 53/35* (2019.01)
  *G06Q 10/00* (2012.01)
(52) U.S. Cl.
  CPC ......... *G05D 1/0088* (2013.01); *G05D 1/0225* (2013.01); *G05D 1/0234* (2013.01); *G05D 1/0274* (2013.01); *G05D 1/0282* (2013.01); *G06Q 10/00* (2013.01); *G05D 2201/0213* (2013.01)

(56) References Cited

U.S. PATENT DOCUMENTS

| | | | |
|---|---|---|---|
| 4,361,202 A | 11/1982 | Minovitch |
| 4,476,954 A | 10/1984 | Johnson et al. |
| 4,516,158 A | 5/1985 | Grainge et al. |
| 4,700,301 A | 10/1987 | Dyke |
| 4,709,195 A | 11/1987 | Hellekson et al. |
| 4,754,255 A | 6/1988 | Sanders et al. |
| 4,875,391 A | 10/1989 | Leising et al. |
| 5,098,185 A | 3/1992 | Watanabe et al. |
| 5,130,659 A | 7/1992 | Sloan |
| 5,136,498 A | 8/1992 | McLaughlin et al. |
| 5,202,742 A | 4/1993 | Frank et al. |
| 5,204,817 A | 4/1993 | Yoshida |
| 5,220,507 A | 6/1993 | Kirson |
| 5,303,084 A | 4/1994 | Pflibsen et al. |
| 5,337,189 A | 8/1994 | Krawczyk et al. |
| 5,363,306 A | 11/1994 | Kuwahara et al. |
| 5,375,059 A | 12/1994 | Kyrtsos et al. |
| 5,390,125 A | 2/1995 | Sennott et al. |
| 5,428,438 A | 6/1995 | Komine |
| 5,438,517 A | 8/1995 | Sennott et al. |
| 5,508,689 A | 4/1996 | Rado et al. |
| 5,521,815 A | 5/1996 | Rose |
| 5,529,138 A | 6/1996 | Shaw et al. |
| 5,531,122 A | 7/1996 | Chatham et al. |
| 5,548,516 A | 8/1996 | Gudat et al. |
| 5,555,503 A | 9/1996 | Kyrtsos et al. |
| 5,558,370 A | 9/1996 | Behr |
| 5,572,450 A | 11/1996 | Worthy |
| 5,610,815 A | 3/1997 | Gudat et al. |
| 5,610,821 A | 3/1997 | Gazis et al. |
| 5,612,883 A | 3/1997 | Shaffer et al. |
| 5,615,116 A | 5/1997 | Gudat et al. |
| 5,629,855 A | 5/1997 | Kyrtsos et al. |
| 5,640,323 A | 6/1997 | Kleimenhagen et al. |
| 5,646,843 A | 7/1997 | Gudat et al. |
| 5,646,845 A | 7/1997 | Gudat et al. |
| 5,648,769 A | 7/1997 | Sato et al. |
| 5,648,901 A | 7/1997 | Gudat et al. |
| 5,657,226 A | 8/1997 | Shin et al. |
| 5,680,306 A | 10/1997 | Shin et al. |
| 5,680,313 A | 10/1997 | Whittaker et al. |
| 5,684,696 A | 11/1997 | Rao et al. |
| 5,703,351 A | 12/1997 | Meyers |
| 5,710,702 A | 1/1998 | Hayashi et al. |
| 5,794,164 A | 8/1998 | Beckert et al. |
| 5,797,134 A | 8/1998 | McMillan et al. |
| 5,812,067 A | 9/1998 | Bergholz et al. |
| 5,825,283 A | 10/1998 | Camhi |
| 5,838,251 A | 11/1998 | Brinkmeyer et al. |
| 5,838,562 A | 11/1998 | Gudat et al. |
| 5,847,661 A | 12/1998 | Ricci |
| 5,890,080 A | 3/1999 | Coverdill et al. |
| 5,928,294 A | 7/1999 | Zelinkovsky |
| 5,949,345 A | 9/1999 | Beckert et al. |
| 5,956,250 A | 9/1999 | Gudat et al. |
| 5,959,552 A | 9/1999 | Cho |
| 5,983,161 A | 11/1999 | Lemelson et al. |
| 5,986,575 A | 11/1999 | Jones et al. |
| 6,038,426 A | 3/2000 | Williams, Jr. |
| 6,046,800 A | 4/2000 | Ohtomo et al. |
| 6,081,756 A | 6/2000 | Mio et al. |
| D429,684 S | 8/2000 | Johnson |
| 6,115,128 A | 9/2000 | Vann |
| 6,122,572 A | 9/2000 | Yavnai |
| 6,128,003 A | 10/2000 | Smith et al. |
| 6,141,620 A | 10/2000 | Zyburt et al. |
| 6,148,261 A | 11/2000 | Obradovich et al. |
| 6,151,539 A | 11/2000 | Bergholz et al. |
| 6,152,514 A | 11/2000 | McLellen |
| 6,157,321 A | 12/2000 | Ricci |
| 6,198,996 B1 | 3/2001 | Berstis |
| 6,199,001 B1 | 3/2001 | Ohta et al. |
| 6,202,008 B1 | 3/2001 | Beckert et al. |
| 6,252,544 B1 | 6/2001 | Hoffberg |
| 6,264,353 B1 | 7/2001 | Caraher et al. |
| 6,267,428 B1 | 7/2001 | Baldas et al. |
| 6,301,542 B1 | 10/2001 | Kirchberger et al. |
| 6,302,438 B1 | 10/2001 | Stopper, Jr. et al. |
| 6,310,542 B1 | 10/2001 | Gehlot |
| 6,317,058 B1 | 11/2001 | Lemelson et al. |
| 6,339,826 B2 | 1/2002 | Hayes, Jr. et al. |
| 6,356,838 B1 | 3/2002 | Paul |
| 6,374,168 B1 | 4/2002 | Fujii |
| 6,388,579 B1 | 5/2002 | Adcox et al. |
| 6,438,472 B1 | 8/2002 | Tano et al. |
| 6,480,224 B1 | 11/2002 | Brown |
| 6,502,016 B1 | 12/2002 | Ozaki et al. |
| 6,502,022 B1 | 12/2002 | Chastain et al. |
| 6,519,519 B1 | 2/2003 | Stopczynski |
| 6,557,752 B1 | 5/2003 | Yacoob |
| 6,563,910 B2 | 5/2003 | Menard et al. |
| 6,587,739 B1 | 7/2003 | Abrams et al. |
| 6,598,227 B1 | 7/2003 | Berry et al. |
| 6,607,212 B1 | 8/2003 | Reimer et al. |
| 6,617,981 B2 | 9/2003 | Basinger |
| 6,626,463 B1 | 9/2003 | Arima et al. |
| 6,662,077 B2 | 12/2003 | Haag |
| 6,675,081 B2 | 1/2004 | Shuman et al. |
| 6,678,747 B2 | 1/2004 | Goossen et al. |
| 6,681,176 B2 | 1/2004 | Funk et al. |
| 6,690,260 B1 | 2/2004 | Ashihara |
| 6,690,940 B1 | 2/2004 | Brown et al. |
| 6,724,920 B1 | 4/2004 | Berenz et al. |
| 6,728,616 B1 | 4/2004 | Tabe |
| 6,749,218 B2 | 6/2004 | Breed |
| 6,752,508 B2 | 6/2004 | Kobayashi |
| 6,754,580 B1 | 6/2004 | Ask et al. |
| 6,757,593 B2 | 6/2004 | Mori et al. |
| 6,762,684 B1 | 7/2004 | Camhi |
| 6,765,495 B1 | 7/2004 | Dunning et al. |
| 6,778,732 B1 | 8/2004 | Fermann |
| 6,778,888 B2 | 8/2004 | Cataldo et al. |
| 6,782,240 B1 | 8/2004 | Tabe |
| 6,785,531 B2 | 8/2004 | Lepley et al. |
| 6,816,783 B2 | 11/2004 | Hashima et al. |
| 6,820,259 B1 | 11/2004 | Kawamata et al. |
| 6,944,533 B2 | 9/2005 | Obradovich et al. |
| 6,950,022 B2 | 9/2005 | Breed |
| 6,958,707 B1 | 10/2005 | Siegel |
| 6,992,580 B2 | 1/2006 | Kotzin et al. |
| 7,019,641 B1 | 3/2006 | Lakshmanan et al. |
| 7,020,544 B2 | 3/2006 | Shinada et al. |
| 7,021,691 B1 | 4/2006 | Schmidt et al. |
| 7,036,128 B1 | 4/2006 | Julia et al. |
| 7,042,345 B2 | 5/2006 | Ellis |
| 7,047,129 B2 | 5/2006 | Uotani |
| 7,058,898 B2 | 6/2006 | McWalter et al. |
| 7,069,780 B2 | 7/2006 | Ander |
| 7,089,114 B1 | 8/2006 | Huang |
| 7,096,431 B2 | 8/2006 | Tambata et al. |
| 7,106,180 B1 | 9/2006 | Pompei |
| 7,142,696 B1 | 11/2006 | Engelsberg et al. |
| 7,164,117 B2 | 1/2007 | Breed et al. |
| 7,187,947 B1 | 3/2007 | White et al. |
| 7,203,598 B1 | 4/2007 | Whitsell |
| 7,233,861 B2 | 6/2007 | Van Buer et al. |
| 7,239,960 B2 | 7/2007 | Yokota et al. |
| 7,248,342 B1 | 7/2007 | Degnan |
| 7,255,275 B2 | 8/2007 | Gurevich et al. |
| 7,259,838 B2 | 8/2007 | Carlhoff et al. |

(56) References Cited

U.S. PATENT DOCUMENTS

| | | |
|---|---|---|
| 7,277,454 B2 | 10/2007 | Mocek et al. |
| 7,284,769 B2 | 10/2007 | Breed |
| 7,289,645 B2 | 10/2007 | Yamamoto et al. |
| 7,295,921 B2 | 11/2007 | Spencer et al. |
| 7,311,000 B2 | 12/2007 | Smith et al. |
| 7,313,547 B2 | 12/2007 | Mocek et al. |
| 7,333,012 B1 | 2/2008 | Nguyen |
| 7,343,148 B1 | 3/2008 | O'Neil |
| 7,361,948 B2 | 4/2008 | Hirano et al. |
| 7,386,376 B2 | 6/2008 | Basir et al. |
| 7,386,799 B1 | 6/2008 | Clanton et al. |
| 7,417,716 B2 | 8/2008 | Nagasaka et al. |
| 7,426,429 B2 | 9/2008 | Tabe |
| 7,432,829 B2 | 10/2008 | Poltorak |
| 7,451,005 B2 | 11/2008 | Hoffberg et al. |
| 7,474,264 B2 | 1/2009 | Bolduc et al. |
| 7,493,140 B2 | 2/2009 | Michmerhuizen et al. |
| 7,526,539 B1 | 4/2009 | Hsu |
| 7,544,945 B2 | 6/2009 | Tan et al. |
| 7,548,815 B2 | 6/2009 | Watkins et al. |
| 7,566,083 B2 | 7/2009 | Vitito |
| 7,606,660 B2 | 10/2009 | Diaz et al. |
| 7,606,867 B1 | 10/2009 | Singhal et al. |
| 7,643,913 B2 | 1/2010 | Taki et al. |
| 7,650,234 B2 | 1/2010 | Obradovich et al. |
| 7,663,502 B2 | 2/2010 | Breed |
| 7,671,764 B2 | 3/2010 | Uyeki et al. |
| 7,680,596 B2 | 3/2010 | Uyeki et al. |
| 7,683,771 B1 | 3/2010 | Loeb |
| 7,711,468 B1 | 5/2010 | Levy |
| 7,734,315 B2 | 6/2010 | Rathus et al. |
| 7,748,021 B2 | 6/2010 | Obradovich et al. |
| RE41,449 E | 7/2010 | Krahnstoever et al. |
| 7,791,499 B2 | 9/2010 | Mohan et al. |
| 7,796,190 B2 | 9/2010 | Basso et al. |
| 7,802,832 B2 | 9/2010 | Carnevali |
| 7,821,421 B2 | 10/2010 | Tamir et al. |
| 7,832,762 B2 | 11/2010 | Breed |
| 7,864,073 B2 | 1/2011 | Lee et al. |
| 7,865,277 B1 | 1/2011 | Larson et al. |
| 7,872,591 B2 | 1/2011 | Kane et al. |
| 7,873,471 B2 | 1/2011 | Gieseke |
| 7,881,703 B2 | 2/2011 | Roundtree et al. |
| 7,891,004 B1 | 2/2011 | Gelvin et al. |
| 7,891,719 B2 | 2/2011 | Carnevali |
| 7,899,610 B2 | 3/2011 | McClellan |
| 7,966,678 B2 | 6/2011 | Ten Eyck et al. |
| 7,969,290 B2 | 6/2011 | Waeller et al. |
| 7,969,324 B2 | 6/2011 | Chevion et al. |
| 7,969,558 B2 | 6/2011 | Hall |
| 7,979,175 B2 | 7/2011 | Allard et al. |
| 8,050,863 B2 | 11/2011 | Trepagnier et al. |
| 8,060,631 B2 | 11/2011 | Collart et al. |
| 8,064,925 B1 | 11/2011 | Sun et al. |
| 8,066,313 B2 | 11/2011 | Carnevali |
| 8,098,170 B1 | 1/2012 | Szczerba et al. |
| 8,113,564 B2 | 2/2012 | Carnevali |
| 8,123,642 B2 | 2/2012 | Ishikawa et al. |
| 8,126,642 B2 | 2/2012 | Trepaginer et al. |
| 8,131,419 B2 | 3/2012 | Ampunan et al. |
| 8,157,310 B2 | 4/2012 | Carnevali |
| 8,162,368 B2 | 4/2012 | Carnevali |
| 8,175,802 B2 | 5/2012 | Forstall et al. |
| 8,233,919 B2 | 7/2012 | Haag et al. |
| 8,245,609 B1 | 8/2012 | Greenwald et al. |
| 8,306,514 B1 | 11/2012 | Nunally |
| 8,334,847 B2 | 12/2012 | Tomkins |
| 8,346,233 B2 | 1/2013 | Aaron et al. |
| 8,346,432 B2 | 1/2013 | Van Wiemeersch et al. |
| 8,346,480 B2 | 1/2013 | Trepagnier et al. |
| 8,350,721 B2 | 1/2013 | Carr |
| 8,352,282 B2 | 1/2013 | Jensen et al. |
| 8,369,263 B2 | 2/2013 | Dowling et al. |
| 8,417,449 B1 | 4/2013 | Denise |
| 8,428,863 B2 | 4/2013 | Kelly et al. |
| 8,428,864 B2 | 4/2013 | Kelly et al. |
| 8,432,260 B2 | 4/2013 | Talty et al. |
| 8,392,064 B2 | 5/2013 | Thrun et al. |
| 8,434,919 B2 | 5/2013 | Schofield |
| 8,442,389 B2 | 5/2013 | Kashima et al. |
| 8,442,758 B1 | 5/2013 | Rovik et al. |
| 8,447,509 B2 | 5/2013 | Kelly et al. |
| 8,457,877 B2 | 6/2013 | Kelly et al. |
| 8,467,965 B2 | 6/2013 | Chang |
| 8,477,290 B2 | 7/2013 | Yamada |
| 8,497,842 B2 | 7/2013 | Tomkins et al. |
| 8,498,809 B2 | 7/2013 | Bill |
| 8,509,982 B2 | 8/2013 | Montemerlo et al. |
| 8,521,410 B2 | 8/2013 | Mizuno et al. |
| 8,527,143 B2 | 9/2013 | Tan |
| 8,527,146 B1 | 9/2013 | Jackson et al. |
| 8,532,574 B2 | 9/2013 | Kirsch |
| 8,543,330 B2 | 9/2013 | Taylor et al. |
| 8,547,340 B2 | 10/2013 | Sizelove et al. |
| 8,548,669 B2 | 10/2013 | Naylor |
| 8,550,196 B2 | 10/2013 | Ross |
| 8,559,183 B1 | 10/2013 | Davis |
| 8,577,600 B1 | 11/2013 | Pierfelice |
| 8,578,279 B2 | 11/2013 | Chen et al. |
| 8,583,292 B2 | 11/2013 | Preston et al. |
| 8,583,358 B2 | 11/2013 | Kelly et al. |
| 8,589,014 B2 | 11/2013 | Fairfield et al. |
| 8,589,062 B2 | 11/2013 | Kelly et al. |
| 8,589,073 B2 | 11/2013 | Guha et al. |
| 8,600,611 B2 | 12/2013 | Seize |
| 8,613,385 B1 | 12/2013 | Hulet et al. |
| 8,621,645 B1 | 12/2013 | Spackman |
| 8,624,727 B2 | 1/2014 | Saigh et al. |
| 8,634,984 B2 | 1/2014 | Sumizawa |
| 8,644,165 B2 | 2/2014 | Saarimaki et al. |
| 8,660,735 B2 | 2/2014 | Tengler et al. |
| 8,670,891 B1 | 3/2014 | Szybalski et al. |
| 8,671,068 B2 | 3/2014 | Harber et al. |
| 8,688,372 B2 | 4/2014 | Bhogal et al. |
| 8,705,527 B1 | 4/2014 | Addepalli et al. |
| 8,706,143 B1 | 4/2014 | Elias |
| 8,718,797 B1 | 5/2014 | Addepalli et al. |
| 8,725,311 B1 | 5/2014 | Breed |
| 8,730,033 B2 | 5/2014 | Yarnold et al. |
| 8,737,986 B2 | 5/2014 | Rhoads et al. |
| 8,742,325 B1 | 6/2014 | Droz et al. |
| 8,755,837 B2 | 6/2014 | Rhoads et al. |
| 8,761,673 B2 | 6/2014 | Sakata |
| 8,767,190 B2 | 7/2014 | Hall |
| 8,774,842 B2 | 7/2014 | Jones et al. |
| 8,779,947 B2 | 7/2014 | Tengler et al. |
| 8,782,262 B2 | 7/2014 | Collart et al. |
| 8,788,446 B2 | 7/2014 | Yao et al. |
| 8,793,065 B2 | 7/2014 | Seltzer et al. |
| 8,798,918 B2 | 8/2014 | Onishi et al. |
| 8,805,110 B2 | 8/2014 | Rhoads et al. |
| 8,812,171 B2 | 8/2014 | Filev et al. |
| 8,817,761 B2 | 8/2014 | Gruberman et al. |
| 8,825,031 B2 | 9/2014 | Aaron et al. |
| 8,825,259 B1 | 9/2014 | Ferguson |
| 8,825,277 B2 | 9/2014 | McClellan et al. |
| 8,825,382 B2 | 9/2014 | Liu |
| 8,826,261 B1 | 9/2014 | Ag et al. |
| 8,836,922 B1 | 9/2014 | Pennecot et al. |
| 8,838,088 B1 | 9/2014 | Henn et al. |
| 8,862,317 B2 | 10/2014 | Shin et al. |
| 8,880,272 B1 | 11/2014 | Ferguson et al. |
| 8,886,382 B2 | 11/2014 | Nettleton et al. |
| 8,892,496 B2 | 11/2014 | Yao et al. |
| 8,909,428 B1 | 12/2014 | Lombrozo |
| 8,930,128 B2 | 1/2015 | Kim et al. |
| 8,977,007 B1 | 3/2015 | Ferguson et al. |
| 8,977,408 B1 | 3/2015 | Cazanas et al. |
| 8,996,224 B1 | 3/2015 | Herbach et al. |
| 8,965,578 B2 | 4/2015 | Versteeg et al. |
| 9,008,890 B1 | 4/2015 | Herbach et al. |
| 9,031,729 B2 | 5/2015 | Lathrop et al. |
| 9,043,016 B2 | 5/2015 | Filippov et al. |
| 9,046,371 B2 | 6/2015 | Casson et al. |

(56) References Cited

U.S. PATENT DOCUMENTS

| | | |
|---|---|---|
| 9,086,273 B1 | 7/2015 | Gruver et al. |
| 9,139,199 B2 | 9/2015 | Harvey |
| 9,146,553 B2 | 9/2015 | Nettleton et al. |
| D743,978 S | 11/2015 | Amin |
| 9,182,942 B2 | 11/2015 | Kelly et al. |
| 9,188,985 B1 | 11/2015 | Hobbs et al. |
| 9,194,168 B1 | 11/2015 | Lu et al. |
| 9,201,426 B1 | 12/2015 | Bonawitz |
| 9,213,934 B1 | 12/2015 | Versteeg et al. |
| 9,229,905 B1 | 1/2016 | Penilla et al. |
| 9,285,464 B2 | 3/2016 | Pennecot et al. |
| 9,288,938 B2 | 3/2016 | Cavender-Bares et al. |
| 9,290,201 B1 | 3/2016 | Lombrozo |
| 9,297,256 B2 | 3/2016 | Nettleton et al. |
| 9,315,212 B1 | 4/2016 | Kyrtsos et al. |
| 9,317,033 B2 | 4/2016 | Ibanez-Guzman et al. |
| 9,347,779 B1 | 5/2016 | Lynch |
| 9,367,065 B2 | 6/2016 | Dolgov et al. |
| 9,368,026 B1 | 6/2016 | Herbach et al. |
| 9,368,936 B1 | 6/2016 | Lenius et al. |
| 9,298,186 B2 | 7/2016 | Harvey |
| 9,382,797 B2 | 7/2016 | Nettleton et al. |
| 9,384,443 B2 | 7/2016 | Passot et al. |
| 9,384,666 B1 | 7/2016 | Harvey |
| 9,395,727 B1 | 7/2016 | Smith et al. |
| 9,396,441 B1 | 7/2016 | Rubin |
| 9,441,971 B2 | 9/2016 | Casson et al. |
| 9,459,622 B2 | 10/2016 | Abhyanker |
| 9,476,303 B2 | 10/2016 | Nettleton et al. |
| 9,494,439 B1 | 11/2016 | Ross et al. |
| 9,494,940 B1 | 11/2016 | Kentley |
| 9,494,943 B2 | 11/2016 | Harvey |
| 9,506,763 B2 | 11/2016 | Averbuch et al. |
| 9,507,346 B1 | 11/2016 | Levinson et al. |
| 9,517,767 B1 | 12/2016 | Kentley et al. |
| 9,522,699 B2 | 12/2016 | Raad et al. |
| 9,533,640 B2 | 1/2017 | Rai |
| 9,547,307 B1 | 1/2017 | Cullinane et al. |
| 9,606,539 B1 | 3/2017 | Kentley et al. |
| 9,612,123 B1 | 4/2017 | Levinson et al. |
| 9,613,274 B2 | 4/2017 | Stevens et al. |
| 9,630,619 B1 | 4/2017 | Kentley et al. |
| 9,632,502 B1 | 4/2017 | Levinson et al. |
| 9,701,239 B2 | 7/2017 | Kentley et al. |
| 9,731,618 B2 | 8/2017 | Asai et al. |
| 10,067,502 B1 | 9/2018 | Delp |
| 2001/0010516 A1 | 8/2001 | Roh et al. |
| 2001/0015888 A1 | 8/2001 | Shaler et al. |
| 2001/0029425 A1 | 10/2001 | Myr |
| 2002/0009978 A1 | 1/2002 | Dukach et al. |
| 2002/0023010 A1 | 2/2002 | Rittmaster et al. |
| 2002/0026278 A1 | 2/2002 | Feldman et al. |
| 2002/0045484 A1 | 4/2002 | Eck et al. |
| 2002/0065046 A1 | 5/2002 | Mankins et al. |
| 2002/0077985 A1 | 6/2002 | Kobata et al. |
| 2002/0095249 A1 | 7/2002 | Lang |
| 2002/0097145 A1 | 7/2002 | Tumey et al. |
| 2002/0103622 A1 | 8/2002 | Burge |
| 2002/0105968 A1 | 8/2002 | Pruzan et al. |
| 2002/0126876 A1 | 9/2002 | Paul et al. |
| 2002/0128774 A1 | 9/2002 | Takezaki et al. |
| 2002/0131608 A1 | 9/2002 | Lobb et al. |
| 2002/0140924 A1 | 10/2002 | Wrangler et al. |
| 2002/0143461 A1 | 10/2002 | Burns et al. |
| 2002/0143643 A1 | 10/2002 | Catan |
| 2002/0152010 A1 | 10/2002 | Colmenarez et al. |
| 2002/0154217 A1 | 10/2002 | Ikeda |
| 2002/0169551 A1 | 11/2002 | Inoue et al. |
| 2002/0174021 A1 | 11/2002 | Chu et al. |
| 2003/0004624 A1 | 1/2003 | Wilson et al. |
| 2003/0007227 A1 | 1/2003 | Ogino |
| 2003/0046021 A1 | 3/2003 | Lasky et al. |
| 2003/0055557 A1 | 3/2003 | Dutta et al. |
| 2003/0101451 A1 | 5/2003 | Bentolila et al. |
| 2003/0109972 A1 | 6/2003 | Tak |
| 2003/0125846 A1 | 7/2003 | Yu et al. |
| 2003/0132666 A1 | 7/2003 | Bond et al. |
| 2003/0149530 A1 | 8/2003 | Stopczynski |
| 2003/0158638 A1 | 8/2003 | Yakes et al. |
| 2003/0182435 A1 | 9/2003 | Redlich et al. |
| 2003/0202683 A1 | 10/2003 | Ma et al. |
| 2003/0204290 A1 | 10/2003 | Sadler et al. |
| 2003/0230443 A1 | 12/2003 | Cramer et al. |
| 2004/0017073 A1 | 1/2004 | Pavlov et al. |
| 2004/0017292 A1 | 1/2004 | Reese et al. |
| 2004/0024502 A1 | 2/2004 | Squires et al. |
| 2004/0036622 A1 | 2/2004 | Dukach et al. |
| 2004/0039500 A1 | 2/2004 | Amendola et al. |
| 2004/0039504 A1 | 2/2004 | Coffee et al. |
| 2004/0068354 A1 | 4/2004 | Tabe |
| 2004/0068364 A1 | 4/2004 | Zhao et al. |
| 2004/0070920 A1 | 4/2004 | Flueli |
| 2004/0093155 A1 | 5/2004 | Simonds et al. |
| 2004/0117494 A1 | 6/2004 | Mitchell et al. |
| 2004/0128062 A1 | 7/2004 | Ogino et al. |
| 2004/0153356 A1 | 8/2004 | Lockwood et al. |
| 2004/0162019 A1 | 8/2004 | Horita et al. |
| 2004/0168837 A1 | 9/2004 | Michaud et al. |
| 2004/0180653 A1 | 9/2004 | Royalty |
| 2004/0182574 A1 | 9/2004 | Adnan et al. |
| 2004/0193347 A1 | 9/2004 | Harumoto et al. |
| 2004/0193374 A1 | 9/2004 | Hac et al. |
| 2004/0203974 A1 | 10/2004 | Seibel |
| 2004/0204837 A1 | 10/2004 | Singleton |
| 2004/0209594 A1 | 10/2004 | Naboulsi |
| 2004/0217850 A1 | 11/2004 | Perttunen et al. |
| 2004/0225557 A1 | 11/2004 | Phelan et al. |
| 2004/0250614 A1 | 12/2004 | Ander |
| 2004/0255123 A1 | 12/2004 | Noyama et al. |
| 2004/0257208 A1 | 12/2004 | Huang et al. |
| 2004/0260470 A1 | 12/2004 | Rast |
| 2004/0264207 A1 | 12/2004 | Jones |
| 2005/0012599 A1 | 1/2005 | DeMatteo |
| 2005/0031100 A1 | 2/2005 | Iggulden et al. |
| 2005/0038598 A1 | 2/2005 | Oesterling et al. |
| 2005/0042999 A1 | 2/2005 | Rappaport |
| 2005/0046584 A1 | 3/2005 | Breed |
| 2005/0065678 A1 | 3/2005 | Smith et al. |
| 2005/0065711 A1 | 3/2005 | Dahlgren et al. |
| 2005/0086051 A1 | 4/2005 | Brulle-Drews |
| 2005/0093717 A1 | 5/2005 | Lilja |
| 2005/0097541 A1 | 5/2005 | Holland |
| 2005/0107955 A1 | 5/2005 | Isaji et al. |
| 2005/0114864 A1 | 5/2005 | Surace |
| 2005/0122235 A1 | 6/2005 | Teffer et al. |
| 2005/0124211 A1 | 6/2005 | Diessner et al. |
| 2005/0130744 A1 | 6/2005 | Eck et al. |
| 2005/0144156 A1 | 6/2005 | Barber |
| 2005/0149752 A1 | 7/2005 | Johnson et al. |
| 2005/0153760 A1 | 7/2005 | Varley |
| 2005/0159853 A1 | 7/2005 | Takahashi et al. |
| 2005/0159892 A1 | 7/2005 | Chung |
| 2005/0192727 A1 | 9/2005 | Shostak et al. |
| 2005/0197748 A1 | 9/2005 | Hoist et al. |
| 2005/0197767 A1 | 9/2005 | Nortrup |
| 2005/0216181 A1 | 9/2005 | Estkowski et al. |
| 2005/0251324 A1 | 11/2005 | Wiener et al. |
| 2005/0261815 A1 | 11/2005 | Cowelchuk et al. |
| 2005/0278093 A1 | 12/2005 | Kameyama |
| 2005/0283284 A1 | 12/2005 | Grenier et al. |
| 2006/0015819 A1 | 1/2006 | Hawkins et al. |
| 2006/0030987 A1 | 2/2006 | Akita |
| 2006/0036358 A1 | 2/2006 | Hale et al. |
| 2006/0044119 A1 | 3/2006 | Egelhaaf |
| 2006/0047386 A1 | 3/2006 | Kanevsky et al. |
| 2006/0058948 A1 | 3/2006 | Blass et al. |
| 2006/0059229 A1 | 3/2006 | Bain et al. |
| 2006/0064202 A1 | 3/2006 | Gutmann et al. |
| 2006/0070432 A1 | 4/2006 | Ander |
| 2006/0089763 A1 | 4/2006 | Barrett et al. |
| 2006/0125631 A1 | 6/2006 | Sharony |
| 2006/0130033 A1 | 6/2006 | Stoffels et al. |
| 2006/0142933 A1 | 6/2006 | Feng |
| 2006/0173841 A1 | 8/2006 | Bill |

(56) References Cited

U.S. PATENT DOCUMENTS

| | | |
|---|---|---|
| 2006/0175116 A1 | 8/2006 | Friedman et al. |
| 2006/0175403 A1 | 8/2006 | McConnell et al. |
| 2006/0184319 A1 | 8/2006 | Seick et al. |
| 2006/0207820 A1 | 9/2006 | Joshi et al. |
| 2006/0208169 A1 | 9/2006 | Breed et al. |
| 2006/0212909 A1 | 9/2006 | Girard et al. |
| 2006/0241836 A1 | 10/2006 | Kachouh et al. |
| 2006/0243056 A1 | 11/2006 | Sundermeyer et al. |
| 2006/0250272 A1 | 11/2006 | Puamau |
| 2006/0253307 A1 | 11/2006 | Warren et al. |
| 2006/0259210 A1 | 11/2006 | Tanaka et al. |
| 2006/0274829 A1 | 12/2006 | Siemens et al. |
| 2006/0282204 A1 | 12/2006 | Breed |
| 2006/0287807 A1 | 12/2006 | Teffer |
| 2006/0287865 A1 | 12/2006 | Cross et al. |
| 2006/0288382 A1 | 12/2006 | Vitito |
| 2006/0290516 A1 | 12/2006 | Muehlsteff et al. |
| 2007/0001831 A1 | 1/2007 | Raz et al. |
| 2007/0002032 A1 | 1/2007 | Powers et al. |
| 2007/0010942 A1 | 1/2007 | Bill |
| 2007/0015485 A1 | 1/2007 | DeBiasio et al. |
| 2007/0028370 A1 | 2/2007 | Seng |
| 2007/0032225 A1 | 2/2007 | Konicek et al. |
| 2007/0057781 A1 | 3/2007 | Breed |
| 2007/0061057 A1 | 3/2007 | Huang et al. |
| 2007/0067614 A1 | 3/2007 | Berry et al. |
| 2007/0069880 A1 | 3/2007 | Best et al. |
| 2007/0083298 A1 | 4/2007 | Pierce et al. |
| 2007/0088488 A1 | 4/2007 | Reeves et al. |
| 2007/0096447 A1 | 5/2007 | Tabe |
| 2007/0103328 A1 | 5/2007 | Lakshmanan et al. |
| 2007/0115101 A1 | 5/2007 | Creekbaum et al. |
| 2007/0118301 A1 | 5/2007 | Andarawis et al. |
| 2007/0120697 A1 | 5/2007 | Ayoub et al. |
| 2007/0135995 A1 | 6/2007 | Kikuchi et al. |
| 2007/0156317 A1 | 7/2007 | Breed |
| 2007/0182625 A1 | 8/2007 | Kerai et al. |
| 2007/0182816 A1 | 8/2007 | Fox |
| 2007/0185969 A1 | 8/2007 | Davis |
| 2007/0192486 A1 | 8/2007 | Wilson et al. |
| 2007/0194902 A1 | 8/2007 | Blanco et al. |
| 2007/0194944 A1 | 8/2007 | Galera et al. |
| 2007/0195997 A1 | 8/2007 | Paul et al. |
| 2007/0200663 A1 | 8/2007 | White et al. |
| 2007/0208860 A1 | 9/2007 | Zellner et al. |
| 2007/0213090 A1 | 9/2007 | Holmberg |
| 2007/0228826 A1 | 10/2007 | Jordan et al. |
| 2007/0233341 A1 | 10/2007 | Logsdon |
| 2007/0246927 A1 | 10/2007 | Okada |
| 2007/0250228 A1 | 10/2007 | Reddy et al. |
| 2007/0257815 A1 | 11/2007 | Gunderson et al. |
| 2007/0276596 A1 | 11/2007 | Solomon et al. |
| 2007/0280505 A1 | 12/2007 | Breed |
| 2008/0005974 A1 | 1/2008 | Delgado Vazquez et al. |
| 2008/0023253 A1 | 1/2008 | Prost-Fin et al. |
| 2008/0027337 A1 | 1/2008 | Dugan et al. |
| 2008/0033635 A1 | 2/2008 | Obradovich et al. |
| 2008/0033645 A1 | 2/2008 | Levinson et al. |
| 2008/0042824 A1 | 2/2008 | Kates |
| 2008/0051957 A1 | 2/2008 | Breed et al. |
| 2008/0052627 A1 | 2/2008 | Oguchi |
| 2008/0071465 A1 | 3/2008 | Chapman et al. |
| 2008/0082237 A1 | 4/2008 | Breed |
| 2008/0084283 A1 | 4/2008 | Kalik |
| 2008/0086455 A1 | 4/2008 | Meisels et al. |
| 2008/0090522 A1 | 4/2008 | Oyama |
| 2008/0097699 A1 | 4/2008 | Ono |
| 2008/0104227 A1 | 5/2008 | Birnie et al. |
| 2008/0119994 A1 | 5/2008 | Kameyama |
| 2008/0129475 A1 | 6/2008 | Breed et al. |
| 2008/0143085 A1 | 6/2008 | Breed et al. |
| 2008/0147280 A1 | 6/2008 | Breed |
| 2008/0148374 A1 | 6/2008 | Spaur et al. |
| 2008/0154712 A1 | 6/2008 | Wellman |
| 2008/0154957 A1 | 6/2008 | Taylor et al. |
| 2008/0161986 A1 | 7/2008 | Breed |
| 2008/0161987 A1 | 7/2008 | Breed |
| 2008/0164985 A1 | 7/2008 | Iketani et al. |
| 2008/0169940 A1 | 7/2008 | Lee et al. |
| 2008/0174451 A1 | 7/2008 | Harrington et al. |
| 2008/0212215 A1 | 9/2008 | Schofield et al. |
| 2008/0216067 A1 | 9/2008 | Villing |
| 2008/0228358 A1 | 9/2008 | Wang et al. |
| 2008/0234919 A1 | 9/2008 | Ritter et al. |
| 2008/0252487 A1 | 10/2008 | McClellan et al. |
| 2008/0253613 A1 | 10/2008 | Jones et al. |
| 2008/0255721 A1 | 10/2008 | Yamada |
| 2008/0255722 A1 | 10/2008 | McClellan et al. |
| 2008/0269958 A1 | 10/2008 | Filev et al. |
| 2008/0281508 A1 | 11/2008 | Fu |
| 2008/0300778 A1 | 12/2008 | Kuznetsov |
| 2008/0305780 A1 | 12/2008 | Williams et al. |
| 2008/0309468 A1 | 12/2008 | Greene et al. |
| 2008/0316463 A1 | 12/2008 | Okada et al. |
| 2008/0319602 A1 | 12/2008 | McClellan et al. |
| 2008/0320421 A1 | 12/2008 | Demaris et al. |
| 2009/0006525 A1 | 1/2009 | Moore |
| 2009/0024419 A1 | 1/2009 | McClellan et al. |
| 2009/0029826 A1 | 1/2009 | Eguchi et al. |
| 2009/0036090 A1 | 2/2009 | Cho et al. |
| 2009/0037719 A1 | 2/2009 | Sakthikumar et al. |
| 2009/0040026 A1 | 2/2009 | Tanaka |
| 2009/0055178 A1 | 2/2009 | Coon |
| 2009/0082951 A1 | 3/2009 | Graessley |
| 2009/0099720 A1 | 4/2009 | Elgali |
| 2009/0112393 A1 | 4/2009 | Maten et al. |
| 2009/0112452 A1 | 4/2009 | Buck et al. |
| 2009/0119657 A1 | 5/2009 | Link, II |
| 2009/0125174 A1 | 5/2009 | Delean |
| 2009/0132294 A1 | 5/2009 | Haines |
| 2009/0138336 A1 | 5/2009 | Ashley et al. |
| 2009/0144622 A1 | 6/2009 | Evans et al. |
| 2009/0157312 A1 | 6/2009 | Black et al. |
| 2009/0158200 A1 | 6/2009 | Palahnuk et al. |
| 2009/0180668 A1 | 7/2009 | Jones et al. |
| 2009/0189373 A1 | 7/2009 | Schramm et al. |
| 2009/0189979 A1 | 7/2009 | Smyth |
| 2009/0195370 A1 | 8/2009 | Huffman et al. |
| 2009/0208109 A1 | 8/2009 | Kakinami et al. |
| 2009/0210257 A1 | 8/2009 | Chalfant et al. |
| 2009/0216935 A1 | 8/2009 | Flick |
| 2009/0222200 A1 | 9/2009 | Link et al. |
| 2009/0224931 A1 | 9/2009 | Dietz et al. |
| 2009/0224942 A1 | 9/2009 | Goudy et al. |
| 2009/0234578 A1 | 9/2009 | Newby et al. |
| 2009/0240647 A1 | 9/2009 | Green et al. |
| 2009/0241883 A1 | 10/2009 | Nagoshi et al. |
| 2009/0254446 A1 | 10/2009 | Chernyak |
| 2009/0264849 A1 | 10/2009 | La Croix |
| 2009/0275321 A1 | 11/2009 | Crowe |
| 2009/0276149 A1 | 11/2009 | Kauffman et al. |
| 2009/0278750 A1 | 11/2009 | Man et al. |
| 2009/0278915 A1 | 11/2009 | Kramer et al. |
| 2009/0279839 A1 | 11/2009 | Nakamura et al. |
| 2009/0284359 A1 | 11/2009 | Huang et al. |
| 2009/0287405 A1 | 11/2009 | Liu et al. |
| 2009/0299572 A1 | 12/2009 | Fujikawa et al. |
| 2009/0312998 A1 | 12/2009 | Berckmans et al. |
| 2009/0319181 A1 | 12/2009 | Khosravy et al. |
| 2010/0008053 A1 | 1/2010 | Osternack et al. |
| 2010/0017249 A1 | 1/2010 | Fincham et al. |
| 2010/0023204 A1 | 1/2010 | Basir et al. |
| 2010/0035620 A1 | 2/2010 | Naden et al. |
| 2010/0036560 A1 | 2/2010 | Wright et al. |
| 2010/0042498 A1 | 2/2010 | Schalk |
| 2010/0045482 A1 | 2/2010 | Strauss |
| 2010/0052945 A1 | 3/2010 | Breed |
| 2010/0057337 A1 | 3/2010 | Fuchs |
| 2010/0066498 A1 | 3/2010 | Fenton |
| 2010/0069115 A1 | 3/2010 | Liu |
| 2010/0070338 A1 | 3/2010 | Siotia et al. |
| 2010/0077094 A1 | 3/2010 | Howarter et al. |
| 2010/0087987 A1 | 4/2010 | Huang et al. |
| 2010/0090817 A1 | 4/2010 | Yamaguchi et al. |

(56) References Cited

U.S. PATENT DOCUMENTS

| | | |
|---|---|---|
| 2010/0097178 A1 | 4/2010 | Pisz et al. |
| 2010/0097239 A1 | 4/2010 | Campbell et al. |
| 2010/0097458 A1 | 4/2010 | Zhang et al. |
| 2010/0106344 A1 | 4/2010 | Edwards et al. |
| 2010/0106356 A1 | 4/2010 | Trepagnier et al. |
| 2010/0106418 A1 | 4/2010 | Kindo et al. |
| 2010/0118025 A1 | 5/2010 | Smith et al. |
| 2010/0121570 A1 | 5/2010 | Tokue et al. |
| 2010/0121645 A1 | 5/2010 | Seitz et al. |
| 2010/0125387 A1 | 5/2010 | Sehyun et al. |
| 2010/0125405 A1 | 5/2010 | Chae et al. |
| 2010/0125811 A1 | 5/2010 | Moore et al. |
| 2010/0127847 A1 | 5/2010 | Evans et al. |
| 2010/0131300 A1 | 5/2010 | Collopy et al. |
| 2010/0134958 A1 | 6/2010 | Disaverio et al. |
| 2010/0136944 A1 | 6/2010 | Taylor et al. |
| 2010/0137037 A1 | 6/2010 | Basir |
| 2010/0144284 A1 | 6/2010 | Chutorash et al. |
| 2010/0145700 A1 | 6/2010 | Kennewick et al. |
| 2010/0145987 A1 | 6/2010 | Harper et al. |
| 2010/0152976 A1 | 6/2010 | White et al. |
| 2010/0169432 A1 | 7/2010 | Santori et al. |
| 2010/0174474 A1 | 7/2010 | Nagase |
| 2010/0179712 A1 | 7/2010 | Pepitone et al. |
| 2010/0185341 A1 | 7/2010 | Wilson et al. |
| 2010/0188831 A1 | 7/2010 | Ortel |
| 2010/0197359 A1 | 8/2010 | Harris |
| 2010/0202346 A1 | 8/2010 | Sitzes et al. |
| 2010/0211259 A1 | 8/2010 | McClellan |
| 2010/0211282 A1 | 8/2010 | Nakata et al. |
| 2010/0211300 A1 | 8/2010 | Jaffe et al. |
| 2010/0211304 A1 | 8/2010 | Hwang et al. |
| 2010/0211441 A1 | 8/2010 | Sprigg et al. |
| 2010/0217458 A1 | 8/2010 | Schweiger et al. |
| 2010/0220141 A1 | 9/2010 | Ozawa |
| 2010/0222939 A1 | 9/2010 | Namburu et al. |
| 2010/0228404 A1 | 9/2010 | Link et al. |
| 2010/0234071 A1 | 9/2010 | Shabtay et al. |
| 2010/0235042 A1 | 9/2010 | Ying |
| 2010/0235129 A1 | 9/2010 | Sharma et al. |
| 2010/0235744 A1 | 9/2010 | Schultz |
| 2010/0235891 A1 | 9/2010 | Oglesbee et al. |
| 2010/0250071 A1 | 9/2010 | Pala et al. |
| 2010/0253493 A1 | 10/2010 | Szczerba et al. |
| 2010/0256836 A1 | 10/2010 | Mudalige |
| 2010/0265104 A1 | 10/2010 | Zlojutro |
| 2010/0268426 A1 | 10/2010 | Pathak et al. |
| 2010/0274410 A1 | 10/2010 | Tsien et al. |
| 2010/0274449 A1 | 10/2010 | Yonak et al. |
| 2010/0275829 A1 | 11/2010 | Sporsheim |
| 2010/0280751 A1 | 11/2010 | Breed |
| 2010/0287303 A1 | 11/2010 | Smith et al. |
| 2010/0289632 A1 | 11/2010 | Seder et al. |
| 2010/0289643 A1 | 11/2010 | Trundle et al. |
| 2010/0291427 A1 | 11/2010 | Zhou |
| 2010/0292544 A1 | 11/2010 | Sherman et al. |
| 2010/0295676 A1 | 11/2010 | Khachaturov et al. |
| 2010/0302528 A1 | 12/2010 | Hall |
| 2010/0304640 A1 | 12/2010 | Sofman et al. |
| 2010/0305807 A1 | 12/2010 | Basir et al. |
| 2010/0306080 A1 | 12/2010 | Trandal et al. |
| 2010/0306309 A1 | 12/2010 | Santori et al. |
| 2010/0306435 A1 | 12/2010 | Nigoghosian et al. |
| 2010/0315218 A1 | 12/2010 | Cades et al. |
| 2010/0321151 A1 | 12/2010 | Matsuura et al. |
| 2010/0325626 A1 | 12/2010 | Greschler et al. |
| 2010/0332130 A1 | 12/2010 | Shimizu et al. |
| 2011/0015853 A1 | 1/2011 | DeKock et al. |
| 2011/0021213 A1 | 1/2011 | Carr |
| 2011/0021234 A1 | 1/2011 | Tibbits et al. |
| 2011/0028138 A1 | 2/2011 | Davies-Moore et al. |
| 2011/0029235 A1 | 2/2011 | Berry |
| 2011/0035098 A1 | 2/2011 | Goto et al. |
| 2011/0035141 A1 | 2/2011 | Barker et al. |
| 2011/0040438 A1 | 2/2011 | Kluge et al. |
| 2011/0050589 A1 | 3/2011 | Yan et al. |
| 2011/0053506 A1 | 3/2011 | Lemke et al. |
| 2011/0057813 A1* | 3/2011 | Toledo ............ B60T 7/22 340/932.2 |
| 2011/0077808 A1 | 3/2011 | Hyde et al. |
| 2011/0078024 A1 | 3/2011 | Messier et al. |
| 2011/0080282 A1 | 4/2011 | Kleve et al. |
| 2011/0082615 A1 | 4/2011 | Small et al. |
| 2011/0084824 A1 | 4/2011 | Tewari et al. |
| 2011/0090078 A1 | 4/2011 | Kim et al. |
| 2011/0092159 A1 | 4/2011 | Park et al. |
| 2011/0093154 A1 | 4/2011 | Moinzadeh et al. |
| 2011/0093158 A1 | 4/2011 | Theisen et al. |
| 2011/0093438 A1 | 4/2011 | Poulsen |
| 2011/0093846 A1 | 4/2011 | Moinzadeh et al. |
| 2011/0105097 A1 | 5/2011 | Tadayon et al. |
| 2011/0106375 A1 | 5/2011 | Sundaram et al. |
| 2011/0112717 A1 | 5/2011 | Resner |
| 2011/0112969 A1 | 5/2011 | Zaid et al. |
| 2011/0117933 A1 | 5/2011 | Andersson |
| 2011/0119344 A1 | 5/2011 | Eustis |
| 2011/0122729 A1 | 5/2011 | Hu et al. |
| 2011/0130111 A1 | 6/2011 | Crandall et al. |
| 2011/0130915 A1 | 6/2011 | Wright et al. |
| 2011/0134749 A1 | 6/2011 | Speks et al. |
| 2011/0137520 A1 | 6/2011 | Rector et al. |
| 2011/0145331 A1 | 6/2011 | Christie et al. |
| 2011/0172873 A1 | 7/2011 | Szwabowski et al. |
| 2011/0175754 A1 | 7/2011 | Karpinsky |
| 2011/0183658 A1 | 7/2011 | Zellner |
| 2011/0187520 A1 | 8/2011 | Filev et al. |
| 2011/0193707 A1 | 8/2011 | Ngo |
| 2011/0193726 A1 | 8/2011 | Szwabowski et al. |
| 2011/0195699 A1 | 8/2011 | Tadayon et al. |
| 2011/0197187 A1 | 8/2011 | Roh |
| 2011/0199199 A1 | 8/2011 | Perkins |
| 2011/0205047 A1 | 8/2011 | Patel et al. |
| 2011/0209079 A1 | 8/2011 | Tarte et al. |
| 2011/0210867 A1 | 9/2011 | Benedikt |
| 2011/0216304 A1 | 9/2011 | Hall |
| 2011/0221656 A1 | 9/2011 | Haddick et al. |
| 2011/0224865 A1 | 9/2011 | Gordon et al. |
| 2011/0224898 A1 | 9/2011 | Scofield et al. |
| 2011/0225527 A1 | 9/2011 | Law et al. |
| 2011/0227757 A1 | 9/2011 | Chen et al. |
| 2011/0231091 A1 | 9/2011 | Gourlay et al. |
| 2011/0234369 A1 | 9/2011 | Cai et al. |
| 2011/0241862 A1 | 10/2011 | Debouk et al. |
| 2011/0245999 A1 | 10/2011 | Kordonowy |
| 2011/0246210 A1 | 10/2011 | Matsur |
| 2011/0247013 A1 | 10/2011 | Feller et al. |
| 2011/0251734 A1 | 10/2011 | Schepp et al. |
| 2011/0255070 A1 | 10/2011 | Phillips et al. |
| 2011/0257973 A1 | 10/2011 | Chutorash et al. |
| 2011/0267204 A1 | 11/2011 | Chuang et al. |
| 2011/0267205 A1 | 11/2011 | McClellan et al. |
| 2011/0286676 A1 | 11/2011 | El Dokor |
| 2011/0288684 A1 | 11/2011 | Farlow et al. |
| 2011/0291886 A1 | 12/2011 | Krieter |
| 2011/0291926 A1 | 12/2011 | Gokturk et al. |
| 2011/0298808 A1 | 12/2011 | Rovik |
| 2011/0301844 A1 | 12/2011 | Aono |
| 2011/0307354 A1 | 12/2011 | Erman et al. |
| 2011/0307570 A1 | 12/2011 | Speks |
| 2011/0309926 A1 | 12/2011 | Eikelenberg et al. |
| 2011/0309953 A1 | 12/2011 | Petite et al. |
| 2011/0313653 A1 | 12/2011 | Lindner |
| 2011/0320089 A1 | 12/2011 | Lewis |
| 2012/0006610 A1 | 1/2012 | Wallace et al. |
| 2012/0010807 A1 | 1/2012 | Zhou |
| 2012/0016581 A1 | 1/2012 | Mochizuki et al. |
| 2012/0029852 A1 | 2/2012 | Goff et al. |
| 2012/0030002 A1 | 2/2012 | Bous et al. |
| 2012/0030512 A1 | 2/2012 | Wadhwa et al. |
| 2012/0035846 A1 | 2/2012 | Sakamoto et al. |
| 2012/0038489 A1 | 2/2012 | Goldshmidt |
| 2012/0044043 A1 | 2/2012 | Nettleton et al. |
| 2012/0046818 A1 | 2/2012 | Nettleton et al. |
| 2012/0046822 A1 | 2/2012 | Anderson |

(56) References Cited

U.S. PATENT DOCUMENTS

| | | |
|---|---|---|
| 2012/0046927 A1 | 2/2012 | Nettleton et al. |
| 2012/0046983 A1 | 2/2012 | Nettleton et al. |
| 2012/0047530 A1 | 2/2012 | Shkedi |
| 2012/0053703 A1 | 3/2012 | Nettleton et al. |
| 2012/0053775 A1 | 3/2012 | Nettleton et al. |
| 2012/0053793 A1 | 3/2012 | Sala et al. |
| 2012/0053888 A1 | 3/2012 | Stahlin et al. |
| 2012/0059789 A1 | 3/2012 | Sakai et al. |
| 2012/0065815 A1 | 3/2012 | Hess |
| 2012/0065834 A1 | 3/2012 | Senart |
| 2012/0068956 A1 | 3/2012 | Jira et al. |
| 2012/0071097 A1 | 3/2012 | Matsushita et al. |
| 2012/0072244 A1 | 3/2012 | Collins et al. |
| 2012/0074770 A1 | 3/2012 | Lee |
| 2012/0083960 A1 | 4/2012 | Zhu et al. |
| 2012/0083971 A1 | 4/2012 | Preston |
| 2012/0084773 A1 | 4/2012 | Lee et al. |
| 2012/0089299 A1 | 4/2012 | Breed |
| 2012/0092251 A1 | 4/2012 | Hashimoto et al. |
| 2012/0101876 A1 | 4/2012 | Truvey et al. |
| 2012/0101914 A1 | 4/2012 | Kumar et al. |
| 2012/0105613 A1 | 5/2012 | Weng et al. |
| 2012/0106114 A1 | 5/2012 | Caron et al. |
| 2012/0109446 A1 | 5/2012 | Yousefi et al. |
| 2012/0110356 A1 | 5/2012 | Yousefi et al. |
| 2012/0113822 A1 | 5/2012 | Letner |
| 2012/0115446 A1 | 5/2012 | Guatama et al. |
| 2012/0116609 A1 | 5/2012 | Jung et al. |
| 2012/0116678 A1 | 5/2012 | Witmer |
| 2012/0116696 A1 | 5/2012 | Wank |
| 2012/0136561 A1 | 5/2012 | Barker et al. |
| 2012/0146766 A1 | 6/2012 | Geisler et al. |
| 2012/0146809 A1 | 6/2012 | Oh et al. |
| 2012/0149341 A1 | 6/2012 | Tadayon et al. |
| 2012/0150651 A1 | 6/2012 | Hoffberg et al. |
| 2012/0155636 A1 | 6/2012 | Muthaiah |
| 2012/0158436 A1 | 6/2012 | Bauer et al. |
| 2012/0163670 A1 | 6/2012 | Eaton et al. |
| 2012/0173900 A1 | 7/2012 | Diab et al. |
| 2012/0173905 A1 | 7/2012 | Diab et al. |
| 2012/0179325 A1 | 7/2012 | Faenger |
| 2012/0179547 A1 | 7/2012 | Besore et al. |
| 2012/0188876 A1 | 7/2012 | Chow et al. |
| 2012/0193153 A1 | 8/2012 | Wellborn et al. |
| 2012/0197523 A1 | 8/2012 | Kirsch |
| 2012/0197669 A1 | 8/2012 | Kote et al. |
| 2012/0204166 A1 | 8/2012 | Ichihara |
| 2012/0210160 A1 | 8/2012 | Fuhrman |
| 2012/0215375 A1 | 8/2012 | Chang |
| 2012/0217928 A1 | 8/2012 | Kulidjian |
| 2012/0218125 A1 | 8/2012 | Demirdjian et al. |
| 2012/0226391 A1 | 9/2012 | Fryer et al. |
| 2012/0226413 A1 | 9/2012 | Chen et al. |
| 2012/0238286 A1 | 9/2012 | Mallavarapu et al. |
| 2012/0239242 A1 | 9/2012 | Uehara |
| 2012/0242510 A1 | 9/2012 | Choi et al. |
| 2012/0254763 A1 | 10/2012 | Protopapas et al. |
| 2012/0254804 A1 | 10/2012 | Shema et al. |
| 2012/0256448 A1 | 10/2012 | Yasui et al. |
| 2012/0259951 A1 | 10/2012 | Schalk et al. |
| 2012/0265359 A1 | 10/2012 | Das |
| 2012/0274459 A1 | 11/2012 | Jaisimha et al. |
| 2012/0274481 A1 | 11/2012 | Ginsberg et al. |
| 2012/0284292 A1 | 11/2012 | Rechsteiner et al. |
| 2012/0289217 A1 | 11/2012 | Reimer et al. |
| 2012/0289253 A1 | 11/2012 | Haag et al. |
| 2012/0296567 A1 | 11/2012 | Breed |
| 2012/0310465 A1 | 12/2012 | Boatright et al. |
| 2012/0313771 A1 | 12/2012 | Wottlifff, III |
| 2012/0316720 A1 | 12/2012 | Hyde et al. |
| 2012/0317561 A1 | 12/2012 | Aslam et al. |
| 2012/0323413 A1 | 12/2012 | Kedar-Dongarkar et al. |
| 2012/0327231 A1 | 12/2012 | Cochran et al. |
| 2013/0005414 A1 | 1/2013 | Bindra et al. |
| 2013/0006451 A1 | 1/2013 | Cooper et al. |
| 2013/0013157 A1 | 1/2013 | Kim et al. |
| 2013/0019252 A1 | 1/2013 | Haase et al. |
| 2013/0024060 A1 | 1/2013 | Sukkarie et al. |
| 2013/0030645 A1 | 1/2013 | Divine et al. |
| 2013/0030811 A1 | 1/2013 | Olleon et al. |
| 2013/0031540 A1 | 1/2013 | Throop et al. |
| 2013/0031541 A1 | 1/2013 | Wilks et al. |
| 2013/0035063 A1 | 2/2013 | Fisk et al. |
| 2013/0046421 A1 | 2/2013 | El Fassi et al. |
| 2013/0046624 A1 | 2/2013 | Calman |
| 2013/0050069 A1 | 2/2013 | Ota |
| 2013/0054133 A1 | 2/2013 | Lewis et al. |
| 2013/0055096 A1 | 2/2013 | Kim et al. |
| 2013/0059607 A1 | 3/2013 | Herz et al. |
| 2013/0060412 A1 | 3/2013 | Nakagawara et al. |
| 2013/0063336 A1 | 3/2013 | Sugimoto et al. |
| 2013/0066512 A1 | 3/2013 | Willard et al. |
| 2013/0067599 A1 | 3/2013 | Raje et al. |
| 2013/0075530 A1 | 3/2013 | Shander et al. |
| 2013/0079964 A1 | 3/2013 | Sukkarie et al. |
| 2013/0083805 A1 | 4/2013 | Lu et al. |
| 2013/0085787 A1 | 4/2013 | Gore et al. |
| 2013/0086164 A1 | 4/2013 | Wheeler et al. |
| 2013/0099915 A1 | 4/2013 | Prasad et al. |
| 2013/0103196 A1 | 4/2013 | Monceaux et al. |
| 2013/0116882 A1 | 5/2013 | Link et al. |
| 2013/0116915 A1 | 5/2013 | Ferreira et al. |
| 2013/0131908 A1 | 5/2013 | Trepagnier et al. |
| 2013/0134730 A1 | 5/2013 | Ricci |
| 2013/0135118 A1 | 5/2013 | Ricci |
| 2013/0138591 A1 | 5/2013 | Ricci |
| 2013/0138714 A1 | 5/2013 | Ricci |
| 2013/0139140 A1 | 5/2013 | Rao et al. |
| 2013/0141247 A1 | 6/2013 | Ricci |
| 2013/0141252 A1 | 6/2013 | Ricci |
| 2013/0143495 A1 | 6/2013 | Ricci |
| 2013/0143546 A1 | 6/2013 | Ricci |
| 2013/0143601 A1 | 6/2013 | Ricci |
| 2013/0144459 A1 | 6/2013 | Ricci |
| 2013/0144460 A1 | 6/2013 | Ricci |
| 2013/0144461 A1 | 6/2013 | Ricci |
| 2013/0144462 A1 | 6/2013 | Ricci |
| 2013/0144463 A1 | 6/2013 | Ricci et al. |
| 2013/0144469 A1 | 6/2013 | Ricci |
| 2013/0144470 A1 | 6/2013 | Ricci |
| 2013/0144474 A1 | 6/2013 | Ricci |
| 2013/0144476 A1 | 6/2013 | Pinot et al. |
| 2013/0144486 A1 | 6/2013 | Ricci |
| 2013/0144520 A1 | 6/2013 | Ricci |
| 2013/0144657 A1 | 6/2013 | Ricci |
| 2013/0145065 A1 | 6/2013 | Ricci |
| 2013/0145279 A1 | 6/2013 | Ricci |
| 2013/0145297 A1 | 6/2013 | Ricci et al. |
| 2013/0145360 A1 | 6/2013 | Ricci |
| 2013/0145401 A1 | 6/2013 | Ricci |
| 2013/0145482 A1 | 6/2013 | Ricci et al. |
| 2013/0147638 A1 | 6/2013 | Ricci |
| 2013/0151031 A1 | 6/2013 | Ricci |
| 2013/0151065 A1 | 6/2013 | Ricci |
| 2013/0151088 A1 | 6/2013 | Ricci |
| 2013/0151288 A1 | 6/2013 | Bowne et al. |
| 2013/0152003 A1 | 6/2013 | Ricci et al. |
| 2013/0154298 A1 | 6/2013 | Ricci |
| 2013/0157640 A1 | 6/2013 | Aycock |
| 2013/0157647 A1 | 6/2013 | Kolodziej |
| 2013/0158821 A1 | 6/2013 | Ricci |
| 2013/0166096 A1 | 6/2013 | Jotanovic |
| 2013/0166097 A1 | 6/2013 | Ricci |
| 2013/0166098 A1 | 6/2013 | Lavie et al. |
| 2013/0166152 A1 | 6/2013 | Butterworth |
| 2013/0166208 A1 | 6/2013 | Forstall et al. |
| 2013/0167159 A1 | 6/2013 | Ricci et al. |
| 2013/0173531 A1 | 7/2013 | Rinearson et al. |
| 2013/0179689 A1 | 7/2013 | Matsumoto et al. |
| 2013/0190978 A1 | 7/2013 | Kato et al. |
| 2013/0194108 A1 | 8/2013 | Lapiotis et al. |
| 2013/0197796 A1 | 8/2013 | Obradovich et al. |
| 2013/0198031 A1 | 8/2013 | Mitchell et al. |
| 2013/0198737 A1 | 8/2013 | Ricci |

(56) References Cited

U.S. PATENT DOCUMENTS

| | | |
|---|---|---|
| 2013/0198802 A1 | 8/2013 | Ricci |
| 2013/0200991 A1 | 8/2013 | Ricci et al. |
| 2013/0203400 A1 | 8/2013 | Ricci |
| 2013/0204455 A1 | 8/2013 | Chia et al. |
| 2013/0204457 A1 | 8/2013 | King |
| 2013/0204466 A1 | 8/2013 | Ricci |
| 2013/0204484 A1 | 8/2013 | Ricci |
| 2013/0204493 A1 | 8/2013 | Ricci et al. |
| 2013/0204943 A1 | 8/2013 | Ricci |
| 2013/0205026 A1 | 8/2013 | Ricci |
| 2013/0205412 A1 | 8/2013 | Ricci |
| 2013/0207794 A1 | 8/2013 | Patel et al. |
| 2013/0212065 A1 | 8/2013 | Rahnama |
| 2013/0212659 A1 | 8/2013 | Maher et al. |
| 2013/0215116 A1 | 8/2013 | Siddique et al. |
| 2013/0218412 A1 | 8/2013 | Ricci |
| 2013/0218445 A1 | 8/2013 | Basir |
| 2013/0219039 A1 | 8/2013 | Ricci |
| 2013/0226365 A1 | 8/2013 | Brozovich |
| 2013/0226371 A1 | 8/2013 | Rovik et al. |
| 2013/0226392 A1 | 8/2013 | Schneider et al. |
| 2013/0226449 A1 | 8/2013 | Rovik et al. |
| 2013/0226622 A1 | 8/2013 | Adamson et al. |
| 2013/0227648 A1 | 8/2013 | Ricci |
| 2013/0231784 A1 | 9/2013 | Rovik et al. |
| 2013/0231800 A1 | 9/2013 | Ricci |
| 2013/0232142 A1 | 9/2013 | Nielsen et al. |
| 2013/0238165 A1 | 9/2013 | Garrett et al. |
| 2013/0241720 A1 | 9/2013 | Ricci et al. |
| 2013/0245877 A1 | 9/2013 | Ferguson et al. |
| 2013/0245882 A1 | 9/2013 | Ricci |
| 2013/0246301 A1 | 9/2013 | Radhakrishnan et al. |
| 2013/0250933 A1 | 9/2013 | Yousefi et al. |
| 2013/0261871 A1 | 10/2013 | Hobbs et al. |
| 2013/0261966 A1 | 10/2013 | Wang et al. |
| 2013/0268138 A1 | 10/2013 | Moughler et al. |
| 2013/0273968 A1 | 10/2013 | Rhoads et al. |
| 2013/0274997 A1 | 10/2013 | Chien |
| 2013/0279111 A1 | 10/2013 | Lee |
| 2013/0279491 A1 | 10/2013 | Rubin et al. |
| 2013/0282238 A1 | 10/2013 | Ricci et al. |
| 2013/0282357 A1 | 10/2013 | Rubin et al. |
| 2013/0282946 A1 | 10/2013 | Ricci |
| 2013/0288606 A1 | 10/2013 | Kirsch |
| 2013/0293364 A1 | 11/2013 | Ricci et al. |
| 2013/0293452 A1 | 11/2013 | Ricci et al. |
| 2013/0293480 A1 | 11/2013 | Kritt et al. |
| 2013/0295901 A1 | 11/2013 | Abramson et al. |
| 2013/0295908 A1 | 11/2013 | Zeinstra et al. |
| 2013/0295913 A1 | 11/2013 | Matthews et al. |
| 2013/0300554 A1 | 11/2013 | Braden |
| 2013/0301584 A1 | 11/2013 | Addepalli et al. |
| 2013/0304371 A1 | 11/2013 | Kitatani et al. |
| 2013/0308265 A1 | 11/2013 | Arnouse |
| 2013/0309977 A1 | 11/2013 | Heines et al. |
| 2013/0311038 A1 | 11/2013 | Kim et al. |
| 2013/0325453 A1 | 12/2013 | Levien et al. |
| 2013/0325568 A1 | 12/2013 | Mangalvedkar et al. |
| 2013/0329372 A1 | 12/2013 | Wilkins |
| 2013/0332023 A1 | 12/2013 | Bertosa et al. |
| 2013/0338914 A1 | 12/2013 | Weiss |
| 2013/0339027 A1 | 12/2013 | Dokor et al. |
| 2013/0343071 A1 | 12/2013 | Nagaoka et al. |
| 2013/0345929 A1 | 12/2013 | Bowden et al. |
| 2014/0028542 A1 | 1/2014 | Lovitt et al. |
| 2014/0032012 A1 | 1/2014 | Joshi et al. |
| 2014/0032014 A1 | 1/2014 | DeBiasio et al. |
| 2014/0032049 A1 | 1/2014 | Moshchuk et al. |
| 2014/0054957 A1 | 2/2014 | Bellis |
| 2014/0058672 A1 | 2/2014 | Wansley et al. |
| 2014/0066014 A1 | 3/2014 | Nicholson et al. |
| 2014/0067201 A1 | 3/2014 | Visintainer et al. |
| 2014/0067564 A1 | 3/2014 | Yuan |
| 2014/0070917 A1 | 3/2014 | Protopapas |
| 2014/0081544 A1 | 3/2014 | Fry |
| 2014/0088798 A1 | 3/2014 | Himmelstein |
| 2014/0088855 A1 | 3/2014 | Ferguson |
| 2014/0096068 A1 | 4/2014 | Dewan et al. |
| 2014/0097955 A1 | 4/2014 | Lovitt et al. |
| 2014/0109075 A1 | 4/2014 | Hoffman et al. |
| 2014/0109080 A1 | 4/2014 | Ricci |
| 2014/0120829 A1 | 5/2014 | Bhamidipati et al. |
| 2014/0121862 A1 | 5/2014 | Zarrella et al. |
| 2014/0125802 A1 | 5/2014 | Beckert et al. |
| 2014/0129135 A1 | 5/2014 | Holden et al. |
| 2014/0129302 A1 | 5/2014 | Amin et al. |
| 2014/0129951 A1 | 5/2014 | Amin et al. |
| 2014/0132407 A1 | 5/2014 | Kumai et al. |
| 2014/0142830 A1 | 5/2014 | Bernzen et al. |
| 2014/0143839 A1 | 5/2014 | Ricci |
| 2014/0164611 A1 | 6/2014 | Molettiere et al. |
| 2014/0168062 A1 | 6/2014 | Katz et al. |
| 2014/0168436 A1 | 6/2014 | Pedicino |
| 2014/0169621 A1 | 6/2014 | Burr |
| 2014/0171752 A1 | 6/2014 | Park et al. |
| 2014/0172727 A1 | 6/2014 | Abhyanker et al. |
| 2014/0180523 A1* | 6/2014 | Reichel ............... B62D 15/0285 701/23 |
| 2014/0185880 A1 | 7/2014 | Fairfield et al. |
| 2014/0188343 A1 | 7/2014 | Yoshimura et al. |
| 2014/0188347 A1 | 7/2014 | Tabe |
| 2014/0188533 A1 | 7/2014 | Davidson |
| 2014/0195272 A1 | 7/2014 | Sadiq et al. |
| 2014/0198216 A1 | 7/2014 | Zhai et al. |
| 2014/0200737 A1 | 7/2014 | Lortz et al. |
| 2014/0207328 A1 | 7/2014 | Wolf et al. |
| 2014/0210646 A1 | 7/2014 | Subramanya |
| 2014/0214255 A1 | 7/2014 | Dolgov et al. |
| 2014/0214260 A1 | 7/2014 | Eckert et al. |
| 2014/0218527 A1 | 8/2014 | Subramanya |
| 2014/0220966 A1 | 8/2014 | Muetzel et al. |
| 2014/0222298 A1 | 8/2014 | Gurin |
| 2014/0223384 A1 | 8/2014 | Graumann |
| 2014/0240089 A1 | 8/2014 | Chang |
| 2014/0244078 A1 | 8/2014 | Downey et al. |
| 2014/0244111 A1 | 8/2014 | Gross et al. |
| 2014/0244151 A1 | 8/2014 | Matsubara et al. |
| 2014/0244156 A1 | 8/2014 | Magnusson et al. |
| 2014/0245277 A1 | 8/2014 | Petro et al. |
| 2014/0245278 A1 | 8/2014 | Zellen |
| 2014/0245284 A1 | 8/2014 | Alrabady et al. |
| 2014/0252091 A1 | 9/2014 | Morse et al. |
| 2014/0257627 A1 | 9/2014 | Hagan, Jr. |
| 2014/0257661 A1 | 9/2014 | Schulman et al. |
| 2014/0267035 A1 | 9/2014 | Schalk et al. |
| 2014/0277936 A1 | 9/2014 | El Dokor et al. |
| 2014/0278070 A1 | 9/2014 | McGavran et al. |
| 2014/0278071 A1 | 9/2014 | San Filippo et al. |
| 2014/0281971 A1 | 9/2014 | Isbell, III et al. |
| 2014/0282161 A1 | 9/2014 | Cash |
| 2014/0282278 A1 | 9/2014 | Anderson et al. |
| 2014/0282470 A1 | 9/2014 | Buga et al. |
| 2014/0282931 A1 | 9/2014 | Protopapas |
| 2014/0292545 A1 | 10/2014 | Nemoto |
| 2014/0292665 A1 | 10/2014 | Lathrop et al. |
| 2014/0297182 A1 | 10/2014 | Casson et al. |
| 2014/0303827 A1 | 10/2014 | Dolgov et al. |
| 2014/0303899 A1 | 10/2014 | Fung |
| 2014/0306799 A1 | 10/2014 | Ricci |
| 2014/0306814 A1 | 10/2014 | Ricci |
| 2014/0306817 A1 | 10/2014 | Ricci |
| 2014/0306826 A1 | 10/2014 | Ricci |
| 2014/0306833 A1 | 10/2014 | Ricci |
| 2014/0306834 A1 | 10/2014 | Ricci |
| 2014/0306835 A1 | 10/2014 | Ricci |
| 2014/0307655 A1 | 10/2014 | Ricci |
| 2014/0307724 A1 | 10/2014 | Ricci |
| 2014/0308902 A1 | 10/2014 | Ricci |
| 2014/0309789 A1 | 10/2014 | Ricci |
| 2014/0309790 A1 | 10/2014 | Ricci |
| 2014/0309804 A1 | 10/2014 | Ricci |
| 2014/0309805 A1 | 10/2014 | Ricci |
| 2014/0309806 A1 | 10/2014 | Ricci |
| 2014/0309813 A1 | 10/2014 | Ricci |

(56) References Cited

U.S. PATENT DOCUMENTS

| | | |
|---|---|---|
| 2014/0309814 A1 | 10/2014 | Ricci et al. |
| 2014/0309815 A1 | 10/2014 | Ricci et al. |
| 2014/0309833 A1 | 10/2014 | Ferguson et al. |
| 2014/0309838 A1 | 10/2014 | Ricci |
| 2014/0309839 A1 | 10/2014 | Ricci et al. |
| 2014/0309847 A1 | 10/2014 | Ricci |
| 2014/0309849 A1 | 10/2014 | Ricci |
| 2014/0309852 A1 | 10/2014 | Ricci |
| 2014/0309853 A1 | 10/2014 | Ricci |
| 2014/0309862 A1 | 10/2014 | Ricci |
| 2014/0309863 A1 | 10/2014 | Ricci |
| 2014/0309864 A1 | 10/2014 | Ricci |
| 2014/0309865 A1 | 10/2014 | Ricci |
| 2014/0309866 A1 | 10/2014 | Ricci |
| 2014/0309867 A1 | 10/2014 | Ricci |
| 2014/0309868 A1 | 10/2014 | Ricci |
| 2014/0309869 A1 | 10/2014 | Ricci |
| 2014/0309870 A1 | 10/2014 | Ricci et al. |
| 2014/0309871 A1 | 10/2014 | Ricci |
| 2014/0309872 A1 | 10/2014 | Ricci |
| 2014/0309873 A1 | 10/2014 | Ricci |
| 2014/0309874 A1 | 10/2014 | Ricci |
| 2014/0309875 A1 | 10/2014 | Ricci |
| 2014/0309876 A1 | 10/2014 | Ricci |
| 2014/0309877 A1 | 10/2014 | Ricci |
| 2014/0309878 A1 | 10/2014 | Ricci |
| 2014/0309879 A1 | 10/2014 | Ricci |
| 2014/0309880 A1 | 10/2014 | Ricci |
| 2014/0309885 A1 | 10/2014 | Ricci |
| 2014/0309886 A1 | 10/2014 | Ricci |
| 2014/0309891 A1 | 10/2014 | Ricci |
| 2014/0309892 A1 | 10/2014 | Ricci |
| 2014/0309893 A1 | 10/2014 | Ricci |
| 2014/0309913 A1 | 10/2014 | Ricci et al. |
| 2014/0309919 A1 | 10/2014 | Ricci |
| 2014/0309920 A1 | 10/2014 | Ricci |
| 2014/0309921 A1 | 10/2014 | Ricci et al. |
| 2014/0309922 A1 | 10/2014 | Ricci |
| 2014/0309923 A1 | 10/2014 | Ricci |
| 2014/0309927 A1 | 10/2014 | Ricci |
| 2014/0309929 A1 | 10/2014 | Ricci |
| 2014/0309930 A1 | 10/2014 | Ricci |
| 2014/0309934 A1 | 10/2014 | Ricci |
| 2014/0309935 A1 | 10/2014 | Ricci |
| 2014/0309982 A1 | 10/2014 | Ricci |
| 2014/0310031 A1 | 10/2014 | Ricci |
| 2014/0310075 A1 | 10/2014 | Ricci |
| 2014/0310103 A1 | 10/2014 | Ricci |
| 2014/0310186 A1 | 10/2014 | Ricci |
| 2014/0310277 A1 | 10/2014 | Ricci |
| 2014/0310379 A1 | 10/2014 | Ricci et al. |
| 2014/0310594 A1 | 10/2014 | Ricci et al. |
| 2014/0310610 A1 | 10/2014 | Ricci |
| 2014/0310702 A1 | 10/2014 | Ricci et al. |
| 2014/0310739 A1 | 10/2014 | Ricci et al. |
| 2014/0310788 A1 | 10/2014 | Ricci |
| 2014/0322676 A1 | 10/2014 | Raman |
| 2014/0333468 A1 | 11/2014 | Zhu et al. |
| 2014/0336935 A1 | 11/2014 | Zhu et al. |
| 2014/0343750 A1 | 11/2014 | Minemura et al. |
| 2014/0347207 A1 | 11/2014 | Zeng et al. |
| 2014/0347265 A1 | 11/2014 | Allen et al. |
| 2014/0350790 A1 | 11/2014 | Akesson et al. |
| 2014/0358353 A1 | 12/2014 | Ibanez-Guzman et al. |
| 2014/0358427 A1 | 12/2014 | Fuhrman |
| 2014/0365228 A1 | 12/2014 | Ng-Thow-Hing et al. |
| 2014/0370911 A1 | 12/2014 | Gorgenyi et al. |
| 2014/0371969 A1 | 12/2014 | Asai et al. |
| 2015/0006005 A1 | 1/2015 | Yu et al. |
| 2015/0007155 A1 | 1/2015 | Hoffman et al. |
| 2015/0012166 A1 | 1/2015 | Hauler et al. |
| 2015/0012186 A1 | 1/2015 | Horseman |
| 2015/0025708 A1 | 1/2015 | Anderson |
| 2015/0032366 A1 | 1/2015 | Man et al. |
| 2015/0032670 A1 | 1/2015 | Brazell |
| 2015/0039157 A1 | 2/2015 | Wolfe et al. |
| 2015/0039167 A1 | 2/2015 | Ideshio et al. |
| 2015/0039391 A1 | 2/2015 | Hershkovitz et al. |
| 2015/0057839 A1 | 2/2015 | Chang et al. |
| 2015/0057871 A1 | 2/2015 | Ono et al. |
| 2015/0061895 A1 | 3/2015 | Ricci |
| 2015/0081133 A1 | 3/2015 | Schulz |
| 2015/0081167 A1 | 3/2015 | Pisz et al. |
| 2015/0088423 A1 | 3/2015 | Tuukkanen |
| 2015/0088515 A1 | 3/2015 | Beaumont et al. |
| 2015/0091374 A1 | 4/2015 | Lenius et al. |
| 2015/0094850 A1 | 4/2015 | Passot et al. |
| 2015/0116200 A1 | 4/2015 | Kurosawa et al. |
| 2015/0127224 A1 | 5/2015 | Tabe |
| 2015/0127239 A1 | 5/2015 | Breed et al. |
| 2015/0131080 A1 | 5/2015 | Retterath et al. |
| 2015/0134185 A1 | 5/2015 | Lee |
| 2015/0149019 A1 | 5/2015 | Pilutti et al. |
| 2015/0149022 A1 | 5/2015 | Harvey |
| 2015/0149088 A1 | 5/2015 | Attard et al. |
| 2015/0154545 A1 | 6/2015 | Skaaksrud et al. |
| 2015/0154546 A1 | 6/2015 | Skaaksrud et al. |
| 2015/0154554 A1 | 6/2015 | Skaaksrud |
| 2015/0154585 A1 | 6/2015 | Skaaksrud |
| 2015/0156253 A1 | 6/2015 | Skaaksrud et al. |
| 2015/0156254 A1 | 6/2015 | Skaaksrud |
| 2015/0156718 A1 | 6/2015 | Skaaksrud |
| 2015/0158499 A1 | 6/2015 | Koravadi |
| 2015/0160024 A1 | 6/2015 | Fowe |
| 2015/0178034 A1 | 6/2015 | Penilla et al. |
| 2015/0178998 A1 | 6/2015 | Attard et al. |
| 2015/0185034 A1 | 7/2015 | Abhyanker |
| 2015/0198445 A1 | 7/2015 | Casson et al. |
| 2015/0234387 A1 | 8/2015 | Mullan et al. |
| 2015/0248131 A1 | 9/2015 | Fairfield et al. |
| 2015/0248689 A1 | 9/2015 | Paul et al. |
| 2015/0254986 A1 | 9/2015 | Fairfield et al. |
| 2015/0258928 A1 | 9/2015 | Goto et al. |
| 2015/0266488 A1 | 9/2015 | Solyom et al. |
| 2015/0268665 A1 | 9/2015 | Ludwick et al. |
| 2015/0271290 A1 | 9/2015 | Tao et al. |
| 2015/0285645 A1 | 10/2015 | Maise et al. |
| 2015/0292894 A1 | 10/2015 | Goddard et al. |
| 2015/0293228 A1 | 10/2015 | Retterath et al. |
| 2015/0298636 A1 | 10/2015 | Furst |
| 2015/0321606 A1 | 11/2015 | Vartanian et al. |
| 2015/0326037 A1 | 11/2015 | Borhan et al. |
| 2015/0331422 A1 | 11/2015 | Hartung et al. |
| 2015/0336502 A1 | 11/2015 | Hillis et al. |
| 2015/0336524 A1 | 11/2015 | Larner et al. |
| 2015/0338226 A1 | 11/2015 | Mason et al. |
| 2015/0338852 A1 | 11/2015 | Ramanujam |
| 2015/0339928 A1 | 11/2015 | Ramanujam |
| 2015/0346727 A1 | 12/2015 | Ramanujam |
| 2015/0348221 A1 | 12/2015 | Pedersen et al. |
| 2015/0356368 A1 | 12/2015 | Liu et al. |
| 2015/0359032 A1 | 12/2015 | Menard et al. |
| 2015/0370251 A1 | 12/2015 | Siegel et al. |
| 2015/0370255 A1 | 12/2015 | Harvey |
| 2015/0375764 A1 | 12/2015 | Rajendran et al. |
| 2016/0008985 A1 | 1/2016 | Kim et al. |
| 2016/0009291 A1 | 1/2016 | Pallett et al. |
| 2016/0016312 A1 | 1/2016 | Lawrence, III et al. |
| 2016/0016315 A1 | 1/2016 | Kuffner, Jr. et al. |
| 2016/0047901 A1 | 2/2016 | Pacala et al. |
| 2016/0070527 A1 | 3/2016 | Ricci |
| 2016/0071278 A1 | 3/2016 | Leonard et al. |
| 2016/0075331 A1 | 3/2016 | Tomozawa et al. |
| 2016/0086391 A1 | 3/2016 | Ricci |
| 2016/0033963 A1 | 4/2016 | Noh |
| 2016/0101811 A1 | 4/2016 | Kyrtsos et al. |
| 2016/0107509 A1 | 4/2016 | Kirsch et al. |
| 2016/0107703 A1 | 4/2016 | Briceno et al. |
| 2016/0129787 A1 | 5/2016 | Netzer |
| 2016/0159402 A1 | 6/2016 | Nakaya et al. |
| 2016/0159407 A1 | 6/2016 | Holmstrom et al. |
| 2016/0167608 A1 | 6/2016 | Rai |
| 2016/0169683 A1 | 6/2016 | Lynch |
| 2016/0171521 A1 | 6/2016 | Ramirez et al. |

(56) References Cited

U.S. PATENT DOCUMENTS

| | | |
|---|---|---|
| 2016/0171637 A1 | 6/2016 | Rai |
| 2016/0171894 A1 | 6/2016 | Harvey |
| 2016/0178381 A1 | 6/2016 | Lynch |
| 2016/0187150 A1 | 6/2016 | Sherman et al. |
| 2016/0189544 A1 | 6/2016 | Ricci |
| 2016/0207454 A1 | 7/2016 | Cuddihy et al. |
| 2016/0209220 A1 | 7/2016 | Laetz |
| 2016/0221186 A1 | 8/2016 | Perrone |
| 2016/0223343 A1 | 8/2016 | Averbuch et al. |
| 2016/0224028 A1 | 8/2016 | Harvey |
| 2016/0229451 A1 | 8/2016 | Raad et al. |
| 2016/0247106 A1 | 8/2016 | Dalloro et al. |
| 2016/0247109 A1 | 8/2016 | Scicluna et al. |
| 2016/0247394 A1 | 8/2016 | Stenneth |
| 2016/0251016 A1 | 9/2016 | Pallett et al. |
| 2016/0265930 A1 | 9/2016 | Thakur |
| 2016/0266581 A1 | 9/2016 | Dolgov et al. |
| 2016/0269456 A1 | 9/2016 | Ricci |
| 2016/0269469 A1 | 9/2016 | Ricci |
| 2016/0274590 A1 | 9/2016 | Harvey |
| 2016/0280258 A1 | 9/2016 | Lavoie et al. |
| 2016/0280267 A1 | 9/2016 | Lavoie et al. |
| 2016/0332573 A1 | 11/2016 | Ignaczak et al. |
| 2016/0334797 A1 | 11/2016 | Ross et al. |
| 2016/0347329 A1 | 12/2016 | Zelman et al. |
| 2016/0355092 A1 | 12/2016 | Higuchi et al. |
| 2016/0362045 A1 | 12/2016 | Vegt et al. |
| 2016/0368492 A1 | 12/2016 | Al-Stouhi |
| 2016/0370194 A1 | 12/2016 | Colijn et al. |
| 2016/0371979 A1 | 12/2016 | Casson et al. |
| 2017/0028966 A1 | 2/2017 | Elie et al. |
| 2017/0030127 A1 | 2/2017 | Elie et al. |
| 2017/0030128 A1 | 2/2017 | Elie et al. |
| 2017/0030134 A1 | 2/2017 | Elie et al. |
| 2017/0030135 A1 | 2/2017 | Elie et al. |
| 2017/0030737 A1 | 2/2017 | Elie et al. |
| 2017/0032599 A1 | 2/2017 | Elie et al. |
| 2017/0060234 A1 | 3/2017 | Sung |
| 2017/0067747 A1 | 3/2017 | Ricci |
| 2017/0075358 A1 | 3/2017 | Zhang |
| 2017/0101089 A1 | 4/2017 | Bales et al. |
| 2017/0120753 A1 | 5/2017 | Kentley |
| 2017/0120803 A1 | 5/2017 | Kentley et al. |
| 2017/0120804 A1 | 5/2017 | Kentley et al. |
| 2017/0120814 A1 | 5/2017 | Kentley et al. |
| 2017/0120902 A1 | 5/2017 | Kentley et al. |
| 2017/0120904 A1 | 5/2017 | Kentley et al. |
| 2017/0123419 A1 | 5/2017 | Levinson et al. |
| 2017/0123421 A1 | 5/2017 | Kentley et al. |
| 2017/0123422 A1 | 5/2017 | Kentley et al. |
| 2017/0123428 A1 | 5/2017 | Levinson et al. |
| 2017/0123429 A1 | 5/2017 | Levinson et al. |
| 2017/0124476 A1 | 5/2017 | Levinson et al. |
| 2017/0124781 A1 | 5/2017 | Levinson et al. |
| 2017/0126810 A1 | 5/2017 | Kentley et al. |
| 2017/0132334 A1 | 5/2017 | Levinson et al. |
| 2017/0132934 A1 | 5/2017 | Kentley et al. |
| 2017/0297625 A1* | 10/2017 | Irion ............... B60W 30/06 |
| 2017/0352082 A1 | 12/2017 | Aziz et al. |
| 2018/0003516 A1* | 1/2018 | Khasis ............ G06Q 10/1097 |
| 2018/0029591 A1 | 2/2018 | Lavoie |
| 2018/0162384 A1* | 6/2018 | Kim ............... B60W 30/06 |
| 2018/0176735 A1* | 6/2018 | Schuller ............ G01C 21/20 |
| 2018/0194344 A1 | 7/2018 | Wang et al. |
| 2018/0237069 A1* | 8/2018 | Gehin ............. B62D 15/0285 |
| 2018/0374002 A1* | 12/2018 | Li ..................... G06Q 10/02 |

FOREIGN PATENT DOCUMENTS

| | | |
|---|---|---|
| CN | 101303878 | 11/2008 |
| CN | 102467827 | 5/2012 |
| DE | 102010038966 | 2/2012 |
| EP | 1223567 | 7/2002 |
| EP | 1484729 | 12/2004 |
| EP | 2192015 | 6/2010 |
| EP | 2410358 | 1/2012 |
| EP | 2524843 | 11/2012 |
| EP | 2549456 | 1/2013 |
| EP | 2626760 | 8/2013 |
| GB | 2460916 | 12/2009 |
| GB | 2520493 | 5/2015 |
| JP | 2004-284450 | 10/2004 |
| JP | 2011248855 | 12/2011 |
| KR | 2006-0128484 | 12/2006 |
| RU | 2269813 | 2/2006 |
| RU | 140935 | 5/2014 |
| WO | WO1993007016 | 4/1993 |
| WO | WO2003073123 | 9/2003 |
| WO | WO 2007/126204 | 11/2007 |
| WO | WO2009151781 | 12/2009 |
| WO | WO2011098848 | 8/2011 |
| WO | WO2011154681 | 12/2011 |
| WO | WO 2012/102879 | 8/2012 |
| WO | WO2012172526 | 12/2012 |
| WO | WO 2013/074866 | 5/2013 |
| WO | WO 2013/074867 | 5/2013 |
| WO | WO 2013/074868 | 5/2013 |
| WO | WO 2013/074897 | 5/2013 |
| WO | WO 2013/074899 | 5/2013 |
| WO | WO 2013/074901 | 5/2013 |
| WO | WO 2013/074919 | 5/2013 |
| WO | WO 2013/074981 | 5/2013 |
| WO | WO 2013/074983 | 5/2013 |
| WO | WO 2013/075005 | 5/2013 |
| WO | WO2013087527 | 6/2013 |
| WO | WO 2013/181310 | 12/2013 |
| WO | WO 2014/014862 | 1/2014 |
| WO | WO2014021961 | 2/2014 |
| WO | WO2014129944 | 8/2014 |
| WO | WO 2014/143563 | 9/2014 |
| WO | WO 2014/158667 | 10/2014 |
| WO | WO 2014/158672 | 10/2014 |
| WO | WO 2014/158766 | 10/2014 |
| WO | WO 2014/172312 | 10/2014 |
| WO | WO 2014/172313 | 10/2014 |
| WO | WO 2014/172316 | 10/2014 |
| WO | WO 2014/172320 | 10/2014 |
| WO | WO 2014/172322 | 10/2014 |
| WO | WO 2014/172323 | 10/2014 |
| WO | WO 2014/172327 | 10/2014 |
| WO | WO2015026471 | 2/2015 |
| WO | WO2015099679 | 7/2015 |
| WO | WO2015134152 | 9/2015 |
| WO | WO2015155133 | 10/2015 |
| WO | WO2015197826 | 12/2015 |
| WO | WO 2016/145073 | 9/2016 |
| WO | WO 2016/145100 | 9/2016 |
| WO | WO 2017/079222 | 5/2017 |
| WO | WO2014079222 | 5/2017 |
| WO | WO2017079219 | 5/2017 |
| WO | WO2017079228 | 5/2017 |
| WO | WO2017079229 | 5/2017 |
| WO | WO2017079289 | 5/2017 |
| WO | WO2017079290 | 5/2017 |
| WO | WO2017079301 | 5/2017 |
| WO | WO2017079304 | 5/2017 |
| WO | WO2017079311 | 5/2017 |
| WO | WO2017079321 | 5/2017 |
| WO | WO2017079332 | 5/2017 |
| WO | WO2017079341 | 5/2017 |
| WO | WO2017079349 | 5/2017 |
| WO | WO2017079460 | 5/2017 |
| WO | WO2017079474 | 5/2017 |

OTHER PUBLICATIONS

Group Induction; Teichman, Alex, Thrun, Sebastian, Proc. of the IEEE/RSJ Intl Conf on Intelligent Robotics and Systems (IROS) (2013).

Automatic Online Calibration of Cameras and Lasers; Levinson, Jesse, Thrun, Sebastian; Robotics: Science and Systems (RSS) (2013).

(56) References Cited

OTHER PUBLICATIONS

Precision Tracking With Sparse 3D and Dense Color 2D Data; Held, David, Levinson, Jesse, Thrun, Sebastian; International Conference on Robotics and Automation (ICRA) (2013).
Online Slam With Any-Time Self-Calibration and Automatic Change Detection; Nima Keivan and Gabe Sibley; IEEE International Conference on Robotics and Automation (ICRA) (2014).
Online, Semi-Supervised Learning for Long-Term Interaction With Object Recognition Systems; Teichman, Alex, Thrun, Sebastian; RSS Workshop on Long-Term Operation of Autonomous Robotic Systems in Changing Environments (2012).
Tracking-Based Semi-Supervised Learning; Teichman, Alex, Thrun, Sebastian; International Journal of Robotics Research (IJRR); http://ijr.sagepub.com/content/31/7/804; (2012).
A Probabilistic Framework for Object Detection in Images Using Context and Scale; Held, David, Levinson, Jesse, Thrun, Sebastian; International Conference on Robotics and Automation (ICRA) (2012).
Practical Object Recognition in Autonomous Driving and Beyond; Teichman, Alex, Thrun, Sebastian, IEEE Workshop on Advanced Robotics and its Social Impacts (ARSO) (2011).
Tracking-Based Semi-Supervised Learning: Teichman, Alex, Thrun, Sebastian; Robotics: Science and Systems (RSS) (2011).
Towards 3D Object Recognition Via Classification of Arbitrary Object Tracks; Teichman, Alex, Levinson, Jesse, Thrun, Sebastian; International Conference on Robotics and Automation (ICRA) (2011).
Towards Fully Autonomous Driving: Systems and Algorithms; Levinson, Jesse et al.; Intelligent Vehicles Symposium (2011).
Traffic Light Mapping, Localization, and State Detection for Autonomous Vehicles; Levinson, Jesse, Askeland, Jake, Dolson, Jennifer, Thrun, Sebastian; International Conference on Robotics and Automization (ICRA) (2011).
Automatic Laser Calibration, Mapping, and Localization for Autonomous Vehicles; Levinson, Jesse; Thesis (Ph D); Stanford University (2011).
Unsupervised Calibration for Multi-Beam Lasers; Levinson, Jesse, Thrun, Sebastian, International Symposium on Experimental Robotics (ISER) (2010).
Robust Vehicle Localization in Urban Environments Using Probabilistic Maps; Levinson, Jesse, Thrun, Sebastian; International Conference on Robotics and Automation (ICRA) (2010).
Exponential Family Sparse Coding With Application to Self-Taught Learning; Honglak, Lee, Raina, Rajat, Teichman, Alex, Ng, Andrew Y.; International Joint Conference on Artificial Intelligence (IJCAI) (2009).
Map-Based Precision Vehicle Localization in Urban Environments; Levinson, Jesse, Thrun, Sebastian; Robotics: Science and Systems (RSS) (2007).
Stanford Autonomous Driving Team website http://driving.stanford.edu/papers.html; Various; Stanford University (2014).
Combining Data-Driven and Model-Based Cues for Segmentation of Video Sequences; Eckes, Christian, Vorbruggen, Jan C.; Proceedings WCNN '96, San Diego, USA (1996).
A Real-Time Motion Planner With Trajectory Optimization for Autonomous Vehicles; Xu, Wenda et al.; Robotics and Automation (ICRA); Saint Paul, MN, USA (2012).
Dynamic Real-Time Replanning in Belief Space: An Experimental Study on Physical Mobile Robots; Agha-mohammadi, Ali-Akbar et al.; Technical Report TR 13-007; Texas A&M University, USA (2013).
An Evaluation of Dynamic Object Tracking With 3D Lidar; Morton P., Douillard, B., Underwood, J.; Proceedings of Australasian Conference on Robotics and Automation; Dec. 7-9, 2011; Melbourne, Australia (2011).
Control of Robotic Mobility-On Demand Systems: A Queuing-Theoretical Perspective; Zhang, Rick; Pavone, Marco; Intl Journal of Robotics Research, pp. 1-18, Stanford, USA (2015).
Evaluation of Urban Vehicle Routing Algorithms; Kong, Linghe et al.; Intl Journal of Digital Content Technology and its Applications (IDCTA); vol. 6, No. 23, University of New Mexico, USA (2012).
Real-Time High Resolution Fusion of Depth Maps on GPU; Trifonov, Dmitry; Intl Conference on Computer-Aided Design and Computer Graphics (CAD/Graphics); Guangzhou, China (2013).
Real-Time Image Segmentation on a GPU; Abramov, Alexey et al.; Facing the Multi-Core Challenge, pp. 131-142, Berlin, Germany (2010).
A Tutorial on Graph-Based Slam; Grisetti, Giorgio et al.; Intelligent Transportation Systems Magazine, IEEE; pp. 31-43 (2010).
Sensor Fusion and Calibration of Inertial Sensors, Vision, Ultra-Wideband and GPS; HOL, Jeroen; Linkoping Studies in Science and Technology, Dissertations No. 1368; Department of Electrical Engineering; Linkoping University, SE-581 83 Linkoping, Sweden (2011).
Large Scale Dense Visual Inertial Slam; Ma, Lu et al.; Field and Service Robotics (FSR) (2015).
Simultaneous Localization, Mapping, and Manipulation for Unsupervised Object Discovery; Ma, Lu et al.; IEEE International Conference on Robotics and Automation (ICRA) (2014).
Office Action for U.S. Appl. No. 14/932,940, dated May 4, 2016, Levinson et al., "Automated Extraction of Semantic Information to Enhance Incremental Mapping Modifications for Robotic Vehicles", 22 pages.
Office Action for U.S. Appl. No. 14/932,952, dated Jun. 24, 2016, Kentley et al., "Resilient Safety System for a Robotic Vehicle", 11 pages.
Easymile (website), Retrieved from <https://web.archive.org/web/20150723060050/http://easymile.com> Jul. 2015, <https://web.archive.org/web/201508012054107/http://easymile.com/mobility-solution/>, Aug. 2015.
Office Action for U.S. Appl. No. 14/932,959, dated Aug. 5, 2016, Kentley et al., "Autonomous Vehicle Fleet Service and System", 16 pages.
Swarming Behavior Using Probabilistic Roadmap Techniques; Bayazit et al., Swarm Robotics WS 2004, LNCS, Springer-Verlag Berlin Heidelberg, pp. 112-125 (2005).
Office Action for U.S. Appl. No. 14/932,963, dated Aug. 15, 2016, Levinson et al., "Adaptive Mapping to Navigate Autonomous Vehicles Responsive to Physical Environment Changes", 15 pages.
Office Action for U.S. Appl. No. 14/756,992, dated Aug. 25, 2016, Levinson et al., "Adaptive Autonomous Vehicle Planner Logic", 9 pages.
Office Action for U.S. Appl. No. 14/933,469, dated Aug. 30, 2016, Kentley et al., "Software Application to Request and Control an Autonomous Vehicle Service", 11 pages.
Monocular Camera Trajectory Optimization Using Lidar Data, Bodensteiner et al., IEEE International Conference on Computer Vision Workshops, 2011, 8 pages.
Office Action for U.S. Appl. No. 14/932,962, dated Mar. 21, 2016, Kentley et al., "Robotic Vehicle Active Safety Systems and Methods", 18 pages.
Office Action for U.S. Appl. No. 14/932,963, dated Mar. 17, 2016, Levinson et al., "Adaptive Mapping to Navigate Autonomous Vehicles Responsive to Physical Environment Changes," 26 pages.
Toward Robotic Cars; Thrun, Sebastian; Communications of the ACM, vol. 53, No. 4, Apr. 2010.
Office Action for U.S. Appl. No. 14/933,602, dated Aug. 19, 2016, Levinson et al., "Machine-Learning Systems and Techniques to Optimize Teleoperation and/or Planner Decisions," 37 pages.
Notice of Allowance and Fee(s) Due for U.S. Appl. No. 14/933,602, dated Dec. 14, 2016, Levinson et al., "Machine-Learning Systems and Techniques to Optimize Teleoperation and/or Planner Decisions," 31 pages.
Corrected Notice of Allowability for U.S. Appl. No. 14/933,602, dated Jan. 13, 2017, Levinson et al., "Machine-Learning Systems and Techniques to Optimize Teleoperation and/or Planner Decisions," 2 pages.
Kuznetsov, S., International Search Report and the Written Opinion of the International Searching Authority for International Patent Application No. PCT/US2016/060384, dated May 4, 2017.

(56) References Cited

OTHER PUBLICATIONS

Office Action for U.S. Appl. No. 14/757,015, dated Mar. 27, 2017, Kentley, Timothy David, "Independent Steering, Power Torque Control and Transfer in Autonomous Vehicles," 58 pages.
Koutsorodis, Dafani, International Search Report and the Written Opinion of the International Searching Authority for International Patent Application No. PCT/US2016/060104, dated Feb. 2, 2017.
Sokolov, D., International Search Report and the Written Opinion of the International Searching Authority for International Patent Application No. PCT/US2016/060121, dated Mar. 30, 2017.
Office Action for U.S. Appl. No. 14/932,959, dated Mar. 16, 2016, Kentley et al., "Autonomous Vehicle Fleet Service and System," 33 pages.
Office Action for U.S. Appl. No. 14/932,959, dated Aug. 5, 2016, Kentley et al., "Autonomous Vehicle Fleet Service and System," 25 pages.
Office Action for U.S. Appl. No. 14/932,959, dated Dec. 2, 2016, Kentley et al., "Autonomous Vehicle Fleet Service and System," 53 pages.
Notice of Allowance and Fee(s) Due for U.S. Appl. No. 14/932,959, dated Feb. 10, 2017, Kentley et al., "Autonomous Vehicle Fleet Service and System," 36 pages.
Sokolov, D., International Search Report and the Written Opinion of the International Searching Authority for International Patent Application No. PCT/US2016/060021, dated Mar. 30, 2017.
Sokolov, D., International Search Report and the Written Opinion of the International Searching Authority for International Patent Application No. PCT/US2016/060030, dated Mar. 30, 2017.
Office Action for U.S. Appl. No. 14/932,963, dated Mar. 17, 2016, Levinson et al., "Adaptive Mapping to Navigate Autonomous Vehicles Responsive to Physical Environment Changes," 60 pages.
Office Action for U.S. Appl. No. 14/932,963, dated Aug. 15, 2016, Levinson et al., "Adaptive Mapping to Navigate Autonomous Vehicles Responsive to Physical Environment Changes," 44 pages.
Notice of Allowance and Fee(s) Due for U.S. Appl. No. 14/932,963, dated Feb. 15, 2017, Levinson et al., "Adaptive Mapping to Navigate Autonomous Vehicles Responsive to Physical Environment Changes," 50 pages.
Office Action for U.S. Appl. No. 14/932,962, dated Mar. 21, 2016, Kentley et al., "Robotic Vehicle Active Safety Systems and Methods," 47 pages.
Notice of Allowance and Fee(s) Due for U.S. Appl. No. 14/932,962, dated Jul. 26, 2016, Kentley et al., "Robotic Vehicle Active Safety Systems and Methods," 31 pages.
Notice of Allowability for U.S. Appl. No. 14/932,962, dated Aug. 23, 2016, Kentley et al., "Robotic Vehicle Active Safety Systems and Methods," 6 pages.
Collision Warning and Sensor Data Processing in Urban Areas, Mertz et al., The Robotics Institute, Carnegie Mellon University, School of Computer Science, Research Shocase @ CMU (Jun. 2005).
Notice of Allowance and Fee(s) Due for U.S. Appl. No. 14/932,962, dated Mar. 2, 2017, Kentley et al., "Robotic Vehicle Active Safety Systems and Methods," 58 pages.
Corrected Notice of Allowability for U.S. Appl. No. 14/932,962, dated Mar. 9, 2017, Kentley et al., "Robotic Vehicle Active Safety Systems and Methods," 5 pages.
ISA, Sabine, International Search Report and the Written Opinion of the International Searching Authority for International Patent Application No. PCT/US2016/060183, dated Mar. 30, 2017.
Office Action for U.S. Appl. No. 14/756,994, dated Jan. 26, 2017, Kentley et al., "System of Configuring Active Lighting to Indicate Directionality of an Autonomous Vehicle," 19 pages.
Notice of Allowance and Fee(s) Due for U.S. Appl. No. 14/756,994, dated Jun. 2, 2017, Kentley et al., "System of Configuring Active Lighting to Indicate Directionality of an Autonomous Vehicle," 9 pages.
Office Action for U.S. Appl. No. 14/756,991, dated Feb. 28, 2017, Levinson et al., "Sensor-Based Object-Detection Optimization for Autonomous Vehicles," 30 pages.

Efficient Power Conversion, "Why GaN circuits make better Lidar," retrieved on Jul. 18, 2017 at <<http://epc-co.com/epc/DesignSupport/TrainingVideos/eGaNDemos/GaN-circuits-make-better-LiDAR.aspx>>, 2 pages.
Kang, Sung Chul, International Search Report and Written Opinion of the International Searching Authority for International Patent Application No. PCT/US2014/047864, dated Nov. 19, 2014, 10 pages.
Notice of Allowance and Fee(s) Due for U.S. Appl. No. 14/462,075, dated Nov. 18, 2015, Pennecot et al., "Devices and Methods for a Rotating Lidar Platform With a Shared Transmit/Receive Path," 8 pages.
Office Action for U.S. Appl. No. 14/462,075, dated Jun. 17, 2015, Pennecot et al., "Devices and Methods for a Rotating Lidar Platform With a Shared Transmit/Receive Path," 14 pages.
Rim et al., "The Optical Advantages of Curved Focal Plane Arrays," Optics Express, vol. 16, No. 7, Mar. 31, 2008, 7 pages.
Xu et al., "A Calibration Method of the Multi-Channel Imaging Lidar," SPIE Proceedings, vol. 9080, Lasar Radar Technology and Applications XIX; and Atmpospheric Propagation XI, 90800V (Jun. 9, 2014), doi:10.1117/12.2049678, 2 pages.
Notice of Allowance and Fee(s) Due for U.S. Appl. No. 14/756,991, dated Jun. 20, 2017, Levinson et al., "Sensor-Based Object-Detection Optimization for Autonomous Vehicles," 8 pages.
Zadunaev, D., International Search Report and Written Opinion of the International Searching Authority for International Patent Application No. PCT/US2016/060183, dated Mar. 16, 2017, 8 pages.
Office Action for U.S. Appl. No. 14/756,992, dated Aug. 25, 2016, Levinson et al., "Adaptive Autonomous Vehicle Planner Logic," 11 pages.
Office Action for U.S. Appl. No. 14/756,992, dated Jan. 4, 2017, Levinson et al., "Adaptive Autonomous Vehicle Planner Logic," 13 pages.
Advisory Action for U.S. Appl. No. 14/756,992, dated Mar. 13, 2017, Levinson et al., "Adaptive Autonomous Vehicle Planner Logic," 3 pages.
Office Action for U.S. Appl. No. 14/756,992, dated Jun. 1, 2017, Levinson et al., "Adaptive Autonomous Vehicle Planner Logic," 14 pages.
Zamakhaev, K., International Search Report and Written Opinion of the International Searching Authority for International Patent Application No. PCT/US2016/060029, dated Apr. 27, 2017, 6 pages.
Office Action for U.S. Appl. No. 14/756,993, dated Jul. 19, 2017, Kentley et al., "Method for Robotic Vehicle Communication With an External Environment Via Acoustic Beam Forming," 25 pages.
Zamakhaev, K., International Search Report and Written Opinion of the International Searching Authority for International Patent Application No. PCT/US2016/060161, dated Jun. 8, 2017, 9 pages.
Office Action for U.S. Appl. No. 14/756,995, dated Oct. 31, 2016, Kentley et al., "Coordination of Dispatching and Maintaining Fleet of Autonomous Vehicles," 36 pages.
Office Action for U.S. Appl. No. 14/756,995, dated Apr. 5, 2017, Kentley et al., "Coordination of Dispatching and Maintaining Fleet of Autonomous Vehicles," 38 pages.
Zamakhaev, K., International Search Report and Written Opinion of the International Searching Authority for International Patent Application No. PCT/US2016/060105, dated Mar. 30, 2017, 7 pages.
Office Action for U.S. Appl. No. 14/756,996, dated May 4, 2017, Douillard et al., "Calibration for Autonomous Vehicle Operation," 5 pages.
Zamakhaev, K., International Search Report and Written Opinion of the International Searching Authority for International Patent Application No. PCT/US2016/060118, dated Mar. 30, 2017, 7 pages.
GPS Logger: Methods for Determining the Mileage of Vehicles, May 31, 2012, Retrieved from Internet on Jul. 21, 2017 at <<http://www.gpslogger.ru/odometer/>>.
Office Action for U.S. Appl. No. 14/932,940, dated May 4, 2016, Levinson et al., "Automated Extraction of Semantic Information to Enhance Incremental Mapping Modifications for Robotic Vehicles," 23 pages.

(56) References Cited

OTHER PUBLICATIONS

Office Action for U.S. Appl. No. 14/932,940, dated Nov. 22, 2016, Levinson et al., "Automated Extraction of Semantic Information to Enhance Incremental Mapping Modifications for Robotic Vehicles," 30 pages.
Notice of Allowance and Fee(s) Due for U.S. Appl. No. 14/932,940, dated Apr. 7, 2017, Levinson et al., "Automated Extraction of Semantic Information to Enhance Incremental Mapping Modifications for Robotic Vehicles," 8 pages.
Zamakhaev, K., International Search Report and Written Opinion of the International Searching Authority for International Patent Application No. PCT/US2016/060173, dated May 11, 2017, 7 pages.
Joaquin, Vano Gea, International Search Report and Written Opinion of the International Searching Authority for International Patent Application No. PCT/US2016/060018, dated Feb. 14, 2017, 12 pages.
Office Action for U.S. Appl. No. 14/932,948, dated Jul. 29, 2016, Kentley et al., "Active Lighting Control for Communicating a State of an Autonomous Vehicle to Entities in a Surrounding Environment," 6 pages.
Office Action for U.S. Appl. No. 14/932,948, dated Oct. 14, 2016, Kentley et al., "Active Lighting Control for Communicating a State of an Autonomous Vehicle to Entities in a Surrounding Environment," 16 pages.
Office Action for U.S. Appl. No. 14/932,948, dated Mar. 21, 2017, Kentley et al., "Active Lighting Control for Communicating a State of an Autonomous Vehicle to Entities in a Surrounding Environment," 20 pages.
Office Action for U.S. Appl. No. 14/932,952, dated Jun. 24, 2016, Kentley et al., "Resilient Safety System for a Robotic Vehicle," 12 pages.
Office Action for U.S. Appl. No. 14/932,952, dated Jan. 10, 2017, Kentley et al., "Resilient Safety System for a Robotic Vehicle," 18 pages.
Komarchuk, A., International Search Report and Written Opinion of the International Searching Authority for International Patent Application No. PCT/US2016/060130, dated Apr. 6, 2017, 9 pages.
Office Action for U.S. Appl. No. 14/933,469, dated Aug. 30, 2016, Kentley et al., "Software Application to Request and Control Autonomous Vehicle Service," 12 pages.
Office Action for U.S. Appl. No. 14/933,469, dated Jan. 5, 2017, Kentley et al., "Software Application to Request and Control Autonomous Vehicle Service," 12 pages.
Advisory Action for U.S. Appl. No. 14/933,469, dated Mar. 17, 2017, Kentley et al., "Software Application to Request and Control Autonomous Vehicle Service," 3 pages.
Zamakhaev, K., International Search Report and Written Opinion of the International Searching Authority for International Patent Application No. PCT/US2016/060368, dated Apr. 27, 2017, 11 pages.
Office Action for U.S. Appl. No. 14/933,469, dated Jun. 22, 2017, Kentley et al., "Software Application to Request and Control Autonomous Vehicle Service," 8 pages.
Office Action for U.S. Appl. No. 14/933,706, dated Feb. 14, 2017, Kentley et al., "Interactive Autonomous Vehicle Command Controller," 9 pages.
Office Action for U.S. Appl. No. 14/933,706, dated Jun. 5, 2017, Kentley et al., "Interactive Autonomous Vehicle Command Controller," 20 pages.
Programmer's Guide, ChargePoint Web Services API Version 4.1, Document Part No. 75-001102-01, Revision 4, May 16, 2014, Retrieved on the Internet at <https://na.chargepoint.com/UI/downloads/en/ChargePoint_Web_Services_API_Guide_Ver4.1_Rev4.pdf>.
U.S. Appl. No. 15/650,763, filed Jul. 14, 2017, Carlson et al.
U.S. Appl. No. 15/650,766, filed Jul. 14, 2017, Carlson et al.
International Search Report and Written Opinion for International (PCT) Patent Application No. PCT/US2018/042041, dated Sep. 26, 2018, 13 pages.
Official Action for U.S. Appl. No. 15/650,766, dated Oct. 16, 2018 12 pages.
U.S. Appl. No. 61/567,962, filed Dec. 7, 2011, Baarman et al.

"Nexus 10 Guidebook for Android," Google Inc., © 2012, Edition 1.2, 166 pages.
"Self-Driving: Self-Driving Autonomous Cars," available at https://web.archive.org/web/20161018221218/http://www.automotivetechnologies.com/autonomous-self-driving-cars, Oct. 2016, accessed Dec. 2016, 7 pages.
Amor-Segan et al., "Towards the Self Healing Vehicle," Automotive Electronics, Jun. 2007, 2007 3rd Institution of Engineering and Technology Conference, 7 pages.
Bennett, "Meet Samsung's Version of Apple AirPlay," CNET.com, Oct. 10, 2012, 11 pages.
Cairnie et al., "Using Finger-Pointing to Operate Secondary Controls in Automobiles," Proceedings of the IEEE Intelligent Vehicles Symposium 2000, Oct. 3-5, 2000, 6 pages.
Clark, "How Self-Driving Cars Work: The Nuts and Bolts Behind Google's Autonomous Car Program," Feb. 21, 2015, available at http://www.makeuseof.com/tag/how-self-driving-cars-work-the-nuts-and-bolts-behind-googles-autonomous-car-program/, 9 pages.
Deaton et al., "How Driverless Cars Will Work," Jul. 1, 2008, HowStuffWorks.com. <http://auto.howstuffworks.com/under-the-hood/trends-innovations/driverless-car.htm> Sep. 18, 2017, 10 pages.
Dumbaugh, "Safe Streets, Livable Streets: A Positive Approach to urban Roadside Design," Ph.D. dissertation for School of Civil & Environ. Engr., Georgia Inst. of Technology, Dec. 2005, 235 pages.
Fei et al., "A QoS-aware Dynamic Bandwidth Allocation Algorithm for Relay Stations in IEEE 802.16j-based Vehicular Networks," Proceedings of the 2010 IEEE Global Telecommunications Conference, Dec. 10, 2010, 10 pages.
Ge et al., "Optimal Relay Selection in IEEE 802.16j Multihop Relay Vehicular Networks," IEEE Transactions on Vehicular Technology, 2010, vol. 59(5), pp. 2198-2206.
Guizzo, Erico, "How Google's Self-Driving Car Works," Oct. 18, 2011, available at https://spectrum.ieee.org/automaton/robotics/artificial-intelligence/how-google-self-driving-car-works, 5 pages.
Heer et al., "Alpha: An Adaptive and Lightweight Protocol for Hop-by-hop Authentication," Proceedings of CoNEXT 2008, Dec. 2008, pp. 1-12.
Jahnich et al., "Towards a Middleware Approach for a Self-Configurable Automotive Embedded System," International Federation for Information Processing, 2008, pp. 55-65.
Persson, "Adaptive Middleware for Self-Configurable Embedded Real-Time Systems," KTH Industrial Engineering and Management, 2009, pp. iii-71 and references.
Raychaudhuri et al., "Emerging Wireless Technologies and the Future Mobile Internet," p. 48, Cambridge Press, 2011, 3 pages.
Stephens, Leah, "How Driverless Cars Work," Interesting Engineering, Apr. 28, 2016, available at https://interestingengineering.com/driverless-cars-work/, 7 pages.
Stoller, "Leader Election in Distributed Systems with Crash Failures," Indiana University, 1997, pp. 1-15.
Strunk et al., "The Elements of Style," 3d ed., Macmillan Publishing Co., 1979, 3 pages.
Suwatthikul, "Fault detection and diagnosis for in-vehicle networks," Intech, 2010, pp. 283-286 [retrieved from: www.intechopen.com/books/fault-detection-and-diagnosis-for-in-vehicle-networks].
Walter et al., "The smart car seat: personalized monitoring of vital signs in automotive applications." Personal and Ubiquitous Computing, Oct. 2011, vol. 15, No. 7, pp. 707-715.
Wolf et al., "Design, Implementation, and Evaluation of a Vehicular Hardware Security Module," ICISC'11 Proceedings of the 14th Int'l Conf. Information Security & Cryptology, Springer-Verlag Berlin, Heidelberg, 2011, pp. 302-318.
Official Action for U.S. Appl. No. 15/650,763, dated Dec. 28, 2018 29 pages.
Notice of Allowance for U.S. Appl. No. 15/650,766, dated Feb. 21, 2019 8 pages.
Final Action for U.S. Appl. No. 15/650,763, dated Jun. 13, 109 37 pages.
Official Action for U.S. Appl. No. 15/650,763, dated Nov. 27, 2019 40 pages.

(56) References Cited

OTHER PUBLICATIONS

Final Action for U.S. Appl. No. 15/650,763, dated Apr. 29, 2020 46 pages.

* cited by examiner

CONTROL OF COMPLEX PARKING MANEUVERS AND AUTONOMOUS FUEL REPLENISHMENT OF DRIVERLESS VEHICLES

FIELD

Various embodiments relate generally to autonomous vehicles and associated mechanical, electrical and electronic hardware, computing software, including autonomy applications, image processing applications, etc., computing systems, and wired and wireless network communications to facilitate autonomous control of vehicles, and, more specifically, to systems, devices, and methods configured to control driverless vehicles to facilitate complex parking maneuvers and autonomous fuel replenishment.

BACKGROUND

To assist in driving and refueling automobiles, a few approaches have been developed to assist drivers in automating conventional vehicles (e.g., manually-driven automotive vehicles) to aid in performing relatively simple tasks and maneuvers. For example, some conventional automobiles have been designed to assist a human driver, whether manually or automatically, to perform parallel parking. While humans may perceive parallel parking as difficult, it is a relatively simple process that depends predominantly on the size of the space in which the automobile is to be parked. While functional, conventional self-parking mechanisms suffer a number of drawbacks. As one example, known self-parking mechanisms are generally limited to simple actions and are not well-suited to implement complex or any other intricate parking or driving action.

In the development of clean energy technologies and vehicles, automobiles have been developed to use alternative fuels other than petroleum-based fuel. For example, some electric vehicles have been developed to consume electricity as an "alternative fuel," as defined, for example, the Energy Policy Act of 1992. Other vehicles have been developed to consume other types of alternative fuels, such as hydrogen. However, adoption of alternative fuel vehicles has lagged due to, at least in part, to relatively slow pace of constructing alternative fueling mechanisms and stations. The slowed rate of building alternative fuel stations may be due to the relatively high cost of resources (e.g., physical stations) to build such stations. Further, some charging stations may service electric vehicles that require multiple hours to fully recharge a battery. Thus, a scarcity in the availability to use alternative fuel stations might be expected, along with increased queues and difficulties in coordinating refueling with impromptu travel plans. In some cases, some conventional electric charging stations are networked to provide indications whether a station is in used. However, the logic used in the conventional electric charging stations is suboptimal to ensure an alternate fuel vehicle may refueled (e.g., recharged) in a timely and cost-effective manner without disrupting users' experiences. Other drawbacks are also present in a variety of known approaches to refueling of traditional alternate fuel vehicles.

Thus, what is needed is a solution for implementing autonomous control functions to facilitate parking and replenishment autonomous vehicles, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
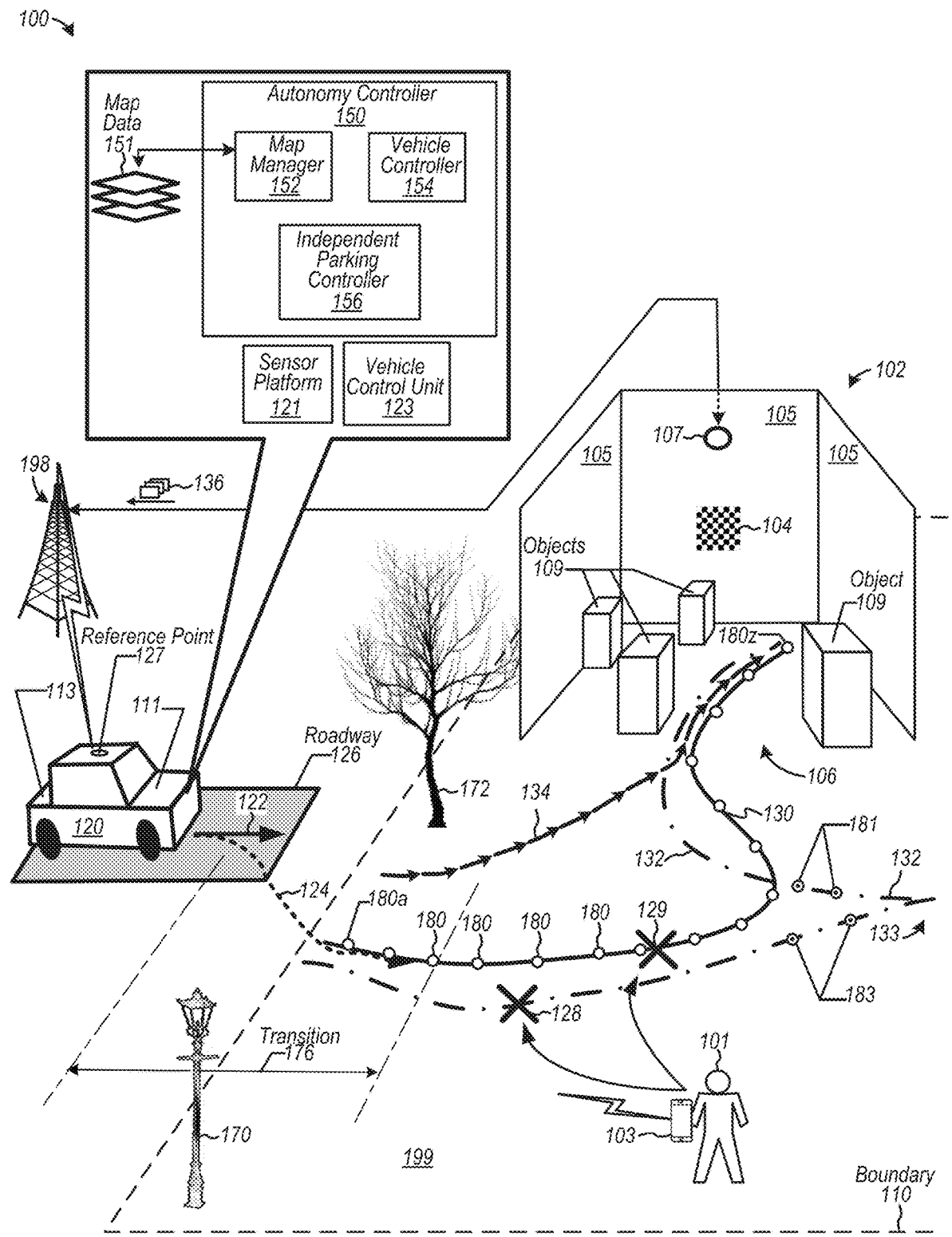
FIG. 1 is a diagram depicting an example of an independent parking controller, according to some embodiments.

FIG. 1 is a diagram depicting an example of an independent parking controller, according to some embodiments. Diagram 100 depicts an example of an independent parking controller 156 configured to determine a boundary 110 surrounding a destination geographic location 102, and configured further to navigate autonomously an autonomous vehicle 120 within boundary 110 via a path of travel 130 to a parking location 106 (e.g., point of termination) at which autonomous vehicle 120 may be positioned driverlessly in a customized orientation and position (e.g., without real-time input from a human operator). In the example shown, destination geographic location 102 may be a carport (e.g., a parking port) or a garage 102 including structural walls 105 and distributed objects 109, which may be any item typically stored in a garage, such as a tool bench, a bicycle, a motorcycle, a storage rack, a lawn mower, a treadmill or other exercise equipment, lawn furniture, etc. Objects 109 may be arranged arbitrarily by preference or to optimize space within garage 102. Thus, an autonomy controller 150 in autonomous vehicle 120 may be configured to implement customized automated parking maneuvers to adapt orientation of vehicle 120 during self-parking processes relative to objects 109, while optionally preserving space adjacent a passenger, if any, to enter and exit autonomous vehicle 120 when parked in a customized position and orientation. As an example, if an object 109 is a work bench, autonomous vehicle 120 may be programmed to park in a customize orientation and position relative to the work bench so as to optimize space (e.g., floor space) in garage 102, according to the preferences of user 101.

Independent parking controller 156 may "learn" characteristics, such as vehicular drive parameters, associated with traversing a path of travel 130, whereby independent parking controller 156 may reuse the learned characteristics to automatically guide the transit of autonomous vehicle 120 via the same (or substantially the same) path of travel 130 to park at a customized position and orientation. Independent parking controller 156 may be configured to detect and store vehicular drive parameters (or values thereof) as autonomous vehicle 120 transits over via a path segment 130. Examples of vehicular drive parameters include parameter data representing steering data (e.g., degree(s) of wheel angle to effect a turn), acceleration data (e.g., an amount of throttle or power to apply to a drive train or the like), deceleration data (e.g., an amount of pressure to apply to brakes to reduce velocity), transmission data (e.g., a state of a transmission subsystem to effect forward motion and reverse motion in one or more states of speed and torque), and the like.

Thus, the vehicular drive parameters may include subsets of data that describe certain behaviors or states of various subsystems of autonomous vehicle 120. Examples of subsystems include a steering subsystem, a braking subsystem, a propulsion subsystem, a transmission subsystem, and the like. With various vehicular drive parameters stored relative to each of different units of travel, independent parking controller 156 may be configured to cause autonomous vehicle 120 to traverse path of travel 130 repeatedly. For example, independent parking controller 156 may store subsets of vehicular drive parameters at initial waypoint 180a, with subsequent values of vehicular drive parameters being captured at subsequent units of travel, or waypoints 180, through to terminus waypoint 180z. So, as autonomous vehicle 120 crosses into area 199 of boundary 110, independent parking controller 156 may generate principal path routing data that sequences changes in vehicular drive parameters as autonomous vehicle 120 transits over path of travel 130 from waypoint 180a to waypoint 180z. For example, values of steering or wheel angles at sequential waypoints 180 may be used to automatically steer autonomous vehicle 120 along a common path. Autonomous vehicle 120 then may cease transit at terminus waypoint 180z in an orientation and position as desired by a user who programs or generates path of travel 130 for automated and repeatable use. In some examples, a waypoint may be in intermediate point or unit of travel that may be unique relative to a point in time, a geographic location, etc., whereby a waypoint may be associated with a subset of vehicular drive parameters recorded at, or to be used at, the waypoint.

Independent parking controller 156 may be configured to initiate vehicular drive parameter recordation in response to user input, according to some examples. For example, independent parking controller 156 may receive a user input configured to initiate recordation of vehicular drive parameter(s). The user input may be entered into the user interface on a mobile computing device 103 (e.g., a mobile phone), on an interface in autonomous vehicle 120, or any other user interface. In response, independent parking controller 156 may be configured to detect values representative of the vehicular drive parameters and store the detected vehicular drive parameters to form preprogrammed vehicular drive parameters, which constitute a preprogrammed path segment over which autonomous vehicle 120 may be guided. According to some examples, independent parking controller 156 may be configured to generate a macro program or application, based on the stored vehicular drive parameters, to enable multiple implementations of the preprogrammed path segment each time the macro is activated. In some cases, a macro programming language, such as a script programming language, may record actions of vehicle subsystems (e.g., responsive to human driver input) that can be repeated sequentially upon execution of the macro. According to alternate examples, independent parking controller 156 may be configured to automatically record vehicular drive parameters after which the vehicular drive parameters may be retrieved from a memory and implemented to form a preprogrammed path of travel 130. For example, as autonomous vehicle 120 traverses path of travel 130 for a first time (e.g., under human driver control), driver parameters may be recorded. Anytime thereafter, autonomous vehicle 120 may automatically implement the preprogrammed path of travel 130 for driverless parking in garage 102.

According to various examples, independent parking controller 156 may be configured to capture various subsets of vehicular drive parameters at a set of waypoints to preprogram any number of paths of travel between, for example waypoint 180a and waypoint 180z. In the example shown, vehicular drive parameters for path of travel 130 may be captured as autonomous vehicle 120 traverses from waypoint 180a to 180z. Or, the vehicular drive parameters for path of travel 130 may be captured as autonomous vehicle 120 traverses from waypoint 180z to 180a. In some examples, independent parking controller 156 may be configured to implement waypoints captured sequentially from waypoint 180a to waypoint 180z in a reverse manner. In particular, autonomous vehicle 120 may be driving autonomously along path 122 such that at waypoint 180a, drive parameter data is captured at subsequent waypoints 180 until autonomous vehicle 120 enters garage 102 and terminates travel at waypoint 180*z*. Hence, anterior portion 111 of autonomous vehicle 120 may be a leading portion that enters garage 102 first. Thereafter, autonomous vehicle 120 may be configured to exit garage 102 with the posterior portion 113 leading along path of travel 130 by using drive parameter data in a reverse manner from waypoint 180*z* to waypoint 180*a* (e.g., autonomous vehicle drives in reverse). So, at least in some examples, a human driver may provide input to establish values of vehicular drive parameters during an initial traversal of path of travel 130, with the stored vehicular drive parameters being used repeatedly and driverlessly thereafter regardless of whether autonomous vehicle 120 is entering or exiting garage 102.

Further, independent parking controller 156 may be configured to capture a subset of vehicular drive parameters via a path of travel 132 over which an autonomous vehicle 120 may transition a transmission state from a reverse state (e.g., a reverse gear) to a forward state (e.g., a forward gear), or vice versa, at a portion 133 of path of travel 132. Thus, autonomous vehicle 120 may implement path of travel 130 to exit with anterior portion 111 of autonomous vehicle 120 leading (e.g., driving in a forward gear), and may implement path of travel 132 to enter garage 102 with posterior portion 113 of autonomous vehicle 120 leading (e.g., driving in a reverse gear). Furthermore, waypoints 181 of path of travel 132 may be associated with transmission data representing a first direction (e.g., reverse), whereas waypoints 183 be associated with a second direction (e.g., forward).

Autonomous vehicle 120 is shown to include a sensor platform 121, a vehicle control unit 123, and an autonomy controller 150, one or more of which may include logic configured to detect a vehicular drive parameter to form a programmed path of travel, navigate autonomous vehicle 120 over a programmed path of travel, and determine whether to activate routing based on a programmed path of travel. Sensor platform 121 may include any number of sensors (not shown) with which to facilitate driverless control of autonomous vehicle 120. Examples of sensors include one or more image capture devices (e.g., image sensors or cameras to capture video including high definition, or "HD," cameras), one or more radar devices (e.g., short-range radar, long-range radar, etc.), one or more LIDAR devices, one or more sonar devices (or sensors configured to detect ultrasound), one or more global positioning system ("GPS") devices, one or more inertial measurement units ("IMU") devices, and one or more other types of sensors including, but not limited to, gyroscopes, accelerometers, odometry sensors, steering wheel angle sensors, wheel angle sensors, throttle sensors, brake pressure sensors, proximity sensors (e.g., in or adjacent to a seat to determine whether occupied by a passenger), etc. An example of an image capture device may include high definition ("HD") cameras (or CMOS/CCD sensors) that may have image resolutions greater than 640×480, such as 1280×720, 1920×1080, 2560×1600, or greater. Further, one or more cameras may operate to capture imagery at any range or spectral band of light. For example, a camera may be configured to capture images in the visible light or infrared light spectra. At least a subset of the aforementioned sensors of sensor platform 121 may be used to localize autonomous vehicle 120 relative to its environment and objects within the environment (e.g., relative to a lamp post 170, a tree 173, and the like), and relative to a position in a global coordinate system (e.g., using GPS coordinates). Further, one or more sensors of sensor platform 121 may sense specific states of wheel angles and throttle positions, as well as any other vehicular drive parameter to establish a preprogrammed path of travel.

Vehicle control unit 123 may be coupled (e.g., mechanically and/or electrically) to steering, braking, transmission, and propulsion units, or to any other component, with which to implement physical changes in steering, acceleration (e.g., throttling), deceleration (e.g., braking), transmission shifting (e.g., directional gear shifting). As an example, vehicle control unit 123 may include electronic interfaces with autonomy controller 150, and thus may be configured to receive data representing steering data (e.g., degree of wheel angle to effect a turn), acceleration data (e.g., an amount of throttle or power to apply to a drive train or the like), deceleration data (e.g., an amount of pressure to apply to brakes to reduce velocity), transmission data (e.g., representing a selected gear and/or a direction), and the like. Vehicle control unit 123 may be further configured to apply control signals to electromechanical systems of autonomous vehicle 120, responsive to the above-described data. In some examples, vehicle control unit 123 may apply changes to at least steering, acceleration and deceleration at a rate of thirty (30) times a second or greater. In some examples, vehicle control unit 123 may receive updates of above-described data at each waypoint 180 to facilitate course corrections or modifications, if any, to ensure autonomous vehicle 120 traverses over path of travel 130.

Diagram 100 depicts autonomy controller 150 including a map manager 152, a vehicle controller 154, and an independent parking controller 156. Autonomy controller 150 may include logic configured to generate and implement one or more preprogrammed paths of travel 130, 132, and 134, which are examples. The logic in autonomy controller 150 may include either hardware or software, or a combination thereof, and may be configured to perform any number of localization and self-parking processes to situate autonomous vehicle 120 in a customized position and orientation at a destination parking spot 106 relative to any number of moveable or affixed objects 109.

Vehicle controller 154 may include logic configured to control any number of vehicle functions under either human or autonomous control. For example, vehicle controller 154 may determine a pose (e.g., a position and/or orientation) localized at a reference point 127 of autonomous vehicle 120. Reference point 127 may be identified relative to external objects and surfaces of an external environment (or scene), and may be correlated to a position on a roadway 126, which may be described in map data 151. Reference point 127 may be expressed in longitudinal and latitudinal coordinates for identifying a geographic location. Further, vehicle controller 154 may be configured to determine a position of reference point 127 relative to monuments or markers that may be used as known locations or points in a coordinate system to confirm or facilitate localization of autonomous vehicle 120 relative to, for example, boundary 110. Examples of monuments or markers include lamp post 170, tree 172, any of objects 109, walls 105, an image target 104, and the like. Also, image target 104 may be implemented as a marker to localize autonomous vehicle 120 at parking space 106, and to guide computations to ensure orientation and position at which autonomous vehicle 120 comes to rest. In operation, vehicle controller 154 may be configured to facilitate localization of reference point 127 (i.e., autonomous vehicle 120) relative to boundary 110 and waypoint 180*a* of a path of travel 130, which may be preprogrammed path of travel. According to some examples, boundary 110 may approximate a transition 176 of controlling the routing of autonomous vehicle 120 between using a preprogrammed path of travel 130 in area 199 and using computer-generated trajectories 122 for path and route planning via any road network external to boundary 110, including roadway 126.

Further, vehicle controller 154 may be configured to implement object characterization and classification to identify types and attributes of objects (e.g., whether an object is dynamic or static, whether an object is animate, or living, rather than an inanimate object, etc.), according to some embodiments. Examples of external classified objects include lamp posts, trees, tool benches, bicycles, cars, signs, pedestrians, cyclists, dogs, fire hydrants, etc., and examples of classified external surfaces include pavement of roadway 126, surfaces or contours of adjacent buildings, such as carport or garage 102, or adjacent structures, such as a communication tower 198, and the like.

Vehicle controller 154 also may be configured to generate trajectories or paths of travel 122 in accordance with a planned route to guide the transiting of autonomous vehicle 120 via roadway 126 from origination point "A" (not shown) to destination point "B," such as destination parking spot 106. For a trajectory or path of travel 122, vehicle controller 154 may determine in real-time (or substantially in real-time) a number of path segments constituting a path of travel along roadway 126. To transit along a segment, vehicle controller 154 may compute a number of vehicular drive parameters that may be applied incrementally to mechanical drive components (e.g., at a rate of 30 sets of vehicular drive parameters for every second) to cause autonomous vehicle 120 to automatically drive along trajectory-based path segments over roadway 126. Hence, vehicle controller 154 may be configured to compute one or more drive parameters in real-time (or substantially in real-time) with which to apply to vehicle control unit 123, including driving control signals to effect propulsion, steering, braking, transmission shifting, lighting (e.g., emergency flashers), sound (e.g., automatic horn alerts, etc.), among other functions.

Map manager 152 may be configured to implement map data 151 to localize and navigate autonomous vehicle 120 relative to roadway 126 or a driveway (not shown) in area 199 leading to parking space 106, any of which may be represented as image data. Map data 151 may include relatively high resolutions of images of roadway 126 and adjacent objects, such as communication tower 198, lamp post 170, tree 172, or walls 105. In some examples, map data 151 may include static or semi-static objects that have a relatively low or negligible probability of moving positions. Thus, static objects may be used as monuments or markers in accordance with some implementations. Autonomy controller 150 may use map data 151 to identify external imagery to facilitate route planning (e.g., planning paths of travel relative to roadway 126 as depicted in map data 151). Map data 151 may include image data representing lane markings as well as data representing lane widths and curbs (e.g., with curb markings, such as "loading zone," etc.). In some examples, map data 151 may include image data having image resolutions greater than 640×480, such as high definition resolutions of 1280×720, 1920×1080, 2560×1600, or greater. Further, one or more cameras may operate to capture imagery at any range of wavelengths or any spectral bands of light, regardless of an HD resolution. For example, a camera may be configured to capture images in the visible light or infrared light spectra. Thus, map data 151 may include images depicted in the visible light spectra, the infrared light spectra, or the like. Map data 151 may also include any type of map data, such as 2D map data, 3D map data, 4D map data (e.g., includes three dimensional map data at a particular point in time), or the like. Additionally, map data 151 may include route data, such as road network data, including, but not limited to, route network definition file ("RNDF") data (or similar data) and the like.

Map manager 152 may also be configured to generate a dynamic representation of map data 151 by fusing or combining static map data (e.g., image data representing visual characteristics of roadway 126 and static objects, such as lamp post 170, tree 172, etc.) and dynamic map data to form dynamic map data 151. In some examples, dynamic map data may include data representing objects detected via image capture (and/or other sensor data, including lidar), whereby the objects may have attributes indicative of dynamism, such as a pedestrian or a cyclist. In at least one case, dynamic map data may include temporally-static objects (e.g., semi-static objects), which may be temporally static for a certain duration of time (e.g., during construction or times of day) and may be added or removed dynamically from a mapped environment. For example, another vehicle (not shown) may generally be parked in area 199 during hours that another driver (e.g., a family member) is not using the vehicle. Examples of temporally-static objects include a parked car in a driveway, both of which may be omitted initially from map data 151. However, a parked car may be included in a dynamic representation of map data 151 as an object in a map as the object is captured.

In some examples, map data 151 may include images in high resolutions that include granular details of an environment or scene in which an autonomous vehicle is driving to ensure relatively accurate and precise localization, object classification, navigation, path of travel generation (e.g., trajectory generation), etc., as well as ensuring accurate and precise customized orientation and positioning when parking a vehicle driverlessly. According to some implementations, portions of map data 151 associated with a planned route along various paths of travel may be downloaded (e.g., as adjacent blocks of grid-type HD map data) as an autonomous vehicle travels along the route, thereby preserving resources (e.g., relatively large amount of storage need not be required to store an entire HD map of a particular region, such as a country).

According to some examples, map manager 152 may receive map update data 136 via communication tower 198 and a network with which to apply to map data 151 for updating, for example, features or objects as imagery relative to parking spot 106, interior of garage 102, and/or surface area 199. As an example, an object other than autonomous vehicle 120, such as a car, may be disposed along path of travel 130 or in parking space 106. Data 136 include information about the object (e.g., a type of object, size of object, position of object, etc.) that may be transmitted to update map data 151 so that independent parking controller 156 can determine an alternate path of travel, such as path of travel 134, if a parked car obstructs path of travel 130. Thus, independent parking controller 156 may be configured to select one preprogrammed path of travel from a set of preprograms paths of travel to implement driverless parking prior to the arrival at boundary 110 or garage 102. In some cases, map update data 136 may originate from one or more sensor devices 107 having similar image capturing or ranging capabilities (e.g., lidar, radar, and/or HD cameras as sensors in autonomous vehicle 120). Note, too, that updated map data 136 may be transmitted to any number of autonomous vehicles 120 authorized to park at parking spot 106 to revise on-board maps. Therefore, autonomy controller 150 may use updated on-board map data 151 to more accurately and precisely navigate within boundary 110 along a preprogrammed path of travel.

According to some examples, autonomy controller 150 may be configured to generate and store data representing a path of travel as, for example, a preprogrammed path of travel that facilitates customized parking adapted to a user's preference in positioning and orienting autonomous vehicle 120 at a parking spot 106. Independent parking controller 156 may begin forming a preprogrammed path of travel by localizing autonomous vehicle 120 relative to a first geographical location at a first path portion. For example, vehicle controller 154 may localize autonomous vehicle 120 and generate location data (e.g., in terms of latitude and longitude, GPS coordinates, etc.). Independent parking controller 156 may use location data to identify a location of a waypoint at which vehicular drive parameters can be captured. In one instance, a first path portion may be associated with boundary 110 and the first geographic location may be waypoint 180a. Hence, path of travel 130 originates adjacent to boundary 110. Or, if path of travel 130 originates within garage 102, the first path portion may be associated with parking spot 106 and the first geographic location may be waypoint 180z. Independent parking controller 156 may be configured to capture data representing vehicular drive parameters at waypoints 180. In some examples, each waypoint 180 of path of travel may include data representing a "unit of travel," whereby a unit of travel may describe one or more units of time, one or more units of distance, and the like. For example, waypoints 180 may be geographically displaced from each other in units of distance (e.g., a number of inches or feet from each other along a path of travel), or may be separated in time (e.g., units of seconds or fractions thereof from each other).

Independent parking controller 156 may continue forming a preprogrammed path of travel by localizing autonomous vehicle 120 relative to a second geographical location at a second path portion. In one example, the second path portion may be associated with parking spot 106 and the second geographic location may be waypoint 180z. Or, the second path portion may be associated with boundary 110 and the second geographic location may be waypoint 180a. Further, independent parking controller 156 may be configured to store captured data representing vehicular drive parameters for each of waypoints 180. In various examples, independent parking controller 156 may generate a macro application based on captured waypoints and vehicular drive parameters. The macro, when executed, can cause autonomous vehicle 122 to driverlessly traverse waypoints, such as from waypoint 180a to waypoint 180z, with accuracy and precision provided by predetermined vehicular drive parameters that may initially be specified by a user. In particular, a macro can facilitate an automated approach of autonomous vehicle 120 into garage 102 so that it arrives and parks driverlessly at parking spot 106 in an accurate and precise pose (e.g., orientation and position) in accordance with a user's preferences relative to surrounding objects 109.

Additionally, independent parking controller 156 may be configured to form a modified macro application to generate executable instructions to facilitate transit over the path of travel 130 in a reverse manner than was initially captured. For example, if a macro application is based on a preprogrammed path of travel originating at waypoint 180a and terminating at waypoint 180z, then independent parking controller 156 may be configured to generate executable instructions to facilitate driverless transit originating at waypoint 180z and passing through waypoint 180a as autonomous vehicle 120 exits boundary 110. Thus, independent parking controller 156 may apply predetermined vehicular drive parameters in a reverse sequence to enable autonomous vehicle to travel in a reverse direction travel over path of travel 130. Note that the reverse direction of travel may be either in a forward gear or a reverse gear relative to a transmission.

According to various additional examples, autonomy controller 150 may also be configured to transition path planning between trajectory-generated paths, which may be configured for implementation external to boundary 110, and preprogrammed paths of travel configured for implementation within boundary 110. External to boundary 110, vehicle controller 154 may be configured to calculate a variety of trajectories per unit time (e.g., per second), in real-time or substantially in real-time, that may be used to guide autonomous vehicle along a route from a point of origination to a point of destination, most of which may be calculated to facilitate driverless control external to boundary 110. For example, vehicle controller 154 may select and implement a trajectory relative to locations of external dynamic and static objects along a sequence of roadways that provides for collision-free travel over the roadways, such as roadway 126. Thus, autonomy controller 150 may also be configured to compute vehicular drive parameters based on the calculated trajectories to facilitate transit of autonomous vehicle 120 to a destination geographical location, such as within boundary (e.g., at parking spot 106).

Further, Independent parking controller 156 may be configured to adapt the usage of vehicular drive parameters from those based on trajectories external to boundary 110 to those based on waypoints 180 within boundary 110. For example, independent parking controller 156 may be configured to identify a trajectory 122 (and associated vehicular drive parameters) that is to be adapted to, for example, a path of travel 130 at waypoint 180a. Independent parking controller 156 includes logic to predict a change in a path of travel during transition 176 during which autonomy controller 150 adaptively switches via a transitory path portion 124 from using trajectory-based drive parameters to preprogrammed drive parameters. Therefore, independent parking controller 156 may be configured to access map data 151 to identify boundary 110 to detect that autonomous vehicle 120 is on approach to boundary 110. During transition 176, independent parking controller 156 may be configured to access executable instructions, such as a macro application, to facilitate vectoring autonomous vehicle 120 in accordance with an approach maneuver, such as one of a number of preprogrammed paths of travel 130, 132, 134, among others. In at least one example, as autonomous vehicle 120 approaches boundary 110, independent parking controller 156 may be configured to select one or a number of preprogrammed paths of travel to implement, according to one or more criteria including whether user 101 provides input.

According to some embodiments, user 101 (or any other passenger) may enter or exit autonomous vehicle 120 within boundary 110, and may generate or modify a path of travel via an application implemented on a mobile computing device 103. User 101 may apply (e.g., via mobile computing device 103) a subset of alternate vehicular drive parameters to guide the autonomous vehicle to a termination point at parking spot 106. For example, user 101 may exit autonomous vehicle 120 at point 129 along path of travel 130 or at point 128 along path of travel 132. Autonomy controller 150 then may detect an absence or presence of a driver or passenger via proximity sensors in or adjacent to a seat in autonomous vehicle 120. As one or more passengers may exit autonomous vehicle 120 at points 128 and 129 prior to parking, independent parking controller 156 may be configured to adjust the orientation and position of autonomous vehicle 120 as it parks in parking spot 106. Modification of the orientation and position may enhance spatial disposition of autonomous vehicle 120 within garage 102. For instance, if driver 101 exits autonomous vehicle 120 as its only passenger, then independent parking controller 156 may be configured to adjust the orientation and position of autonomous vehicle 120 to disregard a requirement for space to accommodate an open door. As such, the autonomous vehicle 120 may be parked relatively close to one or more surfaces of objects 109 to, for example, optimize space surrounding at least a portion of autonomous vehicle 120. Note that a "driverless" autonomous vehicle may refer to, at least in one example, to a vehicle that may be configured to be either manually-driven (e.g., human operator provides control signal input) or automated (e.g., a computing system, such as an autonomy controller controls propulsion and steering).

Figure 2:
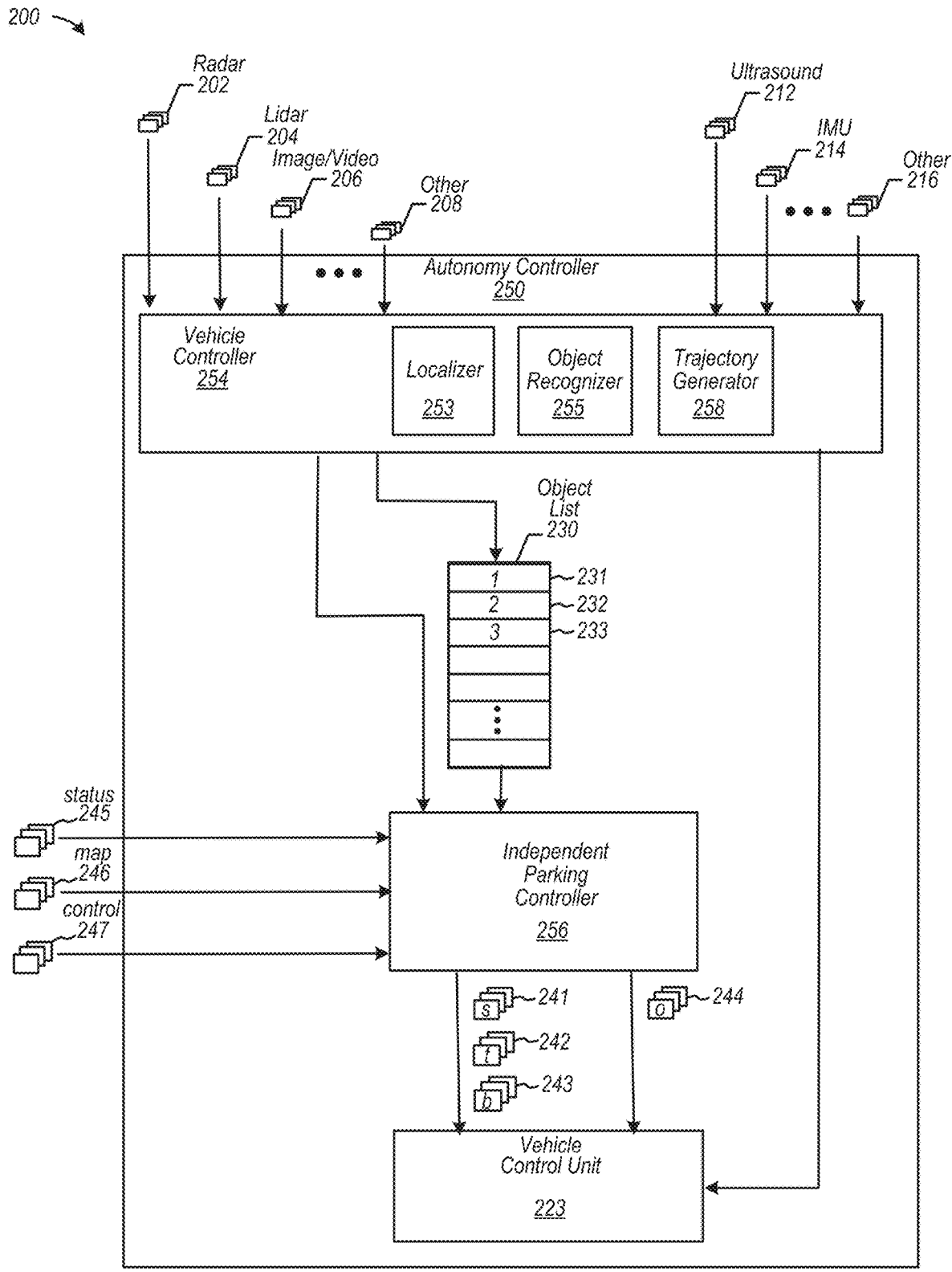
FIG. 2 is a diagram depicting another example of an independent parking controller, according to some embodiments.

FIG. 2 is a diagram depicting another example of an independent parking controller, according to some embodiments. Diagram 200 depicts autonomy controller 250 including a vehicle controller 254 configured to generate an object list 230, among other things. Autonomy controller 250 also includes an independent parking controller 256 and a vehicle control unit 223. As shown, autonomy controller 250 may be configured to receive radar sensor data 202, lidar sensor data 204, image/video data 206, and other sensor data 208, each of which may be received into vehicle controller 254. Also, autonomy controller 250 also may be configured to receive ultrasound sensor data 212, inertial measurement unit ("IMU") data 214, and other sensor data 216 (e.g., GPS data, wheel or odometry data, gyroscopic data, etc.), each of which may be received into vehicle controller 254 or any component of autonomy controller 250.

Vehicle controller 254 may, in some examples, be configured to facilitate localization or any other function performed by components of an autonomous vehicle. For example, localizer 253 can determine a pose (e.g., a local position and orientation) at any one of number of geographic locations. As such, localizer 253 may use acquired sensor data, such as sensor data associated with lamp posts, trees, or surfaces of buildings (e.g., a garage), which can be compared against reference data, such as map data (e.g., 3D map data, including reflectance data) to determine a local pose. According to some examples, localizer 253 may determine a relative geographic location of an autonomous vehicle relative to, for example, a global coordinate system (e.g., latitude and longitudinal coordinates, etc.).

Vehicle controller 254 may be configured to facilitate object identification. For example, object recognizer 255 may be configured to implement object characterization and classification to identify types and attributes of objects (e.g., whether an object is dynamic or static, such as whether an object is animate or inanimate), according to some examples. Examples of classified objects include lamp posts, trees, tool benches, bicycles, cars, signs, pedestrians, cyclists, dogs, fire hydrants, etc., and examples of classified external surfaces include pavement of a roadway, surfaces or contours of adjacent buildings, such as garage 102 of FIG. 1, or adjacent structures, such as a communication tower 198 of FIG. 1, and the like. In the example shown, vehicle controller 254 may detect and classify objects to generate an object list 230, which includes a list of objects, such as object ("1") 231, object ("2") 232, object ("3") 233, etc. The objects may represent detect and/or classified objects detected by one or more sensors. For example, objects 231, 232, and 233 may include static objects, such as a lamp post, and dynamic objects, such as a person walking.

Also, trajectory generator 258 may be configured to generate trajectories or paths of travel in accordance with a planned route to guide the transiting of an autonomous vehicle via a roadway from origination point "A" (not shown) to destination point "B," such as a destination parking spot. To determine a trajectory-based path of travel, trajectory generator 258 may determine in real-time (or substantially in real-time) a number of path segments to evaluate a collision-free path of travel along a roadway. Trajectory generator 258 may implement object list 230 to select trajectories that may avoid collisions with objects 221, 232, and 233. To transit along a segment, trajectory generator 258 may compute a number of vehicular drive parameters that may be applied incrementally to mechanical drive components to cause an autonomous vehicle to traverse along path segments driverlessly over the roadway. Hence, trajectory generator 258 may be configured to compute one or more vehicular drive parameters in real-time (or substantially in real-time) with which to apply to independent parking controller 256 or vehicle control unit 123, including driving control signals to effect propulsion, steering, braking, transmission shifting, lighting (e.g., emergency flashers), sound (e.g., automatic horn alerts, etc.), among other functions.

In some examples, autonomy controller 250 may receive status data 245, map data 246, and control data 247. Status data 245 may include state data about one or more components or sub-systems of an autonomous vehicle (e.g., existence of high temperatures in an electrical power plant or in other electronics, a state of power degradation or voltage degradation, etc.). Responsive to state data of the one or more components or sub-systems, independent parking controller 156 may be configured to modify a path of travel associated with a parking spot to, for example, modify an orientation or position of the vehicle as it parks. Map data 246, which may be optionally applied, may include data representing supplemental map data to assist in customized self-parking. Control data 247, which may be optionally applied, may include data representing supplemental commands originating from, for example, a user interface, such as on a mobile computing device or in the autonomous vehicle (not shown). One or more elements depicted in diagram 200 of FIG. 2 may include structures and/or functions as similarly-named or similarly-numbered elements depicted in other drawings, or as otherwise described herein, in accordance with one or more examples.

According to some examples, independent parking controller 256 may be configured to perform path planning, such as selecting an optimal path of travel that is collision-free based on, for example, terminating transit in a specialized orientation and position. Independent parking controller 256 may also generate drive parameters as (or as part of) command data, such as steering data 241, throttle data 242, braking data 243, or any other data 244, such as transmission shifting data (e.g., data describing gear and either a forward or reverse direction), for execution by vehicle control unit 223, which, in turn, may generate low-level commands or control signals for application to actuators or other mechanical or electromechanical components to cause changes in steering angles, velocity, etc.

Any functionality of one or more components of autonomy controller 250 (e.g., vehicle controller 254, independent parking controller 256, and vehicle control unit 223) may be combined with any other component or may be distributed among any number of other components. In one example, either independent parking controller 256 or vehicle controller 254, or a combination thereof, may be configured to perform one or more functions of an advanced driver assistance system ("ADAS") to control an autonomous vehicle. In some examples, autonomy controller 250 and any of its one or more components may be implemented in hardware or software (or a combination thereof). According to some examples, logic implemented in autonomy controller 250 may include executable instructions based on C++ programming languages, or any other programming language. Note, too, that data may be exchanged within or without an autonomous vehicle via vehicle-to-vehicle ("V2V") data links or vehicle-to-infrastructure ("V2I"), among other communication media, protocols, and technologies.

Figure 3:
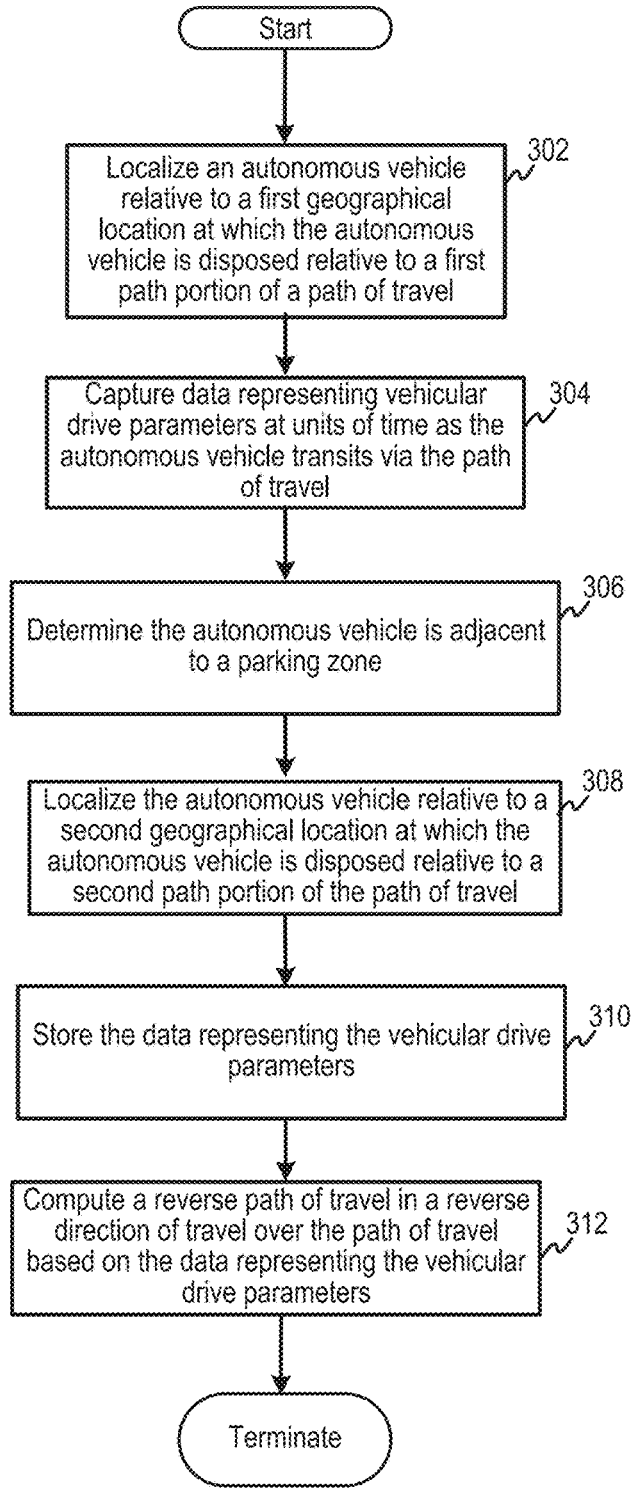
FIG. 3 is a flow diagram depicting an example of capturing vehicular drive parameters to form data representing a path of travel, according to some embodiments.

In a specific example, one or more components of autonomy controller may be implemented as one or more processors, such as one or more graphics processing units ("GPUs") configured to implement a framework and programming model suitable for GPUs. For example, a programming language, such as 'Compute Unified Device Architecture' ("CUDA")-based language, or any other compatible programming language that may be used to program the GPUs. CUDA™ is produced and maintained by NVIDIA of Santa Clara, Calif. Note that other programming languages may be implemented, such as OpenCL, or any other parallel programming language FIG. 3 is a flow diagram depicting an example of capturing vehicular drive parameters to form data representing a path of travel, according to some embodiments. Flow 300 begins at 302, at which an autonomous vehicle may be localized relative to a roadway over which the autonomous vehicle is transiting via a path of travel. The autonomous vehicle also may implement a high definition map data that may include one or monuments or markers with which to localize an autonomous vehicle at a geographic location relative to a path portion of a path of travel. The geographic location may be a waypoint adjacent a boundary or a waypoint at a customized parking location.

An autonomous vehicle, as described with respect to flow 300 or any other figure, may refer to any vehicle that has logic or an automated driving system configured to perform any level of automated driving, according to various embodiments. For example, an autonomous vehicle may refer to a level 4 automated vehicle (e.g., "high automation"), as well as an automated vehicle at level 3 (e.g., conditional automation) or at level 5 (e.g., full automation), whereby such levels are defined by SAE International ("SAE") of Warrendale, Pa., USA, or as adopted by the National Highway Traffic Safety Administration of Washington, D.C., USA. An autonomous vehicle, as described herein, may be described as an "autonomous-capable vehicle," which can be controlled by either a human or autonomous logic, or both, under any condition, at least in some examples.

At 304, data representing vehicular drive parameters may be captured at units of travel (e.g., at waypoints) as the autonomous vehicle transits via a path of travel. Here, data capture may be initiated to form a programmed path of travel (e.g., as a macro) responsive to accepting control signals from a subset of user control devices, examples of which include a steering mechanism, a throttle, a braking device, and a transmission shifting control, among others. In some examples, data capture may be initiated at a user interface (e.g., at a mobile phone or an interface within the autonomous vehicle).

At 306, and autonomous vehicle may be determined to be adjacent to a parking zone or location. In some examples, when an autonomous vehicle is adjacent to a targeted parking location, an independent parking controller may implement image data to capture imagery of an image target (e.g., a checkerboard, such as shown as 104 in FIG. 1, or any other symbolic or visual control image) for purposes of localization when orienting and positioning a vehicle driverlessly.

At 308, the autonomous vehicle may be localized at another geographic location relative to another path portion of a path of travel, whereby the other geographic location may be another waypoint at a terminated end of a programmed path of travel adjacent to either a boundary or at a customized parking location (e.g., depending on the direction of transit over the path of travel). At 310, data representing vehicular drive parameters for each of the waypoints may be stored for later implementation as part of a macro application. At 312, a reverse path of travel may be computed in a reverse direction, thereby using previously-captured vehicular drive parameters in a sequence in a reverse manner (e.g., opposite from the sequence in which waypoint data may be captured). Hence, data representing a preprogrammed path of travel in one direction may be used for driverless transit over the path of travel in either direction.

Figure 4:
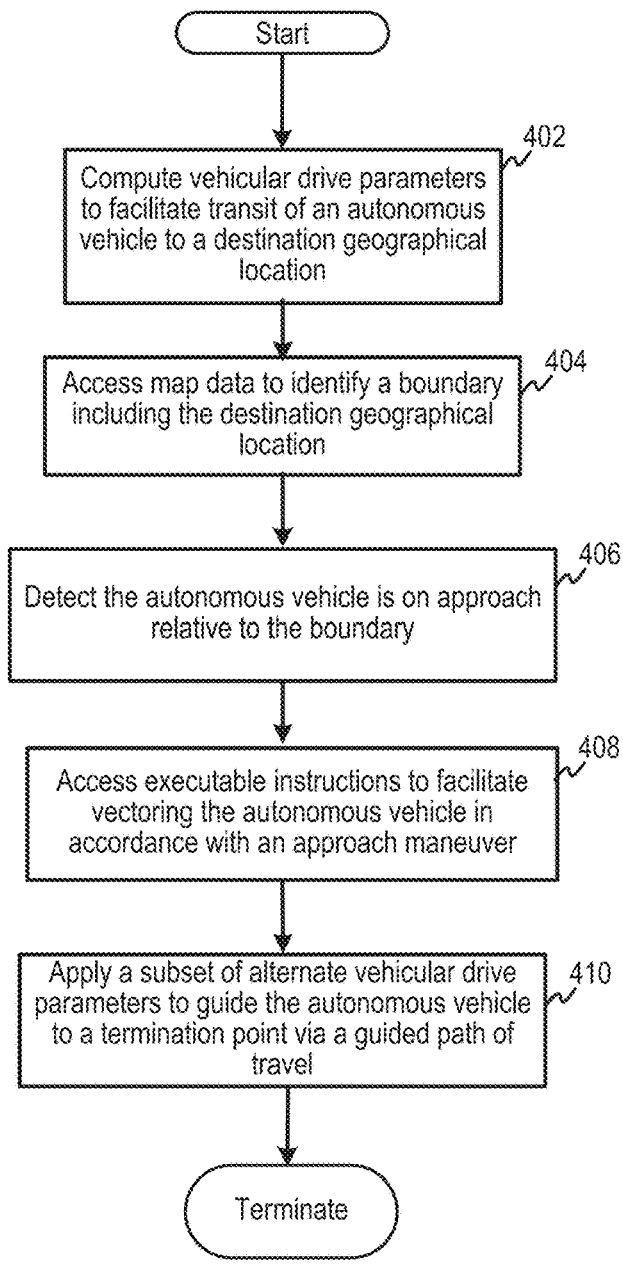
FIG. 4 is a flow diagram depicting an example of adapting usage of vehicular drive parameters between those based on generated trajectories and those based on a preprogrammed path of travel, according to some embodiments.

FIG. 4 is a flow diagram depicting an example of adapting usage of vehicular drive parameters between those based on generated trajectories and those based on a preprogrammed path of travel, according to some embodiments. Flow 400 begins at 402, at which subsets of vehicular drive parameters are computed to facilitate transit of an autonomous vehicle to a destination. In some examples, the subsets of vehicular drive parameters may be computed in real-time (or substantially in real-time) based on trajectories generated by a trajectory generator. At 404, map data may be accessed to identify a location of a boundary, such as geo-fence, to predict a transition from using generated trajectories for planning routes to using a preprogrammed path of travel to implemented customized parking driverlessly. At 406, an autonomous vehicle may be configured to detect its approach relative to a boundary within a range of distances. In at least one range of distances, an independent parking controller may be configured to adapt an initial path of travel to terminate at one or more initial waypoints of a preprogrammed path of travel, thereby effecting a relatively smooth or seamless transition from using instantaneously determined paths of travel to predetermined paths of travel.

At 408, executable instructions are access to facilitate vectoring of the autonomous vehicle in accordance with an approach maneuver implemented as a preprogrammed path of travel. For example, control logic in an autonomous vehicle may detect that it is approaching a boundary at 60 feet, and may also detect that a preprogrammed path of travel begins 3 feet to the right. The control logic may generate predicted vehicular drive parameters to merge (or "transition") the autonomous vehicle onto the preprogrammed path of travel. Steering angles at different distances from the boundary can be predicted to cause wheels to turn right incrementally so as to align the autonomous vehicle to at least one of the initial waypoints. Similarly, throttle positions may be reduced to decelerate autonomous vehicle (optionally along with application of one or more brake pressures) to enable the autonomous vehicle to reach a velocity suitable to maintain travel along a preprogrammed path of travel (e.g., without overshooting or erratically following predetermined waypoints).

At 410, a subset of vehicular drive parameters may be applied to guide the autonomous vehicle to a termination point via a preprogrammed (or guided) path of travel. In one example, the subset of vehicular drive parameters may include alternative vehicular drive parameters that may modify a preprogrammed path of travel, for example, when one or more passengers exit an autonomous vehicle and customized parking may be enhanced (e.g., optimized spacing about a parked vehicle). For example, a driver-side door may be positioned and oriented closely to a wall or any other object to maximize space at one or other sides of the autonomous vehicle. In some additional examples, a termination point to which the autonomous vehicle transits may include a location coinciding with either a battery charge station or a battery swap station, or both. As automated driving into battery charge or battery swap stations may involve relatively high magnitudes of voltages and currents that may harm a human, a preprogrammed path of travel to exit or enter a battery charge or swap station may include prerecorded executable instructions that are not alterable by a driver or passenger of the autonomous vehicle. Thus, laypersons may be prohibited from modifying a prerecorded executable set of instructions that are used to position and orient an autonomous vehicle in a specialized configuration, or pose, at a reserved battery charge or swap station.

Figure 5A:
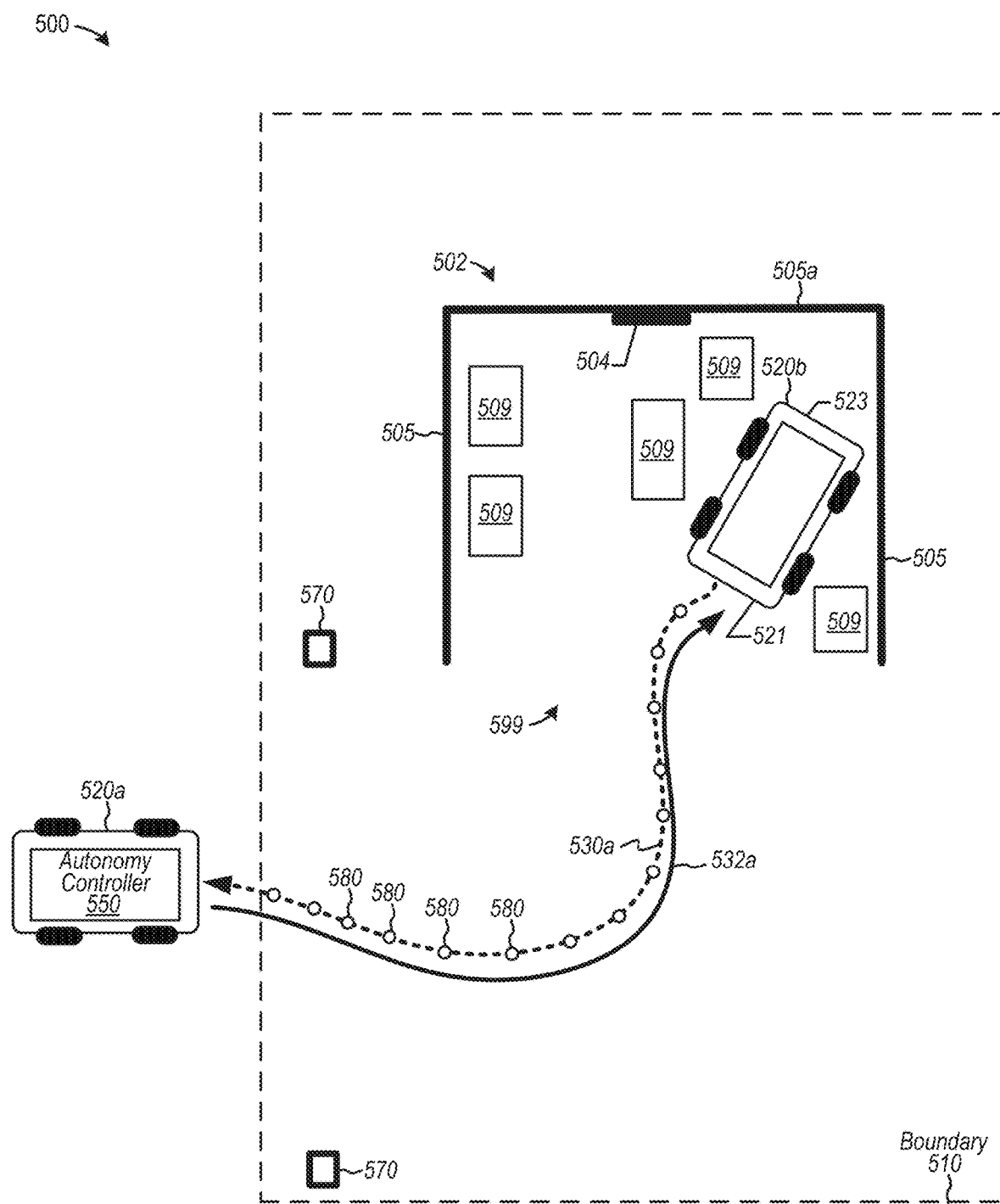
FIGS. 5A to 5C are diagrams depicting examples of autonomy controllers configured to implement driverless customized parking using a subset of vehicular drive parameters, according to some embodiments.

FIG. 5A is a diagram depicting an example of an autonomy controller configured to implement driverless customized parking using a first subset of vehicular drive parameters, according to some embodiments. Diagram 500 depicts an example of an autonomy controller 550 disposed in an autonomous vehicle 520, such as autonomous vehicle 520 at positions 520a and 520b. Diagram 500 also depicts a garage or parking port 502 including walls 505 and an image target 504, all of which are shown disposed in boundary 510. Further, diagram 500 depicts monuments or markers 570, such as a lamp post, a tree, or the like, that may be used to localized autonomous vehicle 520 at position 510a adjacent boundary 510. In the example shown, autonomy controller 550 may be configured to record values of vehicular drive parameters as the values are detected at, for example, units of travel under control of a human driver who may initiate data capture over a path of travel 530a. Further, autonomy controller 550 may be configured to implement captured values of vehicular drive parameters to automatically control displacement of autonomous vehicle 520 to, for example, exit a parking spot at which autonomous vehicle 520b is parked in a customized orientation and position relative to objects 509 at position 520b.

According to some examples, paths of travel 530a and 532a may be determined by capturing vehicular driver parameters at waypoints 580 as autonomous vehicle 520 traverses from position 520b to position 520a. Note that autonomous vehicle 520 may initiate data capture at position 520b, with autonomous vehicle 520 oriented such that anterior portion 521 is adjacent opening 599 of garage 502 and posterior portion 523 is positioned adjacent rear wall 505a. As autonomous vehicle 520 drives along path of travel 530a, under human control, data associated with waypoints 580 may be captured during motion from position 520b (e.g., in forward gear) to position 520b. In some examples, autonomy controller 550 may generate a macro that sequences waypoint data 580 in a reverse sequence. Thus, when executed, autonomous vehicle 520 can traverse in a forward gear via path of travel 532a from position 520a to position 520b. Note that path of travel 532a may be the same as path of travel 530a (but in an opposite direction). Thus, paths of travel 530a and 532a may be formed, optionally, in a single pass, with the same path of travel being used for traversing the same path in both directions as paths of travel 530a and 532a, according at least to some examples.

Figure 5B:
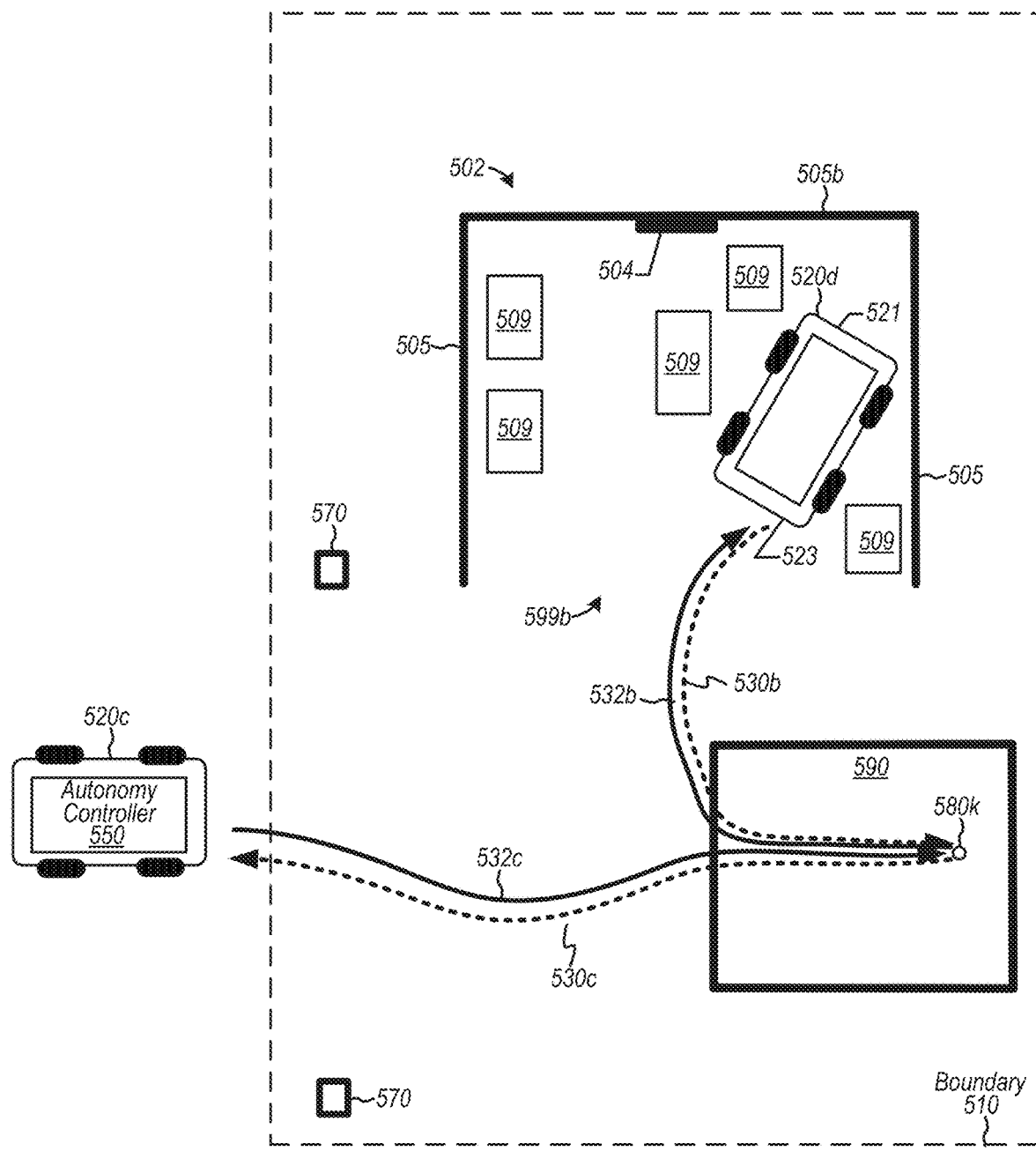

FIG. 5B is a diagram depicting another example of an autonomy controller configured to implement driverless customized parking using a subset of vehicular drive parameters that include multiple transmission parameters, according to some embodiments. Diagram 530 depicts an example of an autonomy controller 550 disposed in an autonomous vehicle, such as autonomous vehicle 520 at positions 520c and 520d. Diagram 530 also depicts other elements, any of which may include structures and/or functions as similarly-named or similarly-numbered elements depicted in other drawings, or as otherwise described herein, in accordance with one or more examples.

To generate a preprogrammed path of travel, autonomy controller 550 may be configured to record values of vehicular drive parameters as the values are determined at, for example, each unit of travel (e.g., at each waypoint), for example, under control of a human driver who may initiate data capture over a path of travel that includes path portions 530b and 530c. In this example, data capture may be initiated when autonomous vehicle is at position 520d, whereby autonomous vehicle 520 is oriented such that anterior portion 521 is positioned adjacent rear wall 505b and posterior portion 523 is positioned adjacent opening 599b of garage 502. Thus, to exit garage 502, autonomous vehicle 520 drives along path portion 530b in a reverse gear to back out of garage 502 until autonomous vehicle reaches intermediate region 590 at which a transmission gear is shifted from a reverse direction to a forward direction. Changes in directionality of a transmission state (e.g., from reverse to forward) may be captured as data representing vehicular drive parameters at waypoint 580k. Next, data capture may continue as a human driver steers and accelerates autonomous vehicle 520 to transit over path portion 530c in forward gear to exit boundary 510 at position 520c. Note that depictions of waypoints along path portions 530b and 530c are omitted.

Autonomy controller 550 of FIG. 5B may be configured to generate a macro that sequences waypoint data in both in the sequence it was captured and in a reverse sequence. Thus, when executed, autonomous vehicle 520 can traverse in a forward gear via path portion 532c driverlessly when entering boundary 510 from position 520c. Path portion 532c may be the same as path portion 530c from position 520c to position 520d (but in an opposite direction). When autonomous vehicle 520 arrives at waypoint 580k, autonomy controller 550 may automatically shift the transmission from a forward gear to a rear gear in accordance with execution of a macro application using preprogrammed vehicular drive parameters. Next, autonomous vehicle 520 may back into garage 502 via path portion 532b, which may be equivalent to path portion 530b (in an opposite direction), and park in a customized orientation and position with anterior portion 521 adjacent opening 599b (not shown). Thereafter, a macro application may be implemented any number of times to cause autonomous vehicle 520 to driverlessly traverse either path portions 530b and 530c or path portions 532d and 532b. Thus, preprogrammed paths of travel may be formed, optionally, with one pass over a common path of travel, which may be used to traverse path portions 530b and 530c and path portions 532d and 532b, according at least to some examples.

In some examples, a macro may implement preprogrammed path portions 530b and 530c of FIG. 5B when autonomous vehicle 520 to exit garage 502. Further, a modified macro (or another macro) may also be used to implement another preprogrammed path, such as preprogrammed path of travel 532a of FIG. 5A, to facilitate driverless transit of autonomous vehicle 520 to enter garage 502. Accordingly, autonomy controller 550 may be configured to select a preprogrammed path of travel from a subset of preprogrammed paths of travel to facilitate customized parking in garage 502.

Figure 5C:
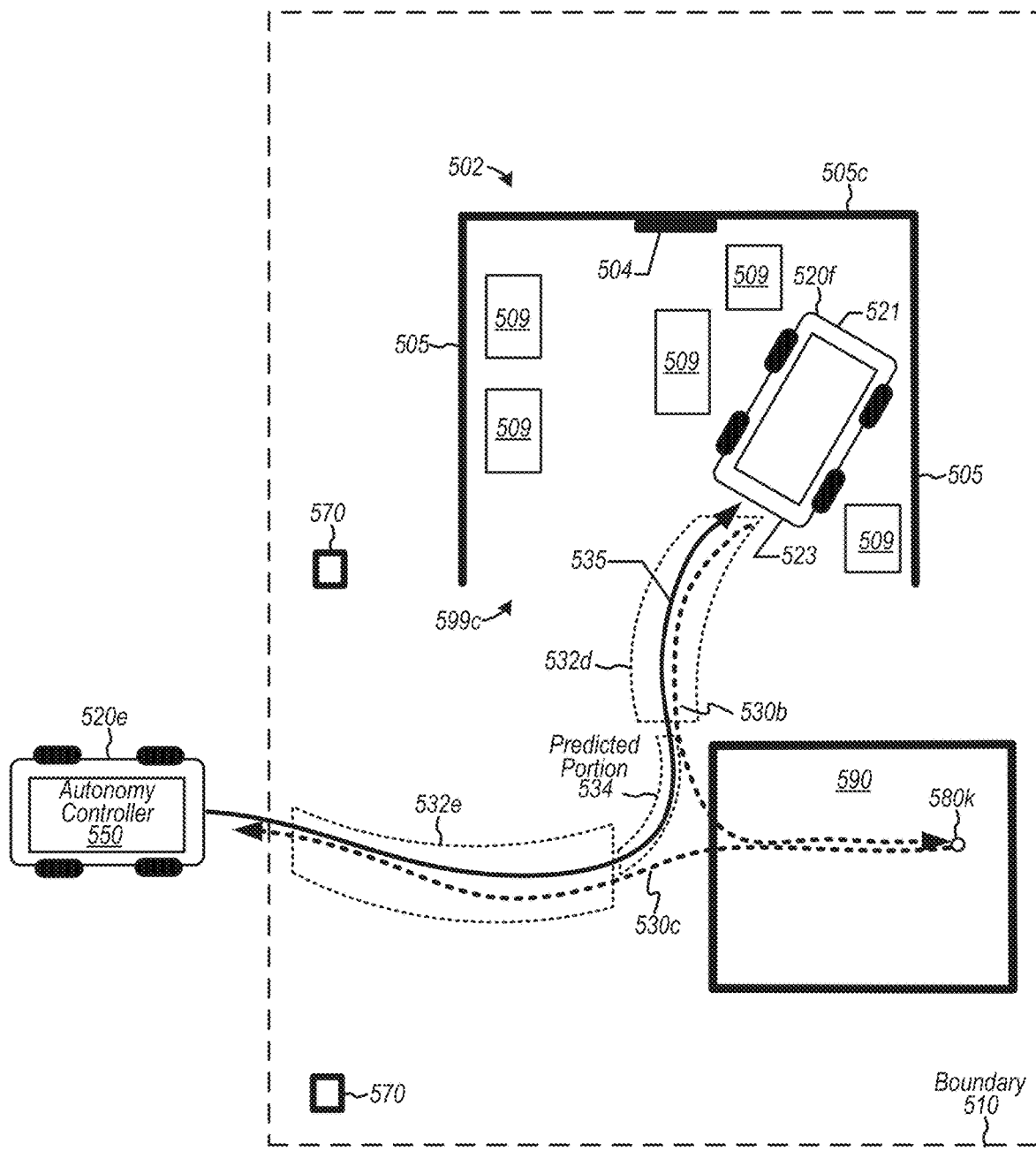

FIG. 5C is a diagram depicting yet another example of an autonomy controller configured to predict path portions to implement driverless customized parking, according to some embodiments. Diagram 560 depicts an example of an autonomy controller 550 disposed in an autonomous vehicle, such as autonomous vehicle 520 at positions 520e and 520f. In accordance with the example shown, autonomy controller 550 may be configured to record values of vehicular drive parameters to form a preprogrammed path of travel in a manner similar to that described in FIG. 5B. Hence, vehicular drive parameters may be captured in FIG. 5C via path portions 530b and 530c, which may be equivalent to the path portions of FIG. 5B. Diagram 560 also depicts other elements, any of which may include structures and/or functions as similarly-named or similarly-numbered elements depicted in other drawings, or as otherwise described herein, in accordance with one or more examples.

In this example, however, autonomy controller 550 may be configured to generate a predicted path portion 534 to facilitate driverless transit to a customized parking location in garage 502 over a predicted path of travel 535. For example, autonomy controller 550 may capture vehicular drive parameters at a various waypoints (not shown) on path portions 530b and 530c, similar to that described in FIG. 5B. Autonomy controller 550 may be configured to generate a macro that sequences through waypoint data in portions 532e and 532d in a reverse manner that were captured in portions 530c and 530b, respectively. To omit data representing a change in transmission state at waypoint 580k, autonomy controller 550 may be configured to generate predictive waypoints (and predictive values of vehicular drive parameters) based on waypoint data (not shown) in portions 532e and 532d. For example, predictive values of vehicular drive parameters for predicted portion 534 may include incremental changes in steering/wheel angles, throttle positions, braking pressures, transmission gear states, etc. to generate a preprogrammed portion 534 of a path of travel 535 for seamless transit from captured vehicle driver parameters in portion 532e to captured vehicle drive parameters in portion 532d, the latter of which may be configured to facilitate customized parking in position 520f with anterior portion 521 adjacent wall 505c and posterior portion 523 adjacent opening 599c. Thereafter, autonomy controller 550 may be configured to select any of a preprogrammed path of travel 535, a combination of preprogrammed path portions 530b and 530c, or any other preprogrammed path of travel to facilitate automatic customized parking.

Figure 6:
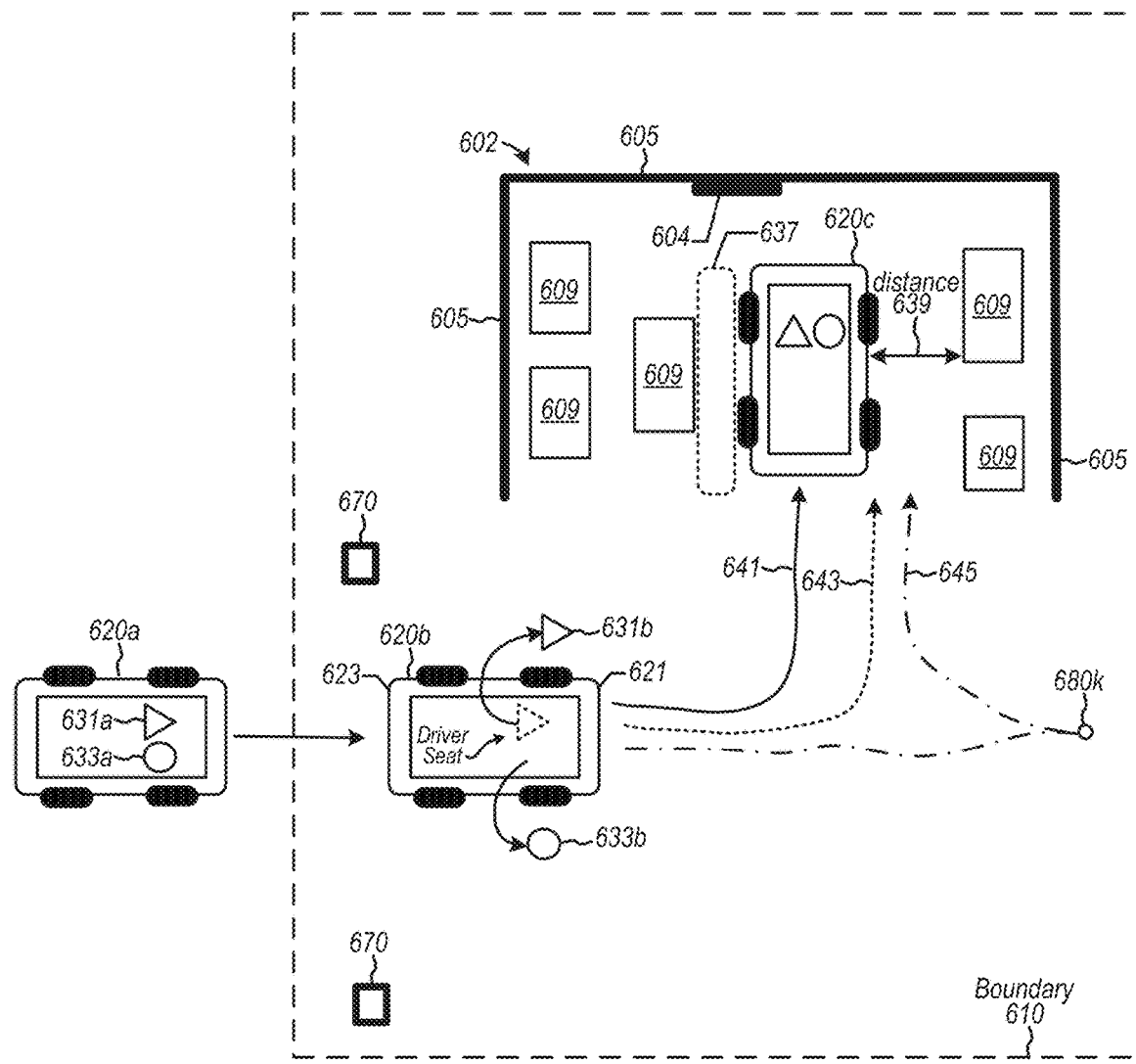
FIG. 6 is a diagram depicting an example of an autonomy controller configured to modify a path of travel to implement driverless customized parking, according to some embodiments.

FIG. 6 is a diagram depicting an example of an autonomy controller configured to modify a path of travel to implement driverless customized parking, according to some embodiments. Diagram 600 depicts an example of an autonomous vehicle 620 including an autonomy controller (not shown) that may be configured to form and implement preprogrammed paths of travel to propel autonomous vehicle 620 from position 620a to position 620c, which is a parking location at which autonomous vehicle 620 may be oriented and positioned in accordance, for example, to user preferences.

According to various examples, an autonomy controller may be configured to adapt a functionality of a macro application, or modify a preprogrammed path to facilitate transit of autonomous vehicle 620 driverlessly to position 620c. For example, an autonomy controller may be configured to a modify, responsive to one or more characteristics of autonomous vehicle 620, a preprogrammed path of travel or select one of a number of preprogrammed paths of travel to a customized parking position. Examples of one or more characteristics of autonomous vehicle 620 that may influence selection of a preprogrammed path of travel include data representing a number of passengers (including a driver), data representing whether a passenger may enter or exit autonomous vehicle 620 at a particular side, data representing whether a passenger, including the driver, exits autonomous vehicle 620 during transit of a preprogrammed path of travel, a particular amount of space adjacent a driver or passenger door, and the like. One or more elements depicted in diagram 600 of FIG. 6 may include structures and/or functions as similarly-named or similarly-numbered elements depicted in other drawings, or as otherwise described herein, in accordance with one or more examples.

In the example shown, an autonomy controller may be configured to select (or modify) one of preprogrammed paths of travels 641, 643, and 645 to, for example, optimize an amount of space 637 in garage 602 adjacent one side of autonomous vehicle 620 at position 620c (e.g., to enable a driver to exit the vehicle while maximizing useable space), as well as optimize a distance 639 between another side of autonomous vehicle 620 and an object 609 (e.g., to enable a passenger to exit the vehicle).

To illustrate selection of a path of travel, consider the following example. Autonomous vehicle 620 at position 620a is shown adjacent boundary 610 prior to crossing and transitioning to a preprogrammed path of travel. At position 620a, autonomous vehicle 620 includes a driver 631a and a passenger 633a. Prior to transiting to position 620b, and autonomy controller may be configured to implement preprogrammed path of travel 641 to accommodate driver 631a and passenger 633a when exiting into areas associated with space 637 and distance 639, respectively. However, consider that passenger 633b exits autonomous vehicle at position 620b along path of travel 641. Responsive to determining passenger 633b is absent from autonomous vehicle 620, autonomy controller may be configured to execute instructions to select or modify another preprogrammed path of travel 643, which may be configured to position a side surface portion of autonomous vehicle 620 at distance 639 that may optimize spatial dimensions at space 637 (e.g., adjacent to another side surface portion). Thus, distance 639 may be reduced to, for example, to 2-3 inches, or less, thereby enhancing space 637. As such, autonomous vehicle 620 may terminate transit at a modified pose (e.g., at position 620c) at distance 639.

In another example, consider that both driver 631b and passenger 633b may exit autonomous vehicle 620 at position 620b. Responsive to an absence of all passengers, the autonomy controller may be configured to implement path of travel 645, which includes a directional shifting of transmission gears (e.g., from forward to reverse) at waypoint 680k. As such, autonomous vehicle 620 may back into garage 602 with a driver-side door being at a distance 639 (not shown) from an object 609. Thus, space 637 may be increased by reducing distance 639. Note that the above-described examples are merely illustrative and are not intended to be limiting. Therefore, an autonomy controller may be configured to select any path of travel or any preprogrammed path of travel to facilitate a customized disposition of an autonomous vehicle 620 in accordance with user preferences.

Figure 7:
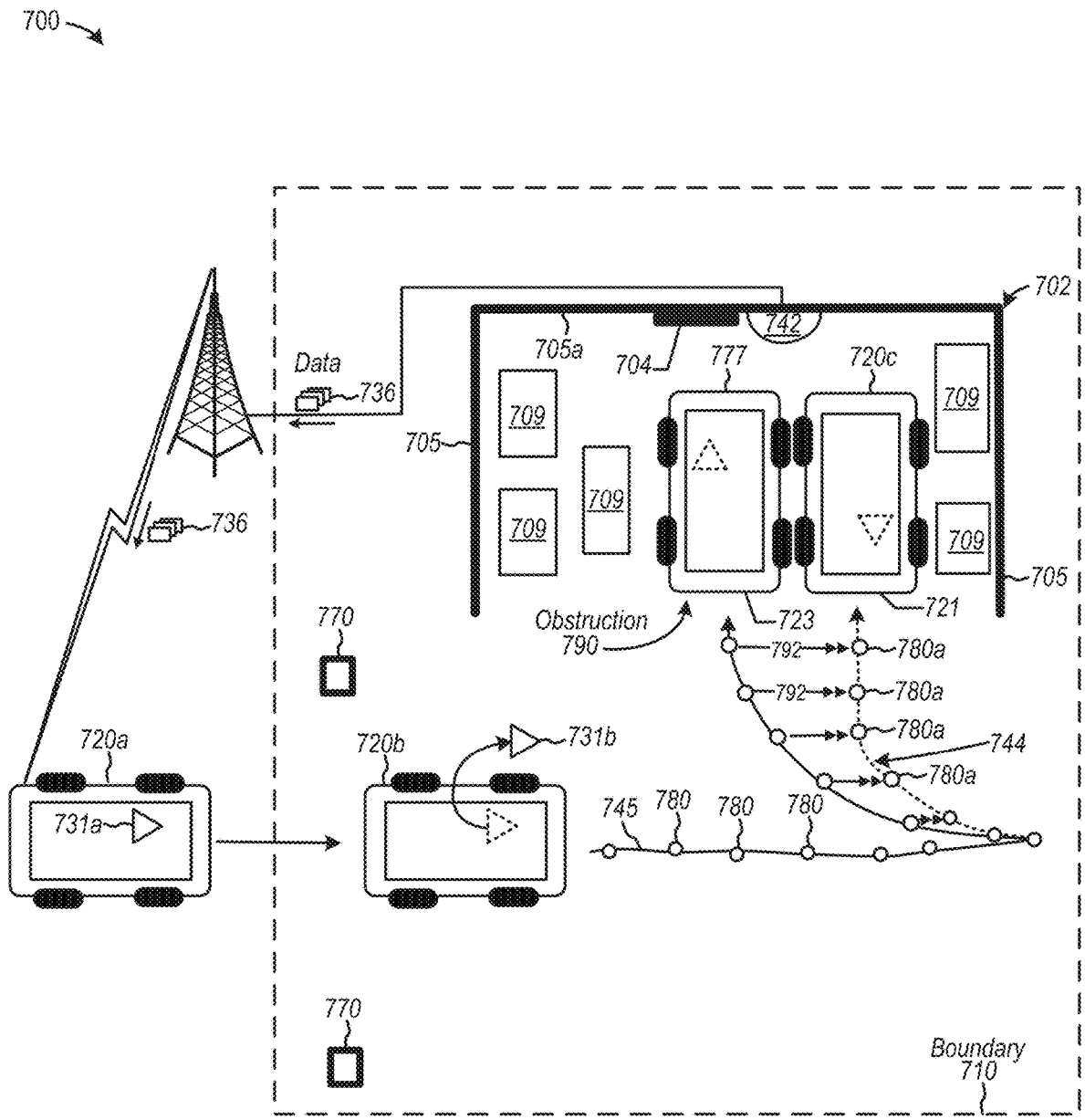
FIG. 7 is a diagram depicting another example of an autonomy controller configured to modify a path of travel to implement driverless customized parking, according to some embodiments.

FIG. 7 is a diagram depicting another example of an autonomy controller configured to modify a path of travel to implement driverless customized parking, according to some embodiments. Diagram 700 depicts an example of an autonomous vehicle 720 including an autonomy controller (not shown) configured to implement driverless transit to a parking location at which autonomous vehicle 720 may be oriented and positioned in accordance, for example, to user preferences. One or more elements depicted in diagram 700 of FIG. 7 may include structures and/or functions as similarly-named or similarly-numbered elements depicted in other drawings, or as otherwise described herein, in accordance with one or more examples.

According to various examples, an autonomy controller may be configured to receive data 736 via one or more networks from a device 742 including one or more sensors to monitor spatial changes within a garage 702 that may impede or interfere with parking. For example, during time periods in which autonomous vehicle 720 is traveling outside boundary 710, one or more other persons with access to garage 702 may move objects 709 or park another vehicle 777 within garage 702. A moved object 709 or parked vehicle 777 may be an obstruction 790 that may prevent autonomous vehicle 720 from being able to park in an orientation and position associated with preprogrammed path of travel 745. Device 742 may include any sensor implemented in autonomous vehicle 720, such as a camera, radar, lidar, etc. Device 742 also may include a processor and memory configured to generate executable instructions to change or update a macro application and a preprogrammed path of travel that may be affected by obstruction 790. Device 742 may transmit data 736 representing either spatial data associated with garage 702 or updated executable instructions, or both. Data 736 may be used by an autonomy controller to modify a functionality of a macro application to implement a modified preprogrammed path of travel 745 to park in a customized orientation and position at position 720c.

Consider the following example in which device 742 generates data 736 that indicates vehicle 777 has pulled into garage 702 to park. Hence, vehicle 777 is an obstruction 790 to driverless parking via preprogrammed path of travel 745. Vehicle 777 is shown to be oriented such that posterior portion 723 is adjacent to garage opening. Data 736 may be transmitted to the autonomy controller on-board autonomous vehicle 720 at position 720a. Prior to entering boundary 710, the autonomy controller can be configured to detect impeding object 777 on a second path portion disposed at a location coinciding with a parking port (e.g., garage 702). Based on data 736, the autonomy controller may determine garage 702 has sufficient space at position 720c at which autonomous vehicle 720 may park. To implement preprogrammed path of travel 745, the autonomy controller may identify waypoints that may be modified to form predicted waypoints 780a, which, in turn, may form a predicted path portion 744 over which autonomous vehicle 720 may traverse driverlessly into garage 702. As an example, the autonomy controller may predict an amount of displacement 792 from waypoints on a portion of 745 to predicted waypoints 780a. Further, autonomy controller may also predict changes to steering/wheel angles, braking pressures, throttle positions, transmission gear states, etc. for each of predicted waypoints 780a to facilitate transit, in reverse gear, over predicted path portion 744 so that autonomous vehicle 720 backs into garage 702 to park at position 720c. In some cases, predicted path portion 744 may cause the autonomy controller to generate a notice (e.g., via a user interface) to exit autonomous vehicle 720 at position 731b to effect driverless parking. Hence, data 736 may be used to generate predicted path portion 744 (as a modified path of travel at a path portion 744 of path of travel 745) that may be used to automatically terminate transit at an alternate pose in a parking spot. In some examples, implementing predicted waypoints 780a may provide more precise and accurate determinations to park autonomous vehicle 720 driverlessly than otherwise might be the case in some situations (e.g., use of generated trajectories).

Figure 8:
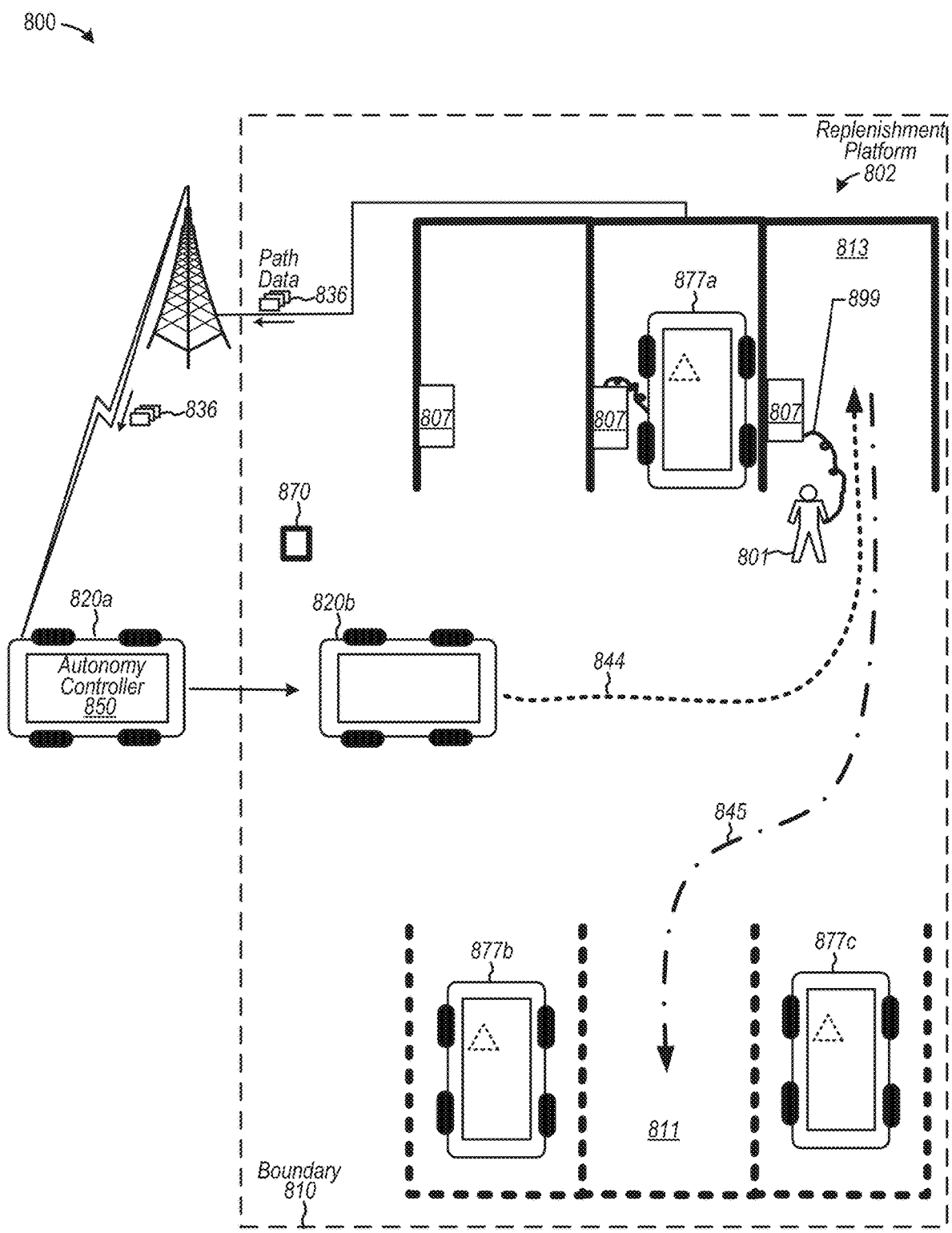
FIG. 8 is a diagram depicting an example of an autonomy controller configured to implement a preprogram path of travel to implement a driverless approach to a fuel replenishment station, according to some embodiments.

FIG. 8 is a diagram depicting an example of an autonomy controller configured to implement a preprogram path of travel to implement a driverless approach to a fuel replenishment station, according to some embodiments. Diagram 800 depicts an example of an autonomous vehicle 820 that includes an autonomy controller (not shown) that is configured to implement driverless transit on approach to a fuel replenishment station 807, whereby the driverless approach may be influenced by a preprogrammed path of travel formed to minimize or negate risk of inadvertent collision or accidents with fuel replenishment station. Such stations may include various hazards, including high voltages and currents, volatile fuel (e.g., hydrogen, liquid natural gas, etc.), and the like. One or more elements depicted in diagram 800 of FIG. 8 may include structures and/or functions as similarly-named or similarly-numbered elements depicted in other drawings, or as otherwise described herein, in accordance with one or more examples.

Diagram 800 depicts a replenishment platform 802 disposed in a boundary 810 and including at least two or more fuel replenishment stations 807. Examples of fuel replenishment stations include electric charging stations, hydrogen fueling stations, liquid natural gas stations, etc. In the example shown, fuel replenishment stations 807 may be implemented as "charging stations" with which an amount of fuel may be dispensed in units of fuel, such in units of battery charge or energy (or the equivalent thereof). An amount of charge may be expressed in kilowatts-hours ("kWh"), ampere-hours ("A-hr"), or the like.

Autonomy controller 850 may transition from implementing real-time generation of trajectories from which to select a path segment to travel along a roadway, such as at position 820a. Vehicular drive parameters then may be derived based on a selected trajectory. As autonomous vehicle 820 approaches boundary 810, autonomy controller 850 may be configured to implement a preprogrammed path of travel, such as path of travel 844, with which to guide transit of autonomous vehicle 820 to a charging bay 813 from position 820b. In some examples, data representing any number of preprogrammed paths of travel may be stored on-board autonomous vehicle 820 for use in navigating autonomous vehicle 820 to any of charge bays 813. In additional examples, autonomy controller 850 may be configured to receive via a wireless network data 836 representing a macro application and/or a preprogrammed path of travel over which autonomous vehicle 820 is authorized to transit. A preprogrammed path of travel 844 transmitted as data 836 may include data representing particular waypoints associated with geographic locations, as is determined by GPS or any odometry techniques. Further, preprogrammed path of travel 844 may include vehicular drive parameters (e.g., steering/wheel angles, transmission gear states, throttle position, etc.) adapted for the particular model of autonomous vehicle 820. Different models of autonomous vehicles may have different dimensions, and may also have different mechanical responses to different values of vehicular drive parameters. For example, a turning radius for one model of autonomous vehicle may differ from another model of autonomous vehicle. Thus, a macro application may be adapted to particular model of autonomous vehicle 820 to facilitate relatively accurate and precise travel over preprogrammed path of travel 844. The adaptive macro application may include executable instructions to orient and position autonomous vehicle 820 driverlessly (e.g., without a driver or any passenger) adjacent to charging station 807 in charging bay 813 to accept a fuel interface (e.g., a plug of a charging cable) to receive fuel (e.g., electric charge or power). In some examples, a human driver in autonomous vehicle 820 may provide control inputs to drive into charging bay 813, which is adjacent another charging bay including vehicle 877*a*.

According to some examples, autonomous vehicle 820 may be coupled to charging station 807 via charging cable 899. When an amount of fuel units (e.g., amount of charge) reach a certain level of charge indicating that a battery has sufficient stored energy to propel autonomous vehicle 820 over a minimum distance in normal traffic conditions, autonomy controller 850 may be configured to deactivate a lock (e.g., an electromagnetic locking mechanism) that affixes charge cable 899 to autonomous vehicle 820 during refueling (e.g., during battery charging). Another user 801 or service personnel may disconnect cable 899 from autonomous vehicle 820 if the owner/driver of autonomous vehicle 820 is not present. In some examples, autonomous vehicle 820 may produce visual or audio messages alerting persons nearby that autonomous vehicle 820 has "completed charging" and a next user 801 is invited to "remove cable 899" to vacate charging bay 813. Upon detecting disconnection of cable 899, autonomy controller 850 may be configured to exit charging bay 813 driverlessly via path of travel 845 to park in location 811, among other vehicles 877*b* and 877*c*. In some cases, path of travel 845 may be implemented by execution of a macro application. Autonomy controller 850 therefore may be configured to free up charging bay 813 so as to enable other users to access charging bay 813 to reduce downtime and increase throughput, which also enhances users' experiences collectively. Alternatively, autonomous vehicle may return driverlessly to its point of geographic origination, such as a user's driveway at a residence.

Figure 9:
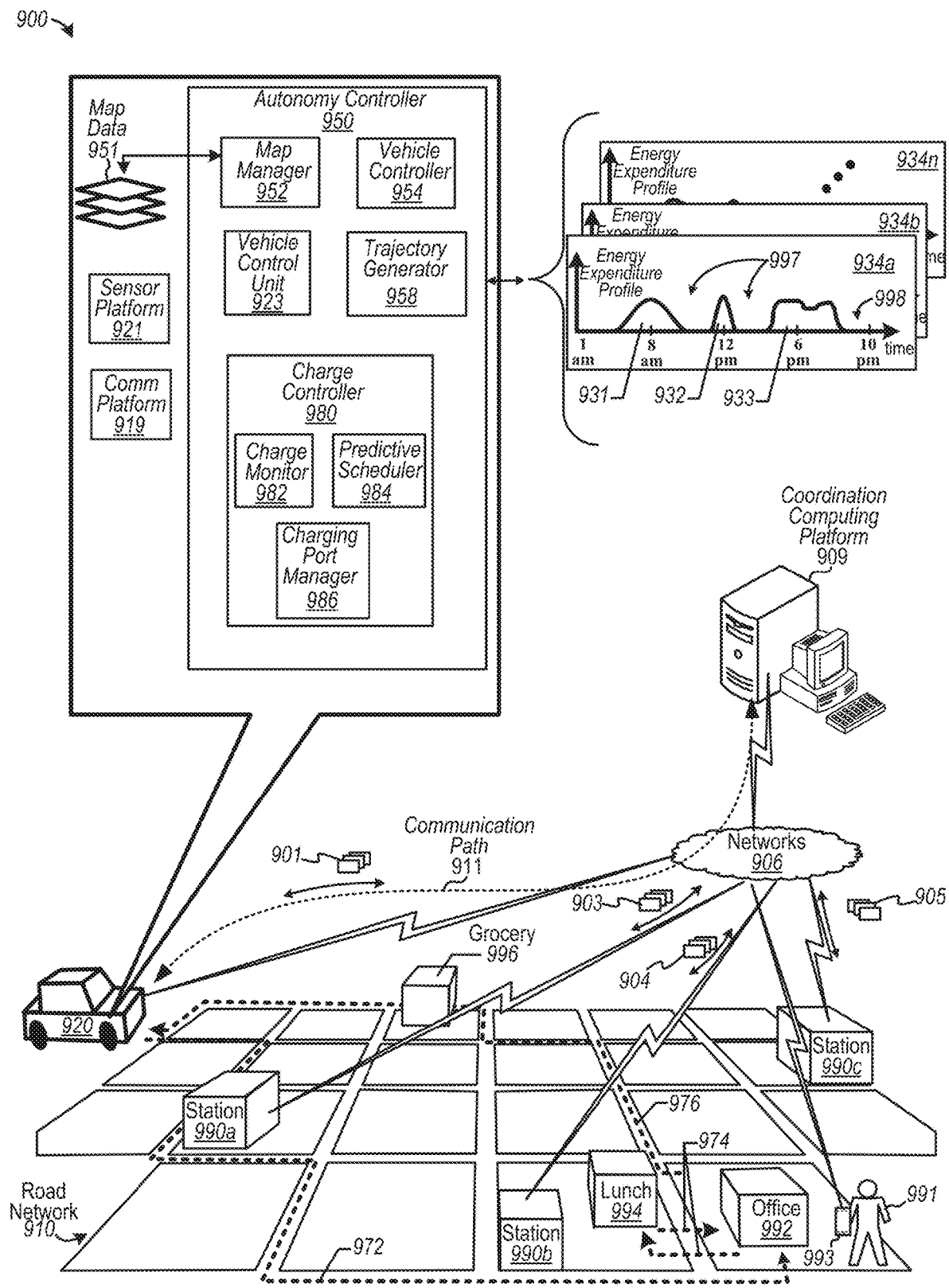
FIG. 9 is a diagram depicting an example of an autonomy controller configured to coordinate driverless transit to a fuel replenishment station, according to some embodiments.

FIG. 9 is a diagram depicting an example of an autonomy controller configured to coordinate driverless transit to a fuel replenishment station, according to some embodiments. Diagram 900 depicts an example of an autonomous vehicle 920 including an autonomy controller 950, a sensor platform 921, and a communication platform ("comm platform") 919. Communication platform 919 may be a communication facility that includes a transceiver device (e.g., RF transmitters and receivers) configured to exchange data and electronic messages wirelessly via an antenna (not shown). In the example shown, communication platform 919 may be configured to implement a communication path 911 to exchange electronic messages between autonomous vehicle 920 and a coordination computing platform 909 via one or more networks 906. Coordination computing platform 909 may be configured to coordinate scheduling fuel replenishment for an autonomous vehicle 920, which may travel to a particular replenishment station driverlessly at optimal intervals of time. An optimal interval of time may include a time period during which autonomous vehicle 920 may be idle. For example, an owner/passenger/occupant may not need to use autonomous vehicle 920 during a period of time when performing non-travel related activities such as sleeping, working, or performing any other activity external to autonomous vehicle 920.

Autonomy controller 950 may be configured to monitor levels of fuel (e.g., levels of charge or energy, if electric battery-powered), predict an optimal time at which to recharge a battery, and schedule a charging session at a particular charging station. Autonomy controller 950 is shown to include a map manager 952 to manage map data 951, a vehicle controller 954, a vehicle control unit 923, a trajectory generator 958, and a charge controller 980. One or more elements depicted in diagram 900 of FIG. 9 may include structures and/or functions as similarly-named or similarly-numbered elements depicted in other drawings, or as otherwise described herein, in accordance with one or more examples.

Charge controller 980 is shown, at least in this example, to include a charge monitor 982, a predictive scheduler 984, and a charging port manager 986. According to some examples, charge controller 980 may be configured to monitor charge or energy levels of a battery relative to, for example, one or more thresholds and predict an interval of time during which to activate driverless recharging so that a battery may be recharged sufficiently to propel autonomous vehicle 920 over a range of distances to accomplish planned or predicted activities (e.g., traveling to an office, a restaurant, a grocery store, and returning home). Driverless recharging may include controlling autonomous vehicle 920 to transit driverlessly to and from a charging station, and to engage a charging station to replenish an amount of battery energy.

Charge monitor 982 may be configured to monitor an amount of fuel units against data representing a threshold indicative of a portion of fuel reservoir capacity. If autonomous vehicle 920 includes a battery, charge monitor 982 may be configured to determine "an amount of charge" (as an amount of fuel units) that may be stored in one or more batteries relative to a total capacity of charge that batteries may store (e.g., a "fuel reservoir capacity"). Data representing an amount of fuel units may be expressed in terms of kilowatts-hours ("kWh"), ampere-hours ("A-hr"), or the like to specify an amount of charge or energy that may be replenished, recharged, or added to the one or more batteries. In some examples, charge monitor 982 may determine levels of charge or energy against any number of thresholds. A first threshold may represent a critical level, such as a level representing one-eighth or one-sixteenth of the total charge capacity, such that charge monitor 982 may generate a data signal representing a critical level of charge. In at least one case. A second threshold may represent one level of charge or energy against which a battery level may be compared to determine whether the level of charge is sufficient to propel or power autonomous vehicle 920 to perform the subset of planned or predicted activities during a period of time (during the time when a driver/passenger/occupant is awake). The second threshold represents a level of charge for accomplishing a user's transportation goals without intervening recharge, at least in some examples. Charge monitor 982 can generate a data signal indicating the second threshold is crossed upon detection. Other threshold levels may be implemented.

Predictive scheduler 984 may be configured to determine or predict an amount of fuel expenditure (e.g., charge or energy depletion) of autonomous vehicle 920 during a range of time, such as during a weekday in which a user may use autonomous vehicle 920 to transit via route 972 in a road network 910 (e.g., a network of roadways) to arrive an office 992 at which the user performs work-related activities. Fuel expenditure may also include a predicted depletion of charge during transit to and from a restaurant 994 for lunch via routes 974. Further, charge or energy may be expended as user is transported in autonomous vehicle 920 over route 976 to a grocery store 996 prior to transiting home. As an example, the above-described predicted fuel expenditure may be predicted and stored as data representing an energy expenditure profile, such as profiles 934a, 934b, and 934n. Data representing energy expenditure profile 934a may describe predictive rates of energy expended, such as amounts 931, 932, and 933 during intervals of time associated with profile 934a. Further to the example shown, a first amount of predicted energy expended to travel route 972 may be represented as an amount 931 around 8 am, a second amount of predicted energy expended to travel routes 974 are represented as an amount 932 between 12 pm and 1 pm, and a third amount of predicted energy expenditure travel route 976 (e.g., between 5 pm and 8 pm).

Predictive scheduler 984 may also be configured to calculate a total predicated energy expenditure based on a combination of energy expenditures 931, 932, and 933, and may be further configured to determine whether the total predicated energy expenditure may be equivalent to or above a threshold, such as the above-described second threshold. For example, charge monitor 982 may be configured to transmit the data signal specifying an amount of charge stored in a battery. Predictive schedule 984 may determine that the calculated total amount of energy expenditure over time intervals associated with amounts 931, 932, and 933 is less than amount of energy depletion that may cause the charge the battery to drop below the second threshold. Thus, in cases in which the total calculated energy expenditure to travel routes 972, and 974, and 976 is less than amount of charge that may drop below a threshold, then driverless recharging activities may be reserved to overnight hours 998 when a user/driver/passenger/occupant is asleep.

But in cases in which a calculated total energy expenditure to travel routes 972, and 974, and 976 may cause a battery level to fall below the second threshold, a supplemental replenishment or recharge may be sought to ensure a user may complete its travel to office 992, restaurant 994, and grocery store 996 before returning home. To implement supplemental charging, predictive scheduler 984 may be configured to identify a subset of time periods as a candidate time frame to replenish at least a portion of a fuel reservoir capacity (e.g., to supplement a level of charge on a battery) to enable autonomous vehicle 920 to travel routes 972, 974, and 976. For example, one or more intervening time periods 997 may be identified as candidate time frames during which autonomous vehicle 920 is idle (or vacant). So while autonomous vehicle 920 may be idle during time periods 997, autonomous vehicle 920 may be activated to travel driverlessly to one of charging stations 990a, 990b, and 990c to replenish an amount of charge, and to return driverlessly.

Predictive schedule 984 may be further configured to reserve a charging station during candidate time frames 997 to recharge at least a portion of the capacity level of a battery. Predictive schedule 984 may be configured to cause autonomy controller 950 to transmit an electronic message 901 from autonomous vehicle 920 to a coordination computing platform 909 to coordinate and reserve a replenishment station at a specific time associated with one of candidate time frames 997. For example, autonomy controller 950 may transmit data 901 as a reservation request via communication path 911, the request being configured to reserve a replenishment station in a network of replenishment stations 990a, 990b, and 990c as a function of, for example, candidate time frames 997 and a predicted fuel expenditure (e.g., an amount of charge to supplement a battery, which may be associated with a time period to complete the recharge of at least a portion of a capacity of a battery). In some examples, request data 901 may include autonomous vehicle ("AV") data representing autonomous vehicle characteristics with which to determine the replenishment station. Examples of autonomous vehicle characteristics include a model or type of autonomous vehicle 920 (including the dimensions and mechanical performance characteristics, such as turning radii), a type of power plant (e.g., whether a combustion engine, electric motor, etc.), a type of fuel (e.g., electricity, hydrogen, liquid natural gas, diesel, biofuel, etc.), a type of replenishment interface (e.g., a type of connector, such as a NEMA or SAE J1772 connector), a type of pricing (e.g., free or paid, and if paid, "per hour" pricing, "per session" pricing, "per unit power usage," such as kWh, etc.), one or more time intervals in which an autonomous vehicle is available for driverless charging, and the like.

Coordination computing platform 909 may be configured to coordinate reservation of charging of autonomous vehicle 920 at preferable intervals of time (e.g., during periods when autonomous vehicle is idle). In particular, coordination computing platform 909 may include executable instructions to receive characteristics of replenishment stations (or charging stations) 990a, 990b, and 990c as station data 903, 904, and 905, respectively. In some examples, station data 903, 904, and 905 may include one or more of the following station characteristics: a unique station identifier, a charging station manufacturer name, a pricing model (e.g., free or paid, and if paid, "per hour" pricing, "per session" pricing, "per unit power usage," such as kWh, etc.), a geographic location of a charge station (e.g., latitude and longitude coordinates), a supported voltage (e.g., 120 v or 240 v), a support current (e.g., 16 A, 32 A, 63 A, 100-125 A, 300-350 A, etc.), an amount of power supported (kW), a cable connector or interface type, one or more levels and/or rates of charging available at a charging station (e.g., "level 1" charging, such as 120V/16 A at about 4 miles per hour charging via NEMA outlet connector; "level 2" charging, such as 240V/80 A at about 70 miles per hour charging; "level 3" charging, such as DC Fast Charging at 240V and 400 A; and the like), an indication whether a charging station is in use, relevant reservation data for a charging station, etc. Coordination computing platform 909 may include either hardware or software, or a combination thereof, and may implement one or more servers and memory devices, regardless whether distributed over any number of geographic locations.

Coordination computing platform 909 further may be configured to compare autonomous vehicle characteristic 901 data against station data 903, 904, and 905 associated with a pool of charging stations 990a, 990b, 990c, among others, to identify a subset of station data for charging stations that may be available to reserve for autonomous vehicle 920. Thus, station data 903, 904, and 905 from one or more charging stations in the subset of station data may be transmitted, as a list of replenishment stations, for presentation on an interface in autonomous vehicle 920 or a user device 993 (e.g., mobile computing device or phone). For example, a user 991 may be presented a list of charging stations from which to select for performing driverless charging. Coordination computing platform 909, therefore, may be detect a user input originating at a user device 993 in data representing a selected replenishment station. In turn, mobile computing device 993, or the like, may be configured to transmit a confirmatory electronic message to autonomy controller 950 to enable driverless transit to receive fuel replenishment at a scheduled time. Thus, user 991 in office 992 may communicate with logic in autonomous vehicle 920 to monitor and control driverless charging. At a scheduled time, autonomy controller 950 may be configured to activate autonomous vehicle 920 to drive autonomously to a geographic location to receive fuel replenishment, such as station 990c. Once charging is complete, autonomous vehicle 920 may drive back to its original location driverlessly (e.g., back to a parking lot of office 992).

Charging port manager 986 may be configured to monitor a rate of charging to detect when charging is complete. Once completed, charging port manager 986 may be configured to generate a control signal to release a lock affixing a charge cable to autonomous vehicle 920, similar to that described in FIG. 8. Note that upon receiving a critical data signal specifying a level of charge in a battery is critical, autonomy controller 950 may be configured to omit scheduling and automatically transit to a charging station upon authorization by a user. Note, too, while charge controller 980 may be configured to recharge an electric battery of an autonomous, controller 980 may be implemented to monitor levels of any type of fuel, such as hydrogen, liquid natural gas, gasoline, diesel, biofuels, and the like.

Figure 10:
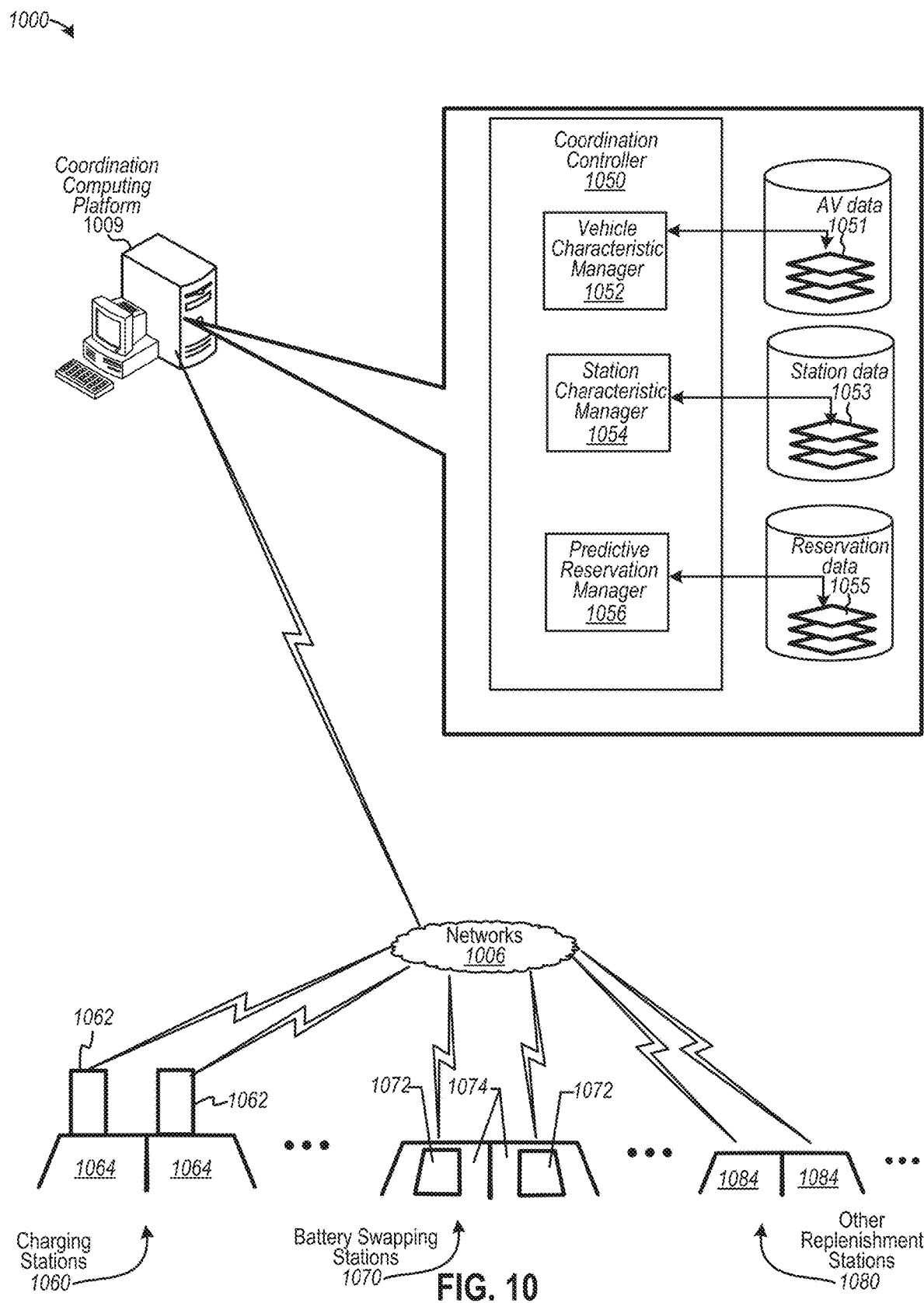
FIG. 10 is a diagram depicting an example of a coordination computing platform configured to coordinate driverless transit to a fuel replenishment station, according to some embodiments.

FIG. 10 is a diagram depicting an example of a coordination computing platform configured to coordinate driverless transit to a fuel replenishment station, according to some embodiments. Diagram 1000 depicts a coordination computing platform 1009 communicatively coupled via one or more networks 1006 to fuel replenishment stations, such as charging stations 1062, battery swapping stations 1070, and other types of replenishment stations 1080, each of which may include a processor and memory to store executable instruction, including an API to communication with coordination controller 1050. Charging stations 1060 include a charging station 1062 for each parking bay 1064. Battery swap stations 1070 include a below-ground battery swap station 1072 in each parking bay 1074. Other devices to facilitate other methods of battery swapping may be implemented in parking bay 1074, too. Other appointments stations 1080 may include any other type of fuel replenishment station (e.g., hydrogen) in each parking bay 1084. One or more elements depicted in diagram 1000 of FIG. 10 may include structures and/or functions as similarly-named or similarly-numbered elements depicted in other drawings, or as otherwise described herein, in accordance with one or more examples.

Further to diagram 1000, coordination computing platform 1009 is shown to include a coordination controller 1050, which, in turn, may include a vehicle characteristics manager 1052, a station characteristic manager 1054, and a predictive reservation manager 1056, each of which may include logic implemented in hardware or software, or a combination thereof. Vehicle characteristics manager 1052 may be configured to store autonomous vehicle characteristics data 1051, and further configured to monitor changes in autonomous vehicle characteristics data 1051. For example, vehicle characteristics manager 1052 may receive updates as to a charge level of an autonomous vehicle so that, for example, coordination controller 1050 may modify a reserve charging station to offer another charging station at a reduced distance if the charge level is decreasing at faster rate than when an initial reservation was made. Station characteristic manager 1054 may be configured to store station data 1053, which may be updated in real-time (or substantially in real-time) to reflect changes, for example, in availability of a charging station, or any other changes in status. Predictive reservation manager 1056 may be configured to store reservation data 1055, which may be based on matched autonomous vehicle data 1051 and station data 1053. As such, reservation data 1055 may include a subset of charging station suitable filtered from a larger pool of replenishment stations. Predictive reservation manager 1036 may also be configured to monitor changes in reservation data 1055 to optimize presentation of a list of most suitable charging stations for autonomous vehicle so that a user may have real-time information with which to select or authorize a particular charging station to effect driverless charging.

Figure 11:
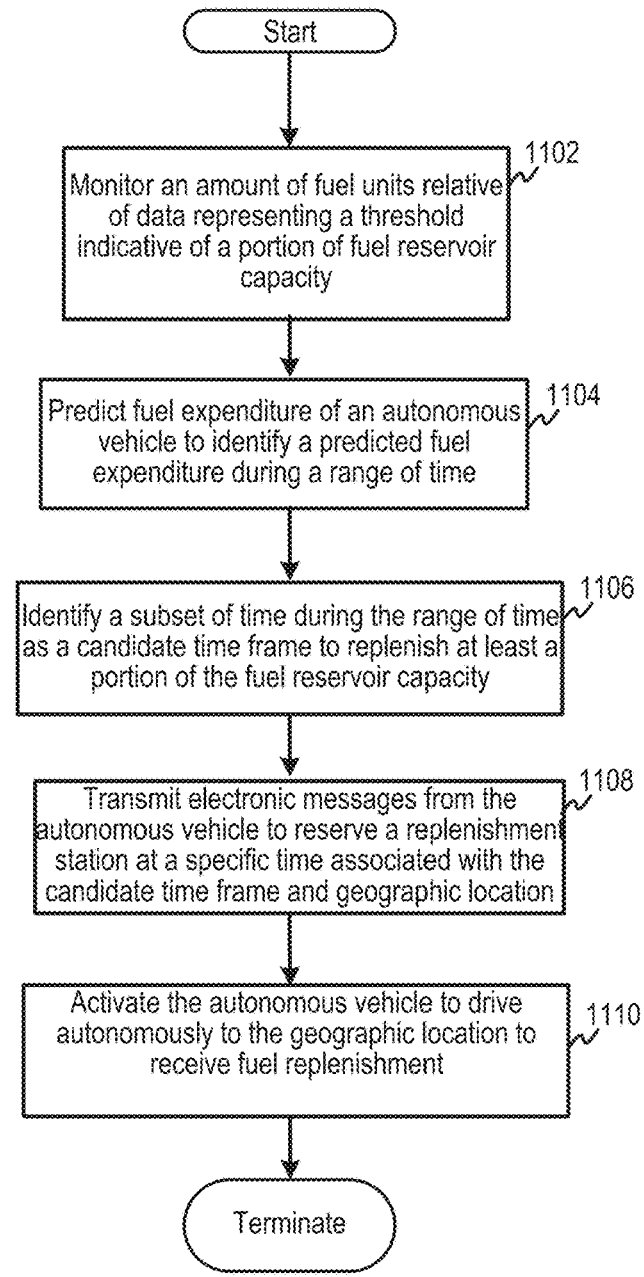
FIG. 11 is a flow diagram depicting an example of determining whether to coordinate driverless transit to a fuel replenishment station, according to some embodiments.

FIG. 11 is a flow diagram depicting an example of determining whether to coordinate driverless transit to a fuel replenishment station, according to some embodiments. At 1102, flow 1100 begins by monitoring an amount of fuel units relative of data representing a threshold indicative of a portion of fuel reservoir capacity. In recharging batteries, a "fuel reservoir capacity" may be expressed as a total amount of charge or energy that may be stored in one or more batteries, and "an amount of fuel units" may expressed in terms of kilowatts-hours ("kWh"), ampere-hours ("A-hr"), or the like, to specify an amount of energy that is replenished or added to the one or more batteries. In some examples, a charge controller may be configured to monitor whether an amount of charge falls below a "threshold" indicating a remaining amount of charge is less than may be sufficient to travel to one or more different geographic locations. When the charge level falls below the threshold, the charge monitor may trigger generation of a signal to initiate scheduling of replenishment of a battery. In some cases, the threshold may be static (e.g., one-quarter amount of total charge or energy capacity of a battery) or dynamic (e.g., an amount of charge or energy to perform predicted or requested travel actions, such as driving home from work and stopping a grocery store on the way home).

At 1104, fuel expenditure of an autonomous vehicle may be predicted to accomplish certain actions, such as propelling the autonomous vehicle to multiple destinations to achieve certain objectives during a range of time. Examples of tasks that may need energy to propel a vehicle include tasks like purchasing a meal, such as lunch, purchasing groceries or hardware, transporting children to and from school, and the like. Further, an amount of fuel expenditure may be calculated to cause the threshold to be crossed, and, as such, an amount of battery energy or charge to offset the expenditure may be computed for at least replenishing the charge or energy, thereby ensuring the predicted expenditure may avoid depleting amount of charge or energy below the threshold.

At 1106, a subset of time during a range of time may be identified as a candidate time frame to replenish at least a portion of a fuel reservoir capacity. For example, a location and distance of a replenishment station may be determined, an amount of time to transit to and from the replenishment station may be determined, an amount of charge that may be depleted during the round trip may be determined, a time to charge a battery to a certain level of charge or energy may be predicted, and other factors may be considered. Therefore, if there is sufficient time to replenish charge or energy (e.g., sufficient time for round-trip driverless transit to and from the charge station and a total predicted charging time), the time frame in which to replenish charge or energy may be identified as a candidate time frame.

At 1108, electronic messages may be transmitted from an autonomous vehicle to reserve a replenishment station (e.g., a charging station) to replenish at least a portion of the fuel reservoir capacity, such as charging a battery to add at least an additional amount of charge or energy to the total battery capacity. A computing device in communication with the charging station may receive data representing the reservation to limit access and authorization to an autonomous vehicle associated with the reservation. At 1110, an autonomous vehicle may be activated to drive autonomously (e.g., driverlessly without a driver) to a geographic location associated with a charging station. Therefore, an autonomy controller may be configured to predict an amount of charge or energy to replenish a battery so that a number of predicted activities may be accomplished during a particular time frame. Further, the autonomy controller may also be configured to coordinate charging without a human driver or passenger during, for example, a time frame during which a passenger or driver may not use the autonomous vehicle for transportation.

Figure 12:
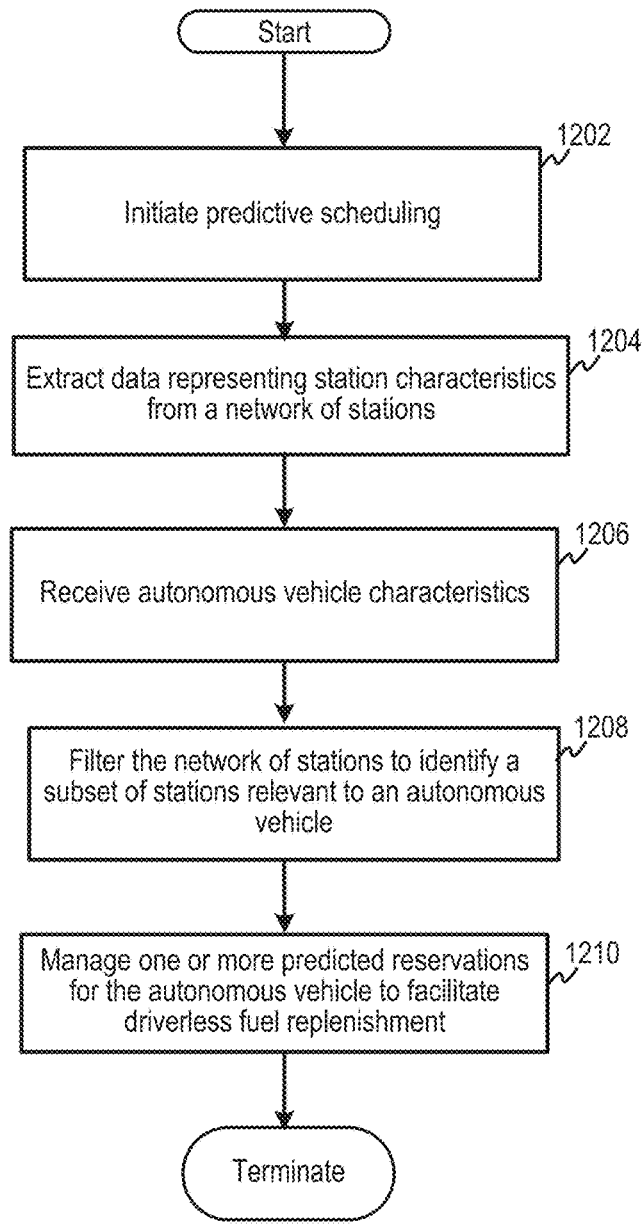
FIG. 12 is a flow diagram depicting an example of coordinating driverless transit to a fuel replenishment station, according to some embodiments.

FIG. 12 is a flow diagram depicting an example of coordinating driverless transit to a fuel replenishment station, according to some embodiments. At 1202, predictive scheduling may be initiated at, for example, a coordination computing system that may be in networked communication with any number of geographically distributed fuel replenishment stations (e.g., charging stations). In some examples, and autonomous vehicle may transmit electronic message requesting a reservation generally or any specific charging station or site.

At 1204, data representing station characteristics, as described in FIG. 9, for any number of replenishment stations in a network of stations may be extracted. At 1206, characteristics associated with a particular autonomous vehicle requesting fuel replenishment or charging services may be received. At 1208, a number of networked replenishment stations may be analyzed so as to compare station characteristics against the autonomous vehicle characteristics to filter out a subset of charging stations that may be relevant to the particular autonomous vehicle. At 1210, at least one predicted reservation may be determined based on the subset of charging stations. A selected predicted reservation may be managed for the autonomous vehicle to facilitate driverless fuel replenishment.

Figure 13:
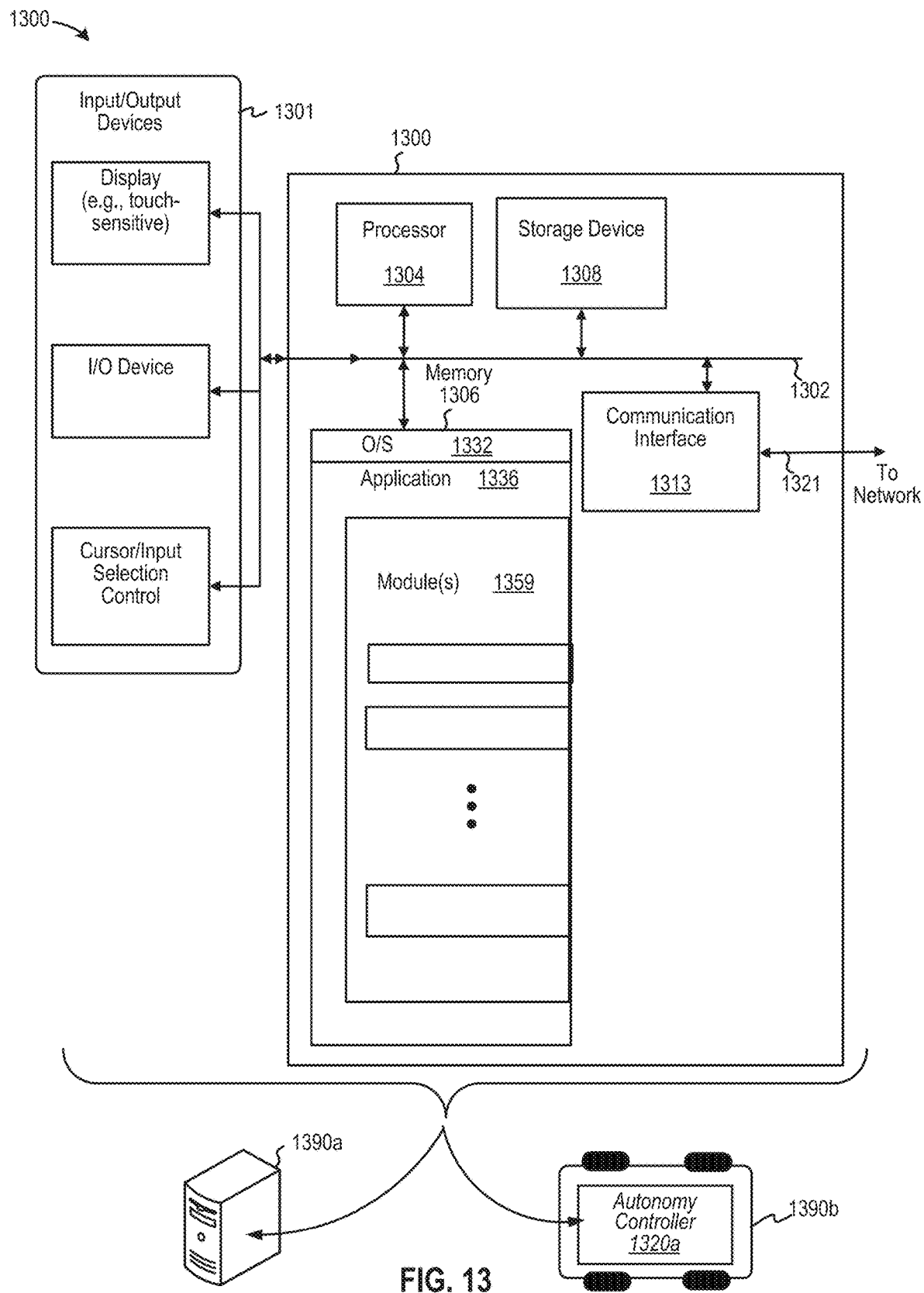
FIG. 13 illustrates examples of various computing platforms configured to provide various functionalities to components of an autonomy controller, according to various embodiments.

FIG. 13 illustrates examples of various computing platforms configured to provide various functionalities to components of an autonomy controller, according to various embodiments. In some examples, computing platform 1300 may be used to implement computer programs, applications, methods, processes, algorithms, or other software, as well as any hardware implementation thereof, to perform the above-described techniques.

In some cases, computing platform 1300 or any portion (e.g., any structural or functional portion) can be disposed in any device, such as a computing device 1390a, autonomous vehicle 1390b, and/or a processing circuit in forming structures and/or functions of a an autonomy controller 1320a, according to various examples described herein.

Computing platform 1300 includes a bus 1302 or other communication mechanism for communicating information, which interconnects subsystems and devices, such as processor 1304, system memory 1306 (e.g., RAM, etc.), storage device 1308 (e.g., ROM, etc.), an in-memory cache (which may be implemented in RAM 1306 or other portions of computing platform 1300), a communication interface 1313 (e.g., an Ethernet or wireless controller, a Bluetooth controller, NFC logic, etc.) to facilitate communications via a port on communication link 1321 to communicate, for example, with a computing device, including mobile computing and/or communication devices with processors, including database devices (e.g., storage devices configured to store atomized datasets, including, but not limited to triplestores, etc.). Processor 1304 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 1300 exchanges data representing inputs and outputs via input-and-output devices 1301, including, but not limited to, keyboards, mice, audio inputs (e.g., speech-to-text driven devices), user interfaces, displays, monitors, cursors, touch-sensitive displays, LCD or LED displays, and other I/O-related devices.

Note that in some examples, input-and-output devices 1301 may be implemented as, or otherwise substituted with, a user interface in a computing device associated with a user account identifier in accordance with the various examples described herein.

According to some examples, computing platform 1300 performs specific operations by processor 1304 executing one or more sequences of one or more instructions stored in system memory 1306, and computing platform 1300 can be implemented in a client-server arrangement, peer-to-peer arrangement, or as any mobile computing device, including smart phones and the like. Such instructions or data may be read into system memory 1306 from another computer readable medium, such as storage device 1308. In some examples, hard-wired circuitry may be used in place of or in combination with software instructions for implementation. Instructions may be embedded in software or firmware. The term "computer readable medium" refers to any tangible medium that participates in providing instructions to processor 1304 for execution. Such a medium may take many forms, including but not limited to, non-volatile media and volatile media. Non-volatile media includes, for example, optical or magnetic disks and the like. Volatile media includes dynamic memory, such as system memory 1306.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1302 for transmitting a computer data signal.

In some examples, execution of the sequences of instructions may be performed by computing platform 1300. According to some examples, computing platform 1300 can be coupled by communication link 1321 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 1300 may transmit and receive messages, data, and instructions, including program code (e.g., application code) through communication link 1321 and communication interface 1313. Received program code may be executed by processor 1304 as it is received, and/or stored in memory 1306 or other non-volatile storage for later execution.

In the example shown, system memory 1306 can include various modules that include executable instructions to implement functionalities described herein. System memory 1306 may include an operating system ("O/S") 1332, as well as an application 1336 and/or logic module(s) 1359. In the example shown in FIG. 13, system memory 1306 may include any number of modules 1359, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques, including, but not limited to, FORTH, ASP, ASP.net, .Net framework, Ruby, Ruby on Rails, C, Objective C, C++, C#, Adobe® Integrated Runtime™ (Adobe® AIR™), ActionScript™, Flex™, Lingo™, Java™, Javascript™, Ajax, Perl, COBOL, Fortran, ADA, XML, MXML, HTML, DHTML, XHTML, HTTP, XMPP, PHP, and others. Design, publishing, and other types of applications such as Dreamweaver®, Shockwave®, Flash®, Drupal and Fireworks® may also be used to implement at least one of the described techniques or variations thereof. Database management systems (i.e., "DBMS"), search facilities and platforms, web crawlers (i.e., computer programs that automatically or semi-automatically visit, index, archive or copy content from, various websites (hereafter referred to as "crawlers")), and other features may be implemented using various types of proprietary or open source technologies, including MySQL, Oracle (from Oracle of Redwood Shores, Calif.), Solr and Nutch from The Apache Software Foundation of Forest Hill, Md., among others and without limitation. The described techniques may be varied and are not limited to the examples or descriptions provided. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, modules 1359 of FIG. 13, or one or more of their components, or any process or device described herein, can be in communication (e.g., wired or wirelessly) with a mobile device, such as a mobile phone or computing device, or can be disposed therein.

The computing device may be disposed in autonomous vehicle 1390*b* as autonomy controller 1320*a*.

In some cases, a mobile device, or any networked computing device (not shown) in communication with one or more modules 1359 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 1359 or one or more of its/their components, or any process or device described herein, can be implemented in one or more computing devices (i.e., any mobile computing device) that may include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, modules 1359 or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method comprising:
computing vehicular drive parameters to apply to a vehicle controller to facilitate driverless transit of an autonomous vehicle coextensive with a path of travel to a destination geographical location;
accessing map data to identify a boundary including the destination geographical location and a portion of the path of travel;
detecting that the autonomous vehicle is in proximity with the boundary;
accessing, in response to detecting that the autonomous vehicle is in proximity with the boundary, executable instructions to facilitate vectoring the autonomous vehicle in accordance with the portion of the path of travel;
applying a first subset of the vehicular drive parameters to guide the autonomous vehicle along the portion of the path of travel to arrive at a termination point at the destination geographical location in a first position and a first orientation;
detecting, while the autonomous vehicle is within the boundary, passenger entry to or exit from the autonomous vehicle at a point along the portion of the path of travel; and
automatically applying, in response to detecting the passenger entry to or exit from the autonomous vehicle, a second subset of the vehicular drive parameters to arrive at the termination point in at least one of an adjusted position and an adjusted orientation compared to the first position and the first orientation,
wherein the second subset of the vehicular drive parameters is computed prior to detecting that the autonomous vehicle is in proximity with the boundary.

2. The method of claim 1, wherein the termination point is a location including a number of objects as obstacles, and wherein, when the passenger exit is detected, the at least one of the adjusted position and the adjusted orientation places a door of the autonomous vehicle through which the passenger exited closer to at least one of the objects compared to the first position and the first orientation.

3. The method of claim 1, further comprising:
transitioning, when the autonomous vehicle enters the boundary, to a preprogrammed path segment configured to implement an approach maneuver along the portion of the path of travel, and wherein, when the passenger entry is detected, the at least one of the adjusted position and the adjusted orientation places a door of the autonomous vehicle through which the passenger entered further away from at least one of the objects compared to the first position and the first orientation.

4. The method of claim 3, wherein, prior to detecting that the autonomous vehicle is in proximity to the boundary, the vehicular drive parameters are computed at units of travel and stored as preprogrammed vehicular drive parameters for the preprogrammed path segment, wherein transitioning to the preprogrammed path segment comprises:
identifying the preprogrammed vehicular drive parameters for the units of travel; and
executing instructions to cause the vehicle controller to implement the preprogrammed vehicular drive parameters to transit over the preprogrammed path segment.

5. The method of claim 4, wherein the preprogrammed vehicular drive parameters comprise one or more of a degree of wheel angle, an amount of throttle, an amount of brake pressure, and a state of transmission, and wherein the units of travel correspond to at least one of predetermined units of time and predetermined units of distance.

6. The method of claim 3, further comprising:
executing a first subset of instructions to guide the autonomous vehicle to the termination point in either an anterior orientation or a posterior orientation.

7. The method of claim 6, further comprising:
executing a second subset of instructions to propel the autonomous vehicle to exit the termination point in either the anterior orientation or the posterior orientation.

8. The method of claim 7, further comprising:
transitioning from the preprogrammed path segment to implementation of the vehicular drive parameters in association with exiting the boundary of the destination geographical location.

9. The method of claim 1, further comprising:
receiving a user input configured to initiate recordation of detected vehicular drive parameters as the autonomous vehicle transits over via a path segment; and
storing the detected vehicular drive parameters to form preprogrammed vehicular drive parameters that can be recalled to guide the autonomous vehicle in accordance with a preprogrammed path segment.

10. The method of claim 9, further comprising:
generating a macro application to enable multiple implementations of the preprogrammed path segment.

11. The method of claim 1, further comprising:
localizing the autonomous vehicle via an image capture device relative to an image target at the destination geographical location.

12. The method of claim 1, wherein the termination point is disposed at a location coinciding with a battery charge station or a battery swap station.

13. The method of claim 12, further comprising:
receiving pre-recorded executable instructions to control transit of the autonomous vehicle to the battery charge station or the battery swap station,
wherein the pre-recorded executable instructions are non-alterable such that a driver of the autonomous vehicle is prohibited from modifying the pre-recorded executable instructions.

14. An apparatus comprising:
a memory including executable instructions; and
a processor, responsive to executing the instructions, that is configured to:
compute vehicular drive parameters to apply to a vehicle controller to facilitate driverless transit of an autonomous vehicle coextensive with a path of travel to a destination geographical location;

access map data to identify a boundary including the destination geographical location and a portion of the path of travel;

detect that the autonomous vehicle is in proximity with the boundary;

access, in response to detecting that the autonomous vehicle is in proximity with the boundary, executable instructions to facilitate vectoring the autonomous vehicle in accordance with the portion of the path of travel; and apply a first subset of the vehicular drive parameters to guide the autonomous vehicle along the portion of the path of travel to arrive at a termination point at the destination geographical location in a first position and a first orientation;

detect, while the autonomous vehicle is within the boundary, passenger entry to or exit from the autonomous vehicle at a point along the portion of the path of travel; and automatically apply, in response to detecting the passenger entry to or exit from the autonomous vehicle, a second subset of the vehicular drive parameters to arrive at the termination point in at least one of an adjusted position and an adjusted orientation compared to the first position and the first orientation, wherein the second subset of the vehicular drive parameters is computed prior to detecting that the autonomous vehicle is in proximity with the boundary.

15. The apparatus of claim 14, wherein the termination point is a location coinciding with a garage including a number of objects as obstacles.

16. The apparatus of claim 14, wherein the processor is further configured to:

transition, when the autonomous vehicle enters the boundary, to a preprogrammed path segment configured to implement an approach maneuver along the portion of the path of travel.

17. The apparatus of claim 16, wherein the processor is further configured to:

identify preprogrammed vehicular drive parameters for units of travel; and execute instructions to cause the vehicle controller to implement the preprogrammed vehicular drive parameters to transit over the preprogrammed path segment.

18. The apparatus of claim 17, wherein the preprogrammed vehicular drive parameters comprise one or more of a degree of wheel angle, an amount of throttle, an amount of brake pressure, and a state of transmission.

19. The apparatus of claim 14, wherein the processor is further configured to:

receive a user input configured to initiate recordation of detected vehicular drive parameters as the autonomous vehicle transits over via a path segment; and store the detected vehicular drive parameters to form preprogrammed vehicular drive parameters that can be recalled to guide the autonomous vehicle in accordance to a preprogrammed path segment.

20. The apparatus of claim 19, wherein the processor is further configured to:

receive data representing a preprogrammed path of travel to a location of a charging station;

generate a macro application to enable multiple implementations of the preprogrammed path segment including a path segment to a battery charging station; and control the autonomous vehicle to terminate driverless transit at the charging station.

* * * * *